(12) United States Patent
Zhang et al.

(10) Patent No.: US 12,483,778 B2
(45) Date of Patent: Nov. 25, 2025

(54) PICTURE TRANSMISSION METHOD AND APPARATUS

(71) Applicant: Huawei Technologies Co., Ltd., Shenzhen (CN)

(72) Inventors: Zhaoming Zhang, Shenzhen (CN); Minghan Yang, Shenzhen (CN); Kunyang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 431 days.

(21) Appl. No.: 17/915,845

(22) PCT Filed: Mar. 11, 2021

(86) PCT No.: PCT/CN2021/080134
§ 371 (c)(1),
(2) Date: Sep. 29, 2022

(87) PCT Pub. No.: WO2021/197014
PCT Pub. Date: Oct. 7, 2021

(65) Prior Publication Data
US 2023/0127671 A1    Apr. 27, 2023

(30) Foreign Application Priority Data
Mar. 31, 2020   (CN) .......................... 202010243454.7

(51) Int. Cl.
*H04N 23/60*    (2023.01)
*H04N 1/00*     (2006.01)
(Continued)

(52) U.S. Cl.
CPC ......... *H04N 23/64* (2023.01); *H04N 1/00095* (2013.01); *H04N 5/2628* (2013.01); *H04N 23/62* (2023.01); *H04N 23/632* (2023.01)

(58) Field of Classification Search
CPC ... G06T 7/70; G06T 7/73; G06T 2207/20132; G06T 3/40; H04N 23/64; H04N 23/62;
(Continued)

(56) References Cited

U.S. PATENT DOCUMENTS

| | | | |
|---|---|---|---|
| 10,764,535 B1 * | 9/2020 | Powell | ..................... G06T 7/11 |
| 2007/0115350 A1 * | 5/2007 | Currivan | ................. H04N 7/147 |
| | | | 348/14.08 |

(Continued)

FOREIGN PATENT DOCUMENTS

| CN | 104394312 A | 3/2015 |
|---|---|---|
| CN | 105635563 A | 6/2016 |

(Continued)

*Primary Examiner* — Kelly L Jerabek
(74) *Attorney, Agent, or Firm* — Slater Matsil, LLP

(57) ABSTRACT

Embodiments of this application provide a picture transmission method and apparatus. A photographer inputs an operation instruction in a user interface of a first electronic device, to select a first picture whose imaging effect needs to be shared. The first electronic device processes the first picture based on specification information of a display of a second electronic device, to obtain each second picture and a posing score that are used to represent the imaging effect of the first picture. Then, the first electronic device sends each second picture and the posing score to the second electronic device, so that a user wearing the second electronic device can view the imaging effect of the first picture, and a photographed object does not need to move back and forth to the photographer to view a photographing effect.

20 Claims, 40 Drawing Sheets

(51) Int. Cl.
*H04N 5/262* (2006.01)
*H04N 23/62* (2023.01)
*H04N 23/63* (2023.01)

(58) Field of Classification Search
CPC .. H04N 23/632; H04N 23/611; H04N 23/631; H04N 23/633; H04N 23/661; H04N 23/80; H04N 5/2628
See application file for complete search history.

(56) References Cited

U.S. PATENT DOCUMENTS

| | | | | |
|---|---|---|---|---|
| 2009/0322926 | A1* | 12/2009 | Ikeda | G06T 11/60 |
| | | | | 348/333.01 |
| 2013/0108175 | A1* | 5/2013 | Ptucha | G06T 11/60 |
| | | | | 382/199 |
| 2014/0185957 | A1* | 7/2014 | Kim | G06T 11/00 |
| | | | | 382/283 |
| 2015/0146042 | A1 | 5/2015 | Panek-Rickerson | |
| 2015/0264433 | A1* | 9/2015 | Myung | H04N 21/4385 |
| | | | | 725/110 |
| 2016/0381276 | A1* | 12/2016 | Li | H04N 23/631 |
| | | | | 348/211.3 |
| 2017/0134645 | A1 | 5/2017 | Kim et al. | |
| 2018/0176459 | A1 | 6/2018 | Choi et al. | |

FOREIGN PATENT DOCUMENTS

| | | |
|---|---|---|
| CN | 105812665 A | 7/2016 |
| CN | 105915721 A | 8/2016 |
| CN | 106101403 A | 11/2016 |
| CN | 106210508 A | 12/2016 |
| CN | 106506838 A | 3/2017 |
| CN | 107948503 A | 4/2018 |
| CN | 108184050 A | 6/2018 |
| CN | 109040524 A | 12/2018 |
| CN | 110825897 A | 2/2020 |

* cited by examiner

Photographer    User

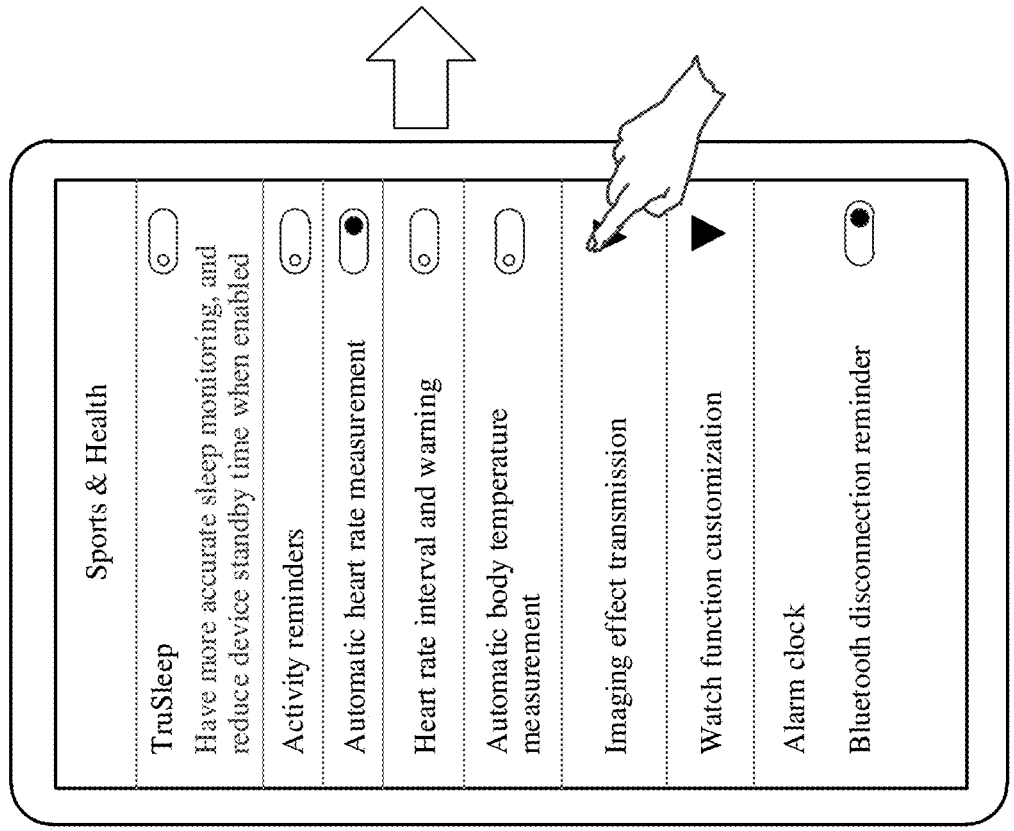

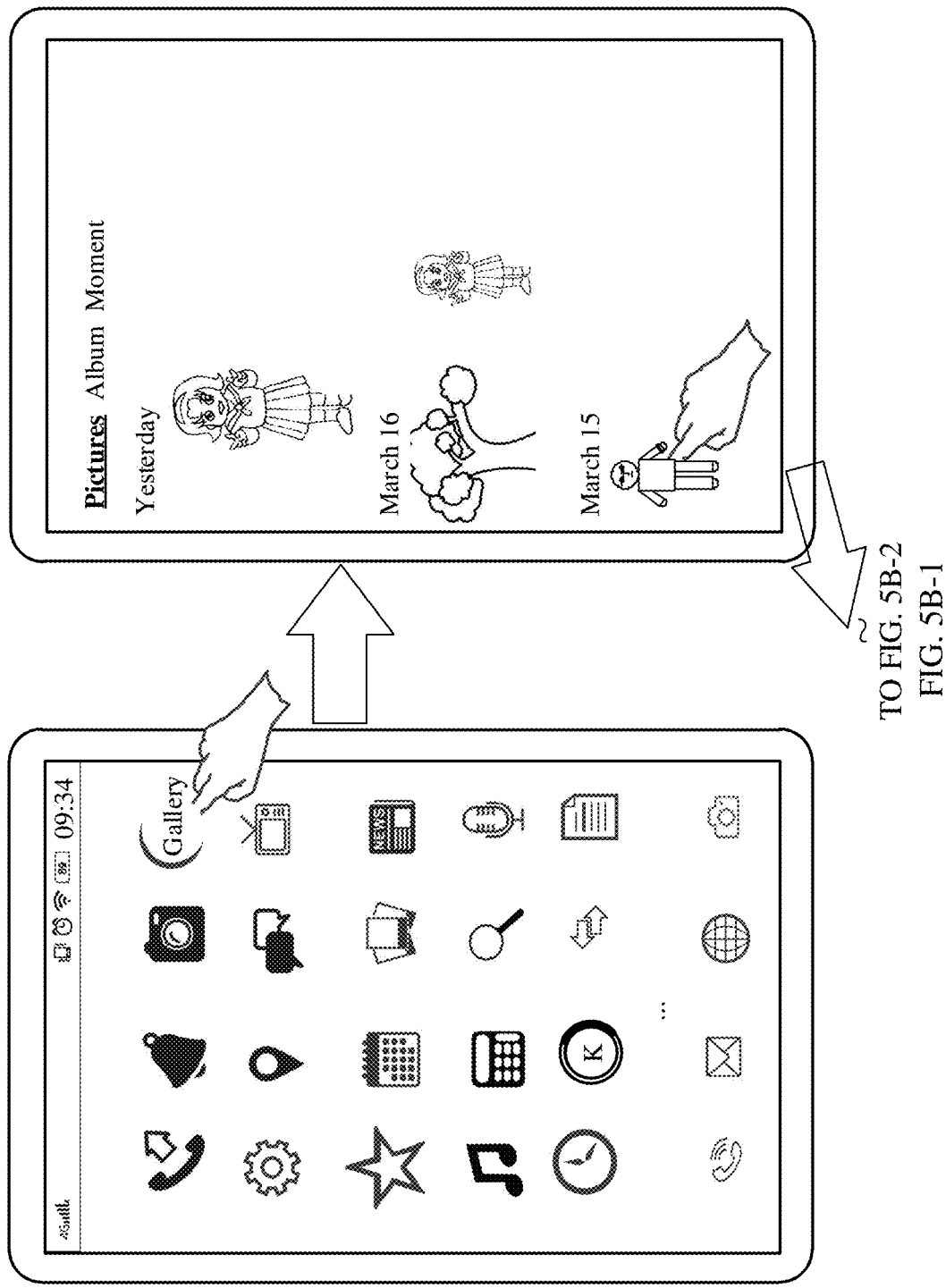

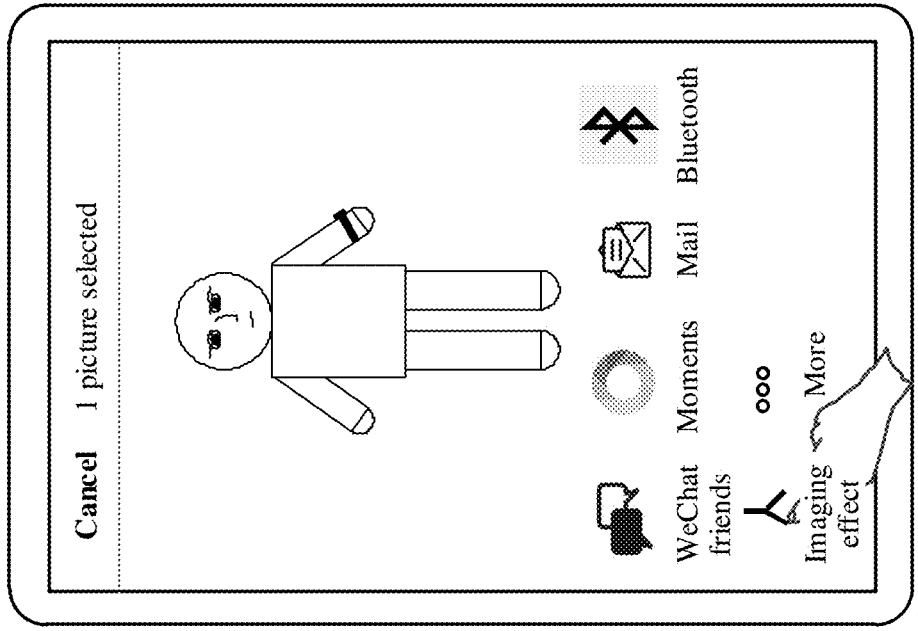
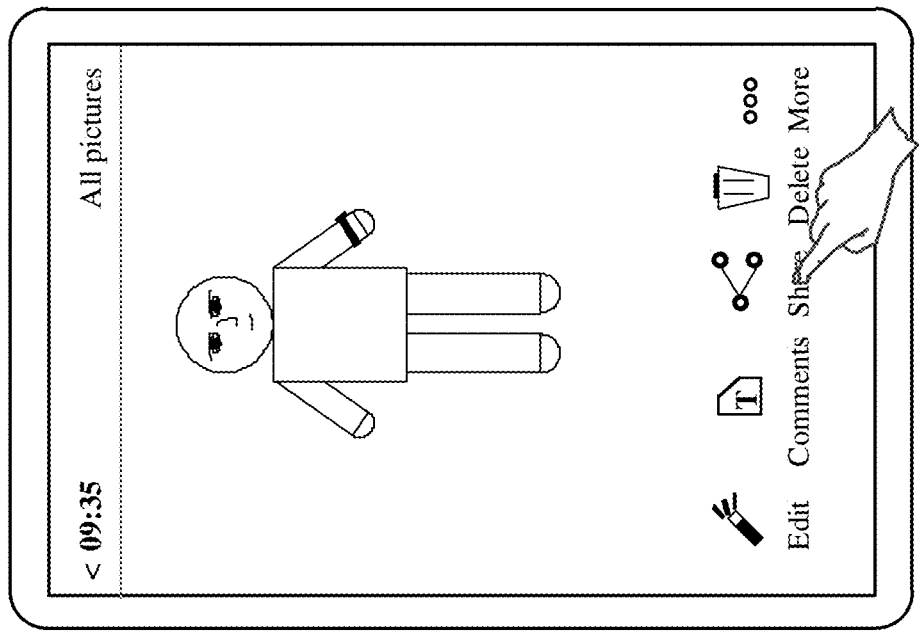

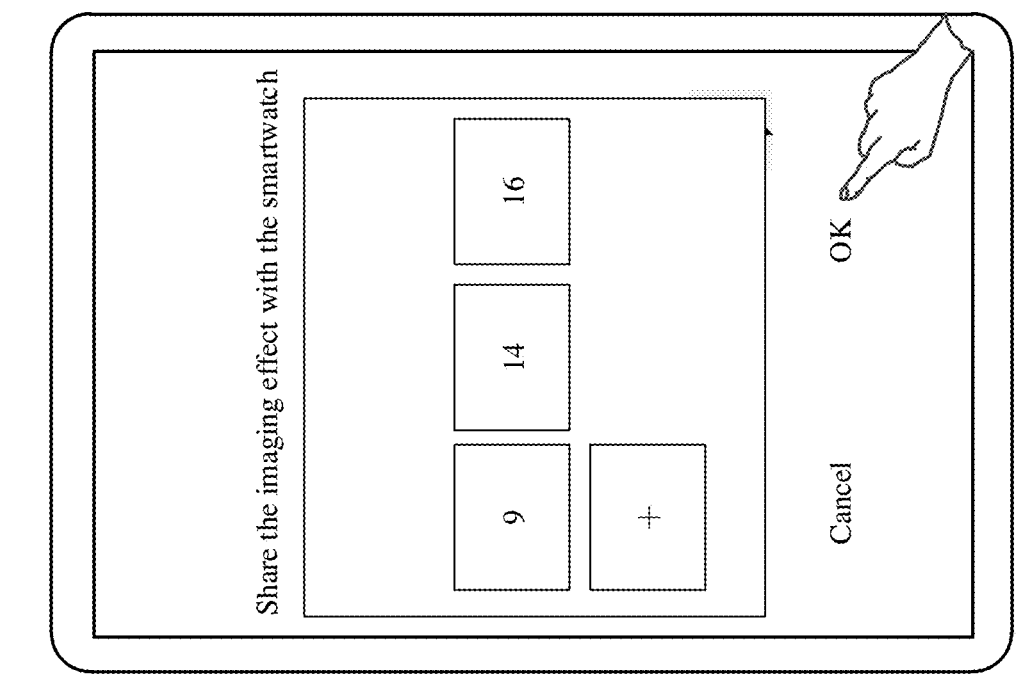

PICTURE TRANSMISSION METHOD AND APPARATUS

CROSS-REFERENCE TO RELATED APPLICATIONS

This application is a National Stage of International Application No. PCT/CN2021/080134, filed on Mar. 11, 2021, which claims priority to Chinese Patent Application No. 202010243454.7, filed on Mar. 31, 2020. Both of the aforementioned applications are hereby incorporated by reference in their entireties.

TECHNICAL FIELD

Embodiments of this application relate to the field of terminal device technologies, and in particular, to a picture transmission method and apparatus.

BACKGROUND

With rapid development of technologies, a terminal device such as a mobile phone has become an indispensable part in people's life, and increasing people use the terminal device to take photographs, record videos, and the like. At the same time, with improvement of aesthetic levels of people, people have growing requirements for a layout of photograph content, an expression of a person, and the like.

Generally, a user poses at a favorite position, and a photographer photographs the user by using a terminal device. After the photographing, the user moves to the photographer to view an overall layout and an expression of a person in a photograph. If the user is dissatisfied with a photographing effect, the user returns to the original position, and the photographer re-photographs the user. The photographer may be any person who takes the photograph by using the terminal device, including but not limited to a professional photographer.

In the photographing process, to view the photographing effect, the user has to move to the photographer. A plurality of times of photographing may be performed to possibly obtain a satisfactory photograph. Obviously, the process is relatively time-consuming, and even a photograph with a good effect cannot be taken. Therefore, how the user obtains an effect of a photograph taken by the photographer is a problem to be resolved urgently.

SUMMARY

Embodiments of this application provide a picture transmission method and apparatus. A mobile phone sends an imaging effect of a taken picture to a wearable device of a photographed object for viewing by a user, thereby improving photographing efficiency and improving photograph quality.

According to a first aspect, an embodiment of this application provides a picture transmission method. The method may be applied to a first electronic device, or may be applied to a chip in the first electronic device. The following describes the method by using an example in which the method is applied to the first electronic device. The method includes: A photographer inputs an operation instruction in a user interface of the first electronic device, to select a first picture whose imaging effect needs to be shared. The first electronic device processes the first picture based on specification information of a display of a second electronic device, to obtain each second picture and a posing score that are used to represent the imaging effect of the first picture. The posing score is a score of posture and expression quality of a target object. Then, the first electronic device sends each second picture and the posing score to the second electronic device, so that a user wearing the second electronic device can view the imaging effect of the first picture, and a photographed object does not need to move back and forth to the photographer to view a photographing effect, thereby improving photographing efficiency and improving photograph quality.

In a feasible design, after receiving the operation instruction, the first electronic device further processes the first picture, to obtain a second picture corresponding to a target region of the target object in the first picture. For example, the target region of the target object in the first picture is scaled up to obtain the second picture. For another example, the target region of the target object in the first picture is scaled down to obtain the second picture. For still another example, the second picture is cropped from the first picture by using a center of the target region as a reference point. By using this solution, the first electronic device obtains the target region of the target object in the first picture.

In a feasible design, when there are a plurality of target objects, different target objects correspond to different second pictures. By using this solution, the first electronic device generates a second picture for a target region of each target object, so that the user can learn an imaging effect of each target object in the first picture.

In a feasible design, the imaging effect further includes a photographing suggestion, and the photographing suggestion is used to indicate a manner of adjusting an expression of the target object. By using this solution, the photographed object can quickly adjust a posture, an expression, and the like, to reach an optimal photographing state.

In a feasible design, the imaging effect further includes a third picture, the third picture is obtained by the first electronic device by scaling and/or cropping the first picture, a shape of the third picture is the same as a shape of the display of the second electronic device, and a difference between a size of the third picture and a size of the display of the second electronic device is less than a preset threshold. By using this solution, the first electronic device sends an overall imaging effect of the first picture to the second electronic device.

In a feasible design, after sending the imaging effect of the first picture to the second electronic device in response to the operation instruction, the first electronic device further receives indication information sent by the second electronic device. The indication information is used to indicate to delete or retain the first picture. The first electronic device displays the indication information, and deletes or retains the first picture based on the indication information. By using this solution, the user gives feedback to the photographer timely and conveniently.

In a feasible design, before sending the imaging effect of the first picture to the second electronic device in response to the operation instruction, the first electronic device further displays a first interface, where the first interface includes a first control, a second control, and a third control, the first control is configured to indicate whether to select the second picture, the second control is configured to indicate whether to select the posing score and the photographing suggestion, and the third control is configured to indicate whether to select the third picture; and generates the second picture, the expression score and the photographing suggestion, or the third picture based on an operation performed by a user in the first interface. By using this solution, the photographer quickly and conveniently selects an imaging effect to be sent.

In a feasible design, before sending the imaging effect of the first picture to the second electronic device in response to the operation instruction, the first electronic device further photographs the target object to obtain the first picture. By using this solution, the photographer and the user timely communicate with each other in a photographing process.

In a feasible design, before sending the imaging effect of the first picture to the second electronic device in response to the operation instruction, the first electronic device further establishes a network connection to the second electronic device, and receives the specification information of the display sent by the second electronic device. By using this solution, the first electronic device obtains the specification information of the second electronic device.

In a feasible design, the first electronic device further recognizes at least one of lips, teeth, eyes, or cheeks of a face in the target region, and determines an expression score based on the at least one of the lips, the teeth, the eyes, or the cheeks. By using this solution, the first electronic device determines the expression score of the target object.

In a feasible design, before sending the imaging effect of the first picture to the second electronic device in response to the operation instruction, the first electronic device further extracts the target region of the target object from the first picture, and processes the target region based on the specification information of the display of the second electronic device, to obtain the second picture. By using this solution, the first electronic device quickly obtains an imaging effect of a detail region, that is, the target region.

In a feasible design, the target region is a square, and the specification information includes a diameter of the display of the second electronic device. When the first electronic device processes the target region based on the specification information of the display of the second electronic device, to obtain the second picture, if the diameter of the second electronic device is less than an edge length of the target region, the first picture is scaled down, so that an edge length of a target region in a scaled-down first picture is equal to the diameter of the second electronic device. Then, the first electronic device crops the second picture from the scaled-down first picture by using a center of the target region as a reference point. A scale-down rate is a ratio of the edge length to the diameter. Alternatively, when the diameter exceeds a preset multiple of the edge length of the target region, the first picture is scaled up, so that an edge length of a target region in a scaled-up first picture is equal to the diameter, and the second picture is cropped from the scaled-up first picture by using a center of the target region as a reference point. A scale-up rate is a ratio of the edge length to the diameter. Alternatively, when the diameter is greater than the edge length of the target region and does not exceed the preset multiple of the edge length of the target region, the first electronic device crops the second picture from the first picture by using a center of the target region as a reference point. By using this solution, the first electronic device generates a second picture suitable for the second electronic device whose display is circular.

In a feasible design, the target region is a square, and the specification information includes a length and a width of the display of the second electronic device. When the first electronic device processes the target region based on the specification information of the display of the second electronic device, to obtain the second picture, where the length is less than the width, if the length is less than a length of the target region, the first picture is scaled down, so that an edge length of a target region in a scaled-down first picture is equal to the length, and the second picture is cropped from the scaled-down first picture by using a center of the target region as a reference point. A scale-down rate is a ratio of the edge length to the length. Alternatively, when the length exceeds a preset multiple of the edge length of the target region, the first picture is scaled up, so that an edge length of a target region in a scaled-up first picture is equal to the length, and the second picture is cropped from the scaled-up first picture by using a center of the target region as a reference point. A scale-up rate is a ratio of the edge length to the length. Alternatively, when the length is greater than the edge length of the target region and does not exceed the preset multiple of the edge length of the target region, the second picture is cropped from the first picture by using a center of the target region as a reference point. By using this solution, the first electronic device generates a second picture suitable for the second electronic device whose display is rectangular.

According to a second aspect, an embodiment of this application provides a picture transmission method. The method may be applied to a second electronic device, or may be applied to a chip in the second electronic device. The following describes the method by using an example in which the method is applied to the second electronic device. The method includes: The second electronic device receives an imaging effect sent by a first electronic device, where the imaging effect includes a second picture and a posing score, the second picture includes a target region of a target object in the first picture, a shape of the second picture is the same as a shape of a display of the second electronic device, a difference between a size of the second picture and a size of the display of the second electronic device is less than a preset threshold, and the posing score is a score of posture and expression quality of the target object; and displays the imaging effect. By using this solution, the second electronic device receives and displays the second picture and the posing score that are used to represent the imaging effect of the first picture, so that a photographed object does not need to move to a photographer to view a photographing effect, thereby improving photographing efficiency and improving photograph quality.

In a feasible design, when there are a plurality of target objects, different target objects correspond to different second pictures. When the electronic device displays the imaging effect, the electronic device switches to and displays the second picture after detecting a screen switching operation input by a user. By using this solution, the user can learn an imaging effect of each target object in the first picture.

In a feasible design, the imaging effect further includes a photographing suggestion, and the photographing suggestion is used to indicate a manner of adjusting an expression of the target object. By using this solution, the photographed object can quickly adjust a posture, an expression, and the like, to reach an optimal photographing state.

In a feasible design, the imaging effect further includes a third picture, the third picture is obtained by the first electronic device by scaling and/or cropping the first picture, a shape of the third picture is the same as the shape of the display of the second electronic device, and a difference between a size of the third picture and the size of the display of the second electronic device is less than the preset threshold. By using this solution, the second electronic device displays an overall imaging effect of the first picture.

In a feasible design, when displaying the imaging effect, the second electronic device further displays a retain button and a delete button; generates indication information based on an operation performed by the user on the retain button or the delete button, where the indication information is used to indicate to delete or retain the first picture; and sends the indication information to the first electronic device. By using this solution, the photographed object gives feedback to the photographer timely and quickly.

According to a third aspect, an embodiment of this application provides a picture transmission apparatus. The picture transmission apparatus is disposed on a first electronic device, and the apparatus includes:

a receiving unit, configured to receive an operation instruction;

a processing unit, configured to respond to the operation instruction; and a sending unit, configured to send an imaging effect of a first picture to a second electronic device. The imaging effect includes a second picture and a posing score, the second picture includes a target region of a target object in the first picture, a shape of the second picture is the same as a shape of a display of the second electronic device, a difference between a size of the second picture and a size of the display of the second electronic device is less than a preset threshold, and the posing score is a score of posture and expression quality of the target object.

In a feasible design, after the receiving unit receives the operation instruction, the processing unit is further configured to:

scale up the target region of the target object in the first picture, to obtain the second picture; or scale down the target region of the target object in the first picture, to obtain the second picture; or crop the second picture from the first picture by using a center of the target region as a reference point.

In a feasible design, when there are a plurality of target objects, different target objects correspond to different second pictures.

In a feasible design, the imaging effect further includes a photographing suggestion, and the photographing suggestion is used to indicate a manner of adjusting an expression of the target object.

In a feasible design, the imaging effect further includes a third picture, the third picture is obtained by the first electronic device by scaling and/or cropping the first picture, a shape of the third picture is the same as the shape of the display of the second electronic device, and a difference between a size of the third picture and the size of the display of the second electronic device is less than the preset threshold.

In a feasible design, the apparatus further includes a display unit.

After the sending unit sends the imaging effect of the first picture to the second electronic device, the receiving unit is further configured to receive indication information sent by the second electronic device. The indication information is used to indicate to delete or retain the first picture.

The display unit is configured to display the indication information.

The processing unit is further configured to delete or retain the first picture based on the indication information.

In a feasible design, the display unit is configured to display a first interface. The first interface includes a first control, a second control, and a third control, the first control is configured to indicate whether to select the second picture, the second control is configured to indicate whether to select the posing score and the photographing suggestion, and the third control is configured to indicate whether to select the third picture.

The processing unit is further configured to generate the second picture, the expression score and the photographing suggestion, or the third picture based on an operation performed by a user in the first interface.

In a feasible design, before the sending unit sends the imaging effect of the first picture to the second electronic device, the processing unit is further configured to photograph the target object to obtain the first picture.

In a feasible design, before the sending unit sends the imaging effect of the first picture to the second electronic device, the processing unit is further configured to establish a network connection to the second electronic device.

The receiving unit is further configured to receive specification information of the display sent by the second electronic device.

In a feasible design, the posing score includes an expression score.

The processing unit is further configured to recognize at least one of lips, teeth, eyes, or cheeks of a face in the target region; and determine the expression score based on the at least one of the lips, the teeth, the eyes, or the cheeks.

In a feasible design, before the sending unit sends the imaging effect of the first picture to the second electronic device, the processing unit is further configured to extract the target region of the target object from the first picture; and process the target region based on the specification information of the display of the second electronic device, to obtain the second picture.

In a feasible design, the target region is a square, and the specification information includes a diameter of the display of the second electronic device. When processing the target region based on the specification information of the display of the second electronic device, to obtain the second picture, the processing unit is specifically configured to:

when the diameter is less than an edge length of the target region, scale down the first picture, so that an edge length of a target region in a scaled-down first picture is equal to the diameter; and crop the second picture from the scaled-down first picture by using a center of the target region as a reference point, where a scale-down rate is a ratio of the edge length to the diameter; or when the diameter exceeds a preset multiple of the edge length of the target region, scale up the first picture, so that an edge length of a target region in a scaled-up first picture is equal to the diameter; and crop the second picture from the scaled-up first picture by using a center of the target region as a reference point, where a scale-up rate is a ratio of the edge length to the diameter; or when the diameter is greater than the edge length of the target region and does not exceed the preset multiple of the edge length of the target region, crop the second picture from the first picture by using a center of the target region as a reference point.

In a feasible design, the target region is a square, and the specification information includes a length and a width of the display of the second electronic device. When processing the target region based on the specification information of the display of the second electronic device, to obtain the second picture, where the length is less than the width, the processing unit is specifically configured to:

when the length is less than a length of the target region, scale down the first picture, so that an edge length of a target region in a scaled-down first picture is equal to the length; and crop the second picture from the scaled-down first picture by using a center of the target region as a reference point, where a scale-down rate is a ratio of the edge length to the length; or when the length exceeds a preset multiple of the edge length of the target region, scale up the first picture, so that an edge length of a target region in a scaled-up first picture is equal to the length; and crop the second picture from the scaled-up first picture by using a center of the target region as a reference point, where a scale-up rate is a ratio of the edge length to the length; or when the length is greater than the edge length of the target region and does not exceed the preset multiple of the edge length of the target region, crop the second picture from the first picture by using a center of the target region as a reference point.

According to a fourth aspect, an embodiment of this application provides a picture transmission apparatus, including:

a receiving unit, configured to receive an imaging effect sent by a first electronic device, where the imaging effect includes a second picture and a posing score, the second picture includes a target region of a target object in the first picture, a shape of the second picture is the same as a shape of a display of the second electronic device, a difference between a size of the second picture and a size of the display of the second electronic device is less than a preset threshold, and the posing score is a score of posture and expression quality of the target object; and a display unit, configured to display the imaging effect.

In a feasible design, when there are a plurality of target objects, different target objects correspond to different second pictures, and the apparatus further includes:

a processing unit, configured to detect a screen switching operation input by a user.

The display unit is configured to switch to and display the second picture after the processing unit detects the screen switching operation input by the user.

In a feasible design, the imaging effect further includes a photographing suggestion, and the photographing suggestion is used to indicate a manner of adjusting an expression of the target object.

In a feasible design, the imaging effect further includes a third picture, the third picture is obtained by the first electronic device by scaling and/or cropping the first picture, a shape of the third picture is the same as the shape of the display of the second electronic device, and a difference between a size of the third picture and the size of the display of the second electronic device is less than the preset threshold.

In a feasible design, the apparatus further includes a sending unit.

The display unit is further configured to display a retain button and a delete button.

The processing unit is further configured to generate indication information based on an operation performed by the user on the retain button or the delete button. The indication information is used to indicate to delete or retain the first picture.

The sending unit is configured to send the indication information to the first electronic device.

According to a fifth aspect, an embodiment of this application provides an electronic device, including a processor, a memory, and a computer program that is stored in the memory and can run on the processor. When the processor executes the program, the electronic device is enabled to implement the method in the first aspect or the possible implementations of the first aspect.

According to a sixth aspect, an embodiment of this application provides an electronic device, including a processor, a memory, and a computer program that is stored in the memory and can run on the processor. When the processor executes the program, the electronic device is enabled to implement the method in the second aspect or the possible implementations of the second aspect.

According to a seventh aspect, an embodiment of this application provides an electronic device, including a logic circuit and an input interface. The input interface is configured to obtain to-be-processed data, and the logic circuit is configured to perform the method in the first aspect on the to-be-processed data to obtain processed data.

In a feasible design, the electronic device further includes an output interface, and the output interface is configured to output the processed data.

According to an eighth aspect, an embodiment of this application provides an electronic device, including a logic circuit and an input interface. The input interface is configured to obtain to-be-processed data, and the logic circuit is configured to perform the method in the second aspect on the to-be-processed data to obtain processed data.

In a feasible design, the electronic device further includes an output interface, and the output interface is configured to output the processed data.

According to a ninth aspect, an embodiment of this application provides a computer-readable storage medium. The computer-readable storage medium is configured to store a program. The program is executed by a processor to perform the method in the first aspect.

According to a tenth aspect, an embodiment of this application provides a computer-readable storage medium. The computer-readable storage medium is configured to store a program. The program is executed by a processor to perform the method in the second aspect.

According to an eleventh aspect, an embodiment of this application provides a computer program product. When the computer program product runs on an electronic device, the electronic device is enabled to perform the method in the first aspect.

According to a twelfth aspect, an embodiment of this application provides a computer program product. When the computer program product runs on an electronic device, the electronic device is enabled to perform the method in the second aspect.

According to the picture transmission method and apparatus provided in the embodiments of this application, a photographer inputs an operation instruction in a user interface of a first electronic device, to select a first picture whose imaging effect needs to be shared. The first electronic device processes the first picture based on specification information of a display of a second electronic device, to obtain each second picture and a posing score that are used to represent the imaging effect of the first picture. The posing score is a score of posture and expression quality of a target object. Then, the first electronic device sends each second picture and the posing score to the second electronic device, so that a user wearing the second electronic device can view the imaging effect of the first picture, and a photographed object does not need to move back and forth to the photographer to view a photographing effect, thereby improving photographing efficiency and improving photograph quality.

BRIEF DESCRIPTION OF THE DRAWINGS

FIG. 4A-1 and FIG. 4A-2 are a schematic diagram of an interface change process of a mobile phone in a picture transmission method according to an embodiment of this application;

FIG. 4B-1 and FIG. 4B-2 are a schematic diagram of an interface change process of a mobile phone in a picture transmission method according to an embodiment of this application;

FIG. 4C-1 and FIG. 4C-2 are a schematic diagram of an interface change process of a mobile phone in a picture transmission method according to an embodiment of this application;

FIG. 4D-1 and FIG. 4D-2 are a schematic diagram of an interface change process of a mobile phone in a picture transmission method according to an embodiment of this application;

FIG. 5A-1 to FIG. 5A-3 are a schematic diagram of an interface change process of a mobile phone in a picture transmission method according to an embodiment of this application;

FIG. 5B-1 to FIG. 5B-3 are a schematic diagram of an interface change process of a mobile phone in a picture transmission method according to an embodiment of this application;

FIG. 5C-1 to FIG. 5C-3 are a schematic diagram of an interface change process of a mobile phone in a picture transmission method according to an embodiment of this application;

DETAILED DESCRIPTION OF ILLUSTRATIVE EMBODIMENTS

Currently, performance of a camera in a mobile terminal such as a mobile phone is continuously optimized, and there are increasing scenarios in which people use mobile terminals to perform photographing. At the same time, with improvement of aesthetic levels, people have growing requirements for a layout of a photograph, an expression of a person, and the like. In a scenario in which a photographer is far away from a user or in another scenario in which communication is not convenient, the user or the photographer needs to continually move to a position of the other party, to communicate with respect to an imaging effect of a photograph. For example, refer to FIG. 1.

Figure 1:
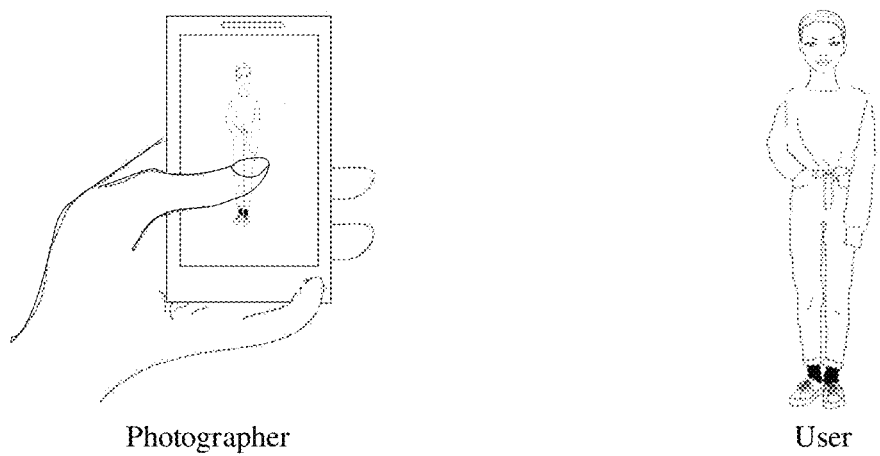
FIG. 1 is a schematic diagram of an existing photograph taking process.

FIG. 1 is a schematic diagram of an existing photograph taking process. As shown in FIG. 1, a photographer is far away from a user (that is, a photographed object). After a photograph is taken, the user moves to the photographer to view an imaging effect such as an overall layout and an expression of a person in the photograph. If dissatisfied, the user returns to an original position for posing.

In the foregoing scenario in which the photographer is far away from the user or in another scenario in which communication is not convenient, the photographer or the user needs to move back and forth to a position of the other party, to communicate with respect to an imaging effect. Obviously, the process is relatively time-consuming, and even a photograph with a good effect cannot be taken. Therefore, how the user obtains an effect of a photograph taken by the photographer is a problem to be resolved urgently.

In view of this, embodiments of this application provide a picture transmission method and device. A first electronic device sends an imaging effect of a taken picture to a second electronic device of a user, so that the user can view the imaging effect of the picture taken by the first electronic device, thereby improving photographing efficiency and improving quality of the taken picture.

Figure 2:
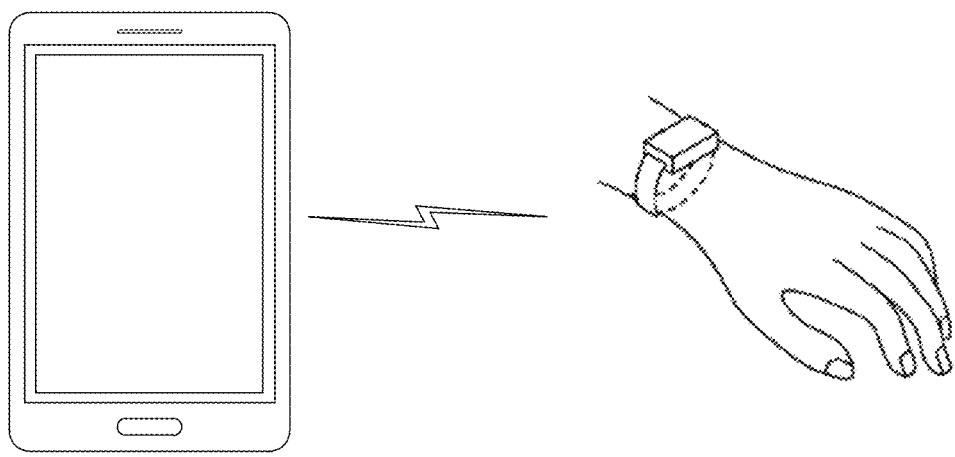
FIG. 2 is a schematic diagram of a network architecture of a picture transmission method according to an embodiment of this application.

FIG. 2 is a schematic diagram of a network architecture of a picture transmission method according to an embodiment of this application. Referring to FIG. 2, a first electronic device 1 establishes a wireless connection to a second electronic device 2. The wireless connection includes, but is not limited to, Bluetooth, Wi-Fi, and the like. The first electronic device 1 is an electronic device having a photographing function, and the second electronic device 1 is an electronic device having a display that can display a picture. The first electronic device 1 processes a first picture based on screen specification information and the like of the second electronic device 2, to obtain an imaging effect of the first picture, and sends the imaging effect to the second electronic device 2, so that a user can view the imaging effect of the first picture by using the second electronic device 2. For example, a photographer is far away from a user, and the photographer uses the first electronic device 1 to photograph the user. After taking a first picture, the photographer sends an imaging effect of the first picture to the user wearing the second electronic device, so that the user can view the imaging effect of the first picture. The screen specification information includes a shape, a size, and the like of a screen of a smartwatch. The imaging effect may be a thumbnail of the first picture, a face region of a person in the first picture, a posing score+a photographing suggestion, and the like. The posing score may be an expression score, a posture score, or the like. This is not limited in this embodiment of this application. The first electronic device 1 may be a mobile phone, a tablet computer, or the like of the photographer or the user. The second electronic device 2 may be a smart wearable device of the user, such as a smartwatch, a smart band, or smart glasses.

Although the network architecture to which this embodiment of this application is applicable is described above in detail by using an example shown in FIG. 2 in which the first electronic device 1 is a mobile phone and the second electronic device 2 is a smartwatch, this embodiment of this application is not limited thereto. For example, in another feasible design, the first electronic device 1 is a motion camera or an unmanned aerial photographing apparatus, and the second electronic device 2 is a mobile phone, a tablet computer, or the like. In this case, the motion camera, the unmanned aerial photographing apparatus, or the like sends a taken first picture to the mobile phone, and the mobile phone processes the first picture based on screen specification information of the smartwatch, to obtain an imaging effect of the first picture, and displays the imaging effect for viewing by the user.

Figure 3:
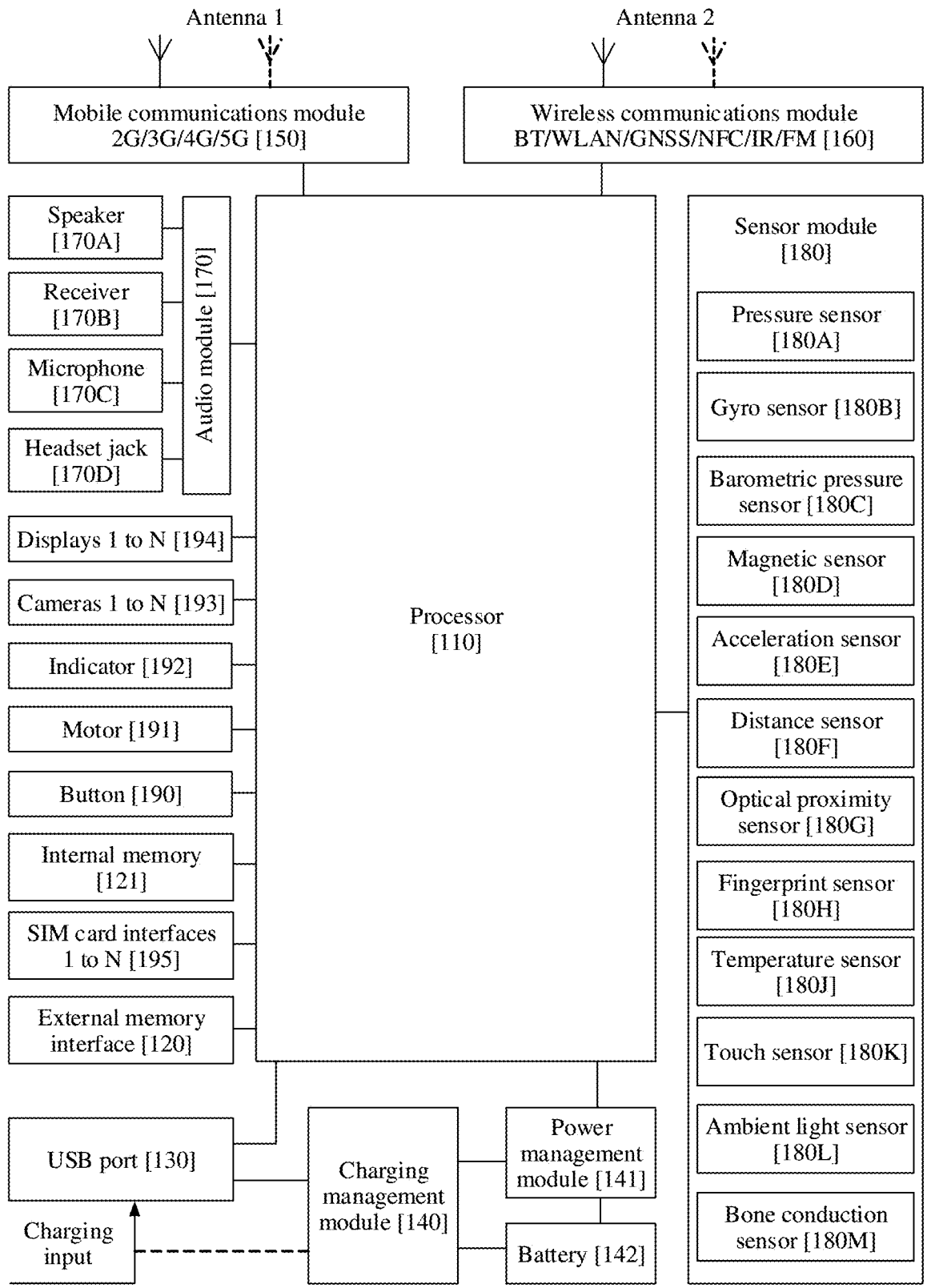
FIG. 3 is a schematic diagram of an electronic device configured to perform a picture transmission method according to an embodiment of this application.

For a structure of the electronic device in the foregoing network architecture, including the first electronic device 1 and the second electronic device 2, refer to FIG. 3. FIG. 3 is a schematic diagram of an electronic device configured to perform a picture transmission method according to an embodiment of this application. Refer to FIG. 3, in this embodiment of this application, the electronic device may include a processor no, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor 180, a button 190, a motor 191, an indicator 192, a camera 193, a display 194, a subscriber identity module (subscriber identity module, SIM) card interface 195, and the like. It may be understood that the structure shown in this embodiment does not constitute a specific limitation on the electronic device.

In some other embodiments of this application, the electronic device may include more or fewer components than those shown in the figure, combine some components, split some components, or have different component arrangements. For example, when the electronic device is a smartwatch or a smart band, the smartwatch does not need to be provided with one or more of the SIM card interface 195, the camera 193, the button 190, the receiver 170B, the microphone 170C, the headset jack 170D, the external memory interface 120, and the USB poll 130. For another example, when the electronic device is a smart headset, the smart headset does not need to be provided with one or more of the SIM card interface 195, the camera 193, the display 194, the receiver 170B, the microphone 170C, the headset jack 170D, the external memory interface 120, the USB poll 130, and some sensors (for example, a gyro sensor 180B, a barometric sensor 180C, a magnetic sensor 180D, an acceleration sensor 180E, a distance sensor 180F, and a fingerprint sensor 180H) in the sensor 180. The components shown in the figure may be implemented by using hardware, software, or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors. In some embodiments, the electronic device may alternatively include one or more processors no. The controller may be a nerve center and a command center of the electronic device. The controller may generate an operation control signal based on an instruction operation code and a time sequence signal, to complete control of instruction fetching and instruction execution. A memory may be disposed in the processor 110, and is configured to store instructions and data. In some embodiments, the memory in the processor 110 is a cache. The memory may store instructions or data that has been used or is cyclically used by the processor 110. If the processor no needs to use the instructions or the data again, the processor may directly invoke the instructions or the data from the memory. This avoids repeated access, and reduces a waiting time of the processor 110, thereby improving efficiency of the electronic device.

In some embodiments, the processor no may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like. The USB poll 130 is a port that conforms to a USB standard specification, and may be specifically a mini USB port, a micro USB port, a USB type-C port, or the like. The USB port 130 may be configured to connect to the charger to charge the electronic device, or may be configured to perform data transmission between the electronic device and a peripheral device, or may be configured to connect to a headset to play audio by the headset.

It may be understood that an interface connection relationship between the modules that is shown in this embodiment of the present invention is merely an example for description, and does not constitute a limitation on a structure of the electronic device. In some other embodiments of this application, the electronic device may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device. The charging management module 140 may further supply power to the electronic device by using the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same component.

A wireless communication function of the electronic device may be implemented by using the antenna 1, the antenna 2, the mobile communications module 150, the wireless communications module 160, the modem processor, the baseband processor, and the like. The antenna 1 and the antenna 2 are configured to receive and transmit electromagnetic wave signals. Each antenna in the electronic device may be configured to cover one or more communication bands. Different antennas may be multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution for wireless communication including 2G/3G/4G/5G and the like to be applied to the electronic device. The mobile communications module 150 may include at least one filter, switch, power amplifier, low noise amplifier, or the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave through the antenna 1 for radiation. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communications module 150 or another functional module.

The wireless communications module i6o may provide a solution for wireless communication including a wireless local area network (wireless local area network, WLAN), Bluetooth, a global navigation satellite system (global navigation satellite system, GNSS), frequency modulation (frequency modulation, FM), NFC, an infrared (infrared, IR) technology, and the like to be applied to the electronic device. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation.

In some embodiments, the antenna 1 and the mobile communications module 150 in the electronic device are coupled, and the antenna 2 and the wireless communications module 160 in the electronic device are coupled, so that the electronic device can communicate with a network and another device by using a wireless communications technology. The wireless communications technology may include technologies such as GSM, GPRS, CDMA, WCDMA, TD-SCDMA, LTE, GNSS, WLAN, NFC, FM, and/or IR. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device may include one or more displays 194.

The electronic device may implement a photographing function by using the ISP, one or more cameras 193, the video codec, the GPU, one or more displays 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more types of video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device, for example, image recognition, facial recognition, speech recognition, and text understanding, may be implemented through the NPU.

The external memory interface 120 may be used to connect to an external storage card, for example, a micro SD card, to extend a storage capability of the electronic device. The external storage card communicates with the processor 110 through the external memory interface 120, to implement a data storage function. For example, data files such as music, photographs, and videos are stored in the external memory card.

The internal memory 121 may be configured to store one or more computer programs. The one or more computer programs include instructions. The processor 110 may run the instructions stored in the internal memory 121, to enable the electronic device to perform a voice switching method provided in some embodiments of this application, various functional applications and data processing, and the like. The internal memory 121 may include a program storage area and a data storage area. The program storage area may store an operating system. The program storage area may further store one or more application programs (for example, a gallery or a contact) and the like. The data storage area may store data (for example, a photograph or a contact) created in a process of using the electronic device, and the like. In addition, the internal memory 121 may include a high-speed random access memory, and may further include a nonvolatile memory, for example, at least one magnetic disk storage device, a flash memory device, or a universal flash storage (universal flash storage, UFS). In some embodiments, the processor no may run the instructions stored in the internal memory 121 and/or the instructions stored in the memory disposed in the processor no, to enable the electronic device to perform the voice switching method provided in the embodiments of this application, and various functional applications and data processing.

The electronic device may implement an audio function, for example, music playing and recording, through the audio module 170, the speaker 170A, the receiver 170B, the microphone 170C, the headset jack 170D, the application processor, and the like. The audio module 170 is configured to convert digital audio information into an analog audio signal output, and is also configured to convert an analog audio input into a digital audio signal. The audio module 170 may be configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device may listen to music or answer a hands-free call by using the speaker 170A.

The receiver 170B, also referred to as an "earpiece", is configured to convert an electrical audio signal into a sound signal. When a call is answered or audio information is listened to by using the electronic device, the receiver 170B may be put close to a human ear to listen to a voice.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device. In some other embodiments, two microphones 170C may be disposed in the electronic device, to collect a sound signal and further implement a noise reduction function. In some other embodiments, three, four, or more microphones 170C may alternatively be disposed in the electronic device, to collect a sound signal, implement noise reduction, identify a sound source, implement a directional recording function, and the like.

The headset jack 170D is configured to connect to a wired headset. The headset jack 170D may be the USB port 130 or a 3.5 mm open mobile terminal platform (open mobile terminal platform, OMTP) standard interface or a cellular telecommunications industry association of the USA (cellular telecommunications industry association of the USA, CTIA) standard interface.

The sensor 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines pressure intensity based on a capacitance change. When a touch operation is performed on the display 194, the electronic device detects intensity of the touch operation through the pressure sensor 180A. The electronic device may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating an SMS message is executed.

The gyro sensor 180B may be configured to determine a motion posture of the electronic device. In some embodiments, an angular velocity of the electronic device around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the electronic device jitters, calculates, based on the angle, a distance for which a lens module needs to compensate, and allows the lens to cancel the jitter of the electronic device through reverse motion, to implement image stabilization. The gyro sensor 180B may be used in a navigation scenario and a motion-sensing game scenario.

The acceleration sensor 180E may detect accelerations in various directions (usually on three axes) of the electronic device. When the electronic device is still, a magnitude and a direction of gravity may be detected. The acceleration sensor 180E may be configured to recognize a posture of the electronic device, and is used in an application such as switching between landscape mode and portrait mode or a pedometer.

The distance sensor 180F is configured to measure a distance. The electronic device may measure a distance in an infrared manner or a laser manner. In some embodiments, in a photographing scenario, the electronic device may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device emits infrared light by using the light-emitting diode. The electronic device detects infrared reflected light from a nearby object by using the photodiode. When sufficient reflected light is detected, the electronic device may determine that there is an object near the electronic device. When insufficient reflected light is detected, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device is in a pocket, to avoid an accidental touch.

The fingerprint sensor 180H (also referred to as a fingerprint reader) is configured to collect a fingerprint. The electronic device may use a feature of the collected fingerprint to implement fingerprint-based unlocking, application lock access, fingerprint-based photographing, fingerprint-based call answering, and the like. In addition, for a further description of the fingerprint sensor, refer to International Patent Application PCT/CN2017/082773 entitled "NOTIFICATION PROCESSING METHOD AND ELECTRONIC EQUIPMENT", which is incorporated herein by reference in its entirety.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The temperature sensor 180J may collect temperature data. The temperature sensor 180J may include a contact temperature sensor and a non-contact temperature sensor. The contact temperature sensor needs to be in contact with a to-be-measured object, including a heat flux sensor, a skin temperature sensor, and the like. The non-contact temperature sensor may collect temperature data without contact with a to-be-measured object. It may be understood that temperature measurement principles of the temperature sensors are different. In this embodiment of this application, one or more temperature sensors may be disposed in the electronic device.

The button 190 includes a power button, a volume button, and the like. The button 190 may be a mechanical button, or may be a touch button. The electronic device may receive a button input, and generate a button signal input related to user settings and function control of the electronic device.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, time reminding, information receiving, an alarm clock, and a game) may also correspond to different vibration feedback effects. A touch vibration feedback effect may be customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted into the SIM card interface 195 or removed from the SIM card interface 195, to implement contact with or separation from the electronic device. The electronic device may support one or more SIM card interfaces. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device interacts with a network through the SIM card, to implement functions such as calling and data communication. In some embodiments, the electronic device uses an eSIM, namely, an embedded SIM card. The eSIM card may be embedded in the electronic device and cannot be detached from the electronic device.

When the electronic device in FIG. 3 is a first electronic device, the electronic device may be a mobile phone, a personal digital assistant (personal digital assistant, PDA), a tablet computer (Personal Access Device, PAD), a motion camera, an unmanned aerial photographing apparatus, a navigation apparatus, or the like. When the electronic device in FIG. 3 is a second electronic device, the electronic device may be a smartwatch, a smart band, a smart headset, smart glasses, a mobile phone, another wearable device, or the like. This is not limited in this application.

The following describes the picture transmission method in the embodiments of this application based on the architecture shown in FIG. 2 by using an example in which the first electronic device 1 is a mobile phone and the second electronic device 2 is a smartwatch.

First, how to enable a function of the mobile phone to transmit an imaging effect is described. For example, refer to FIG. 4A-1 to FIG. 4D-2.

Figures 1, 2, 4A:
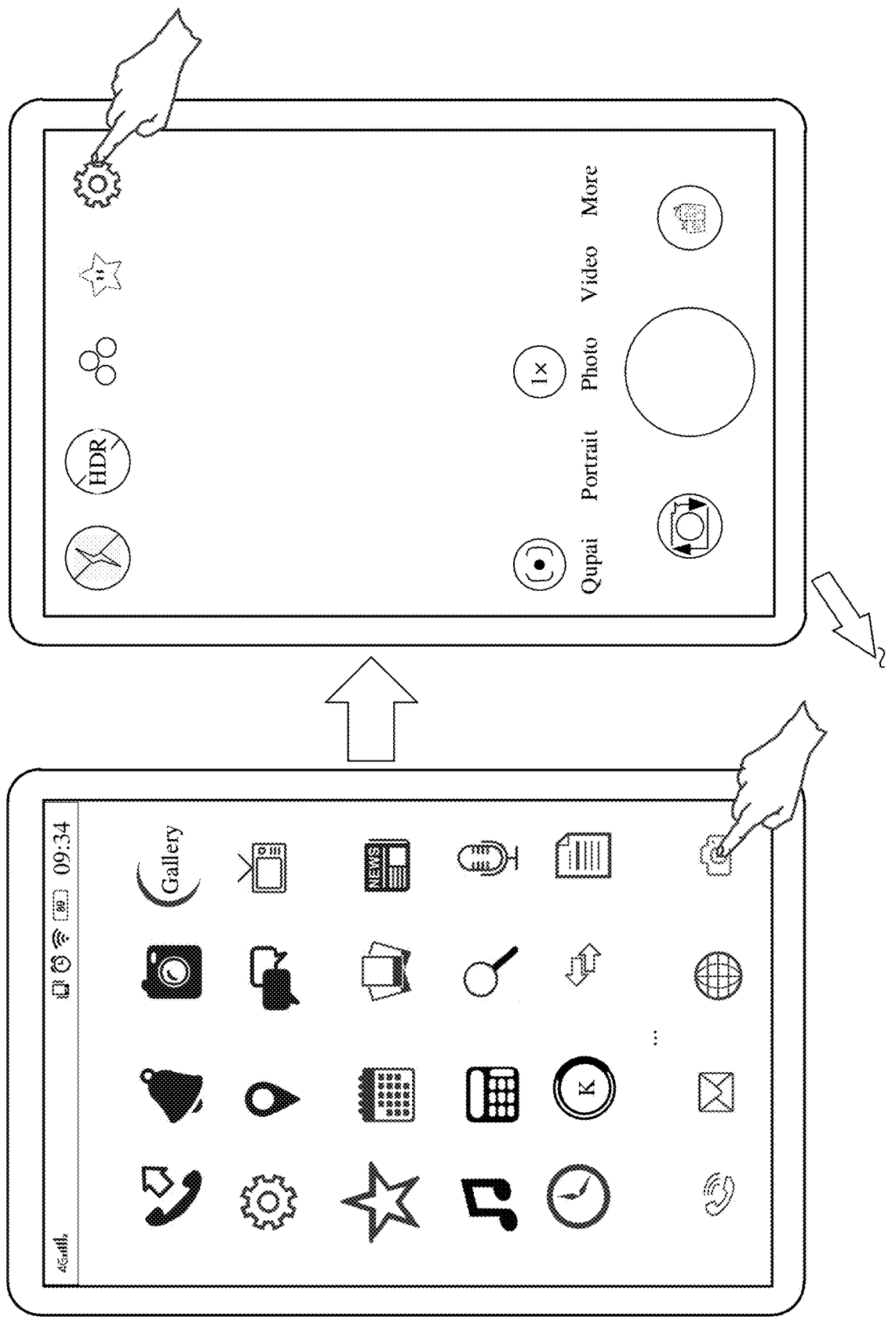
Figure 4A:
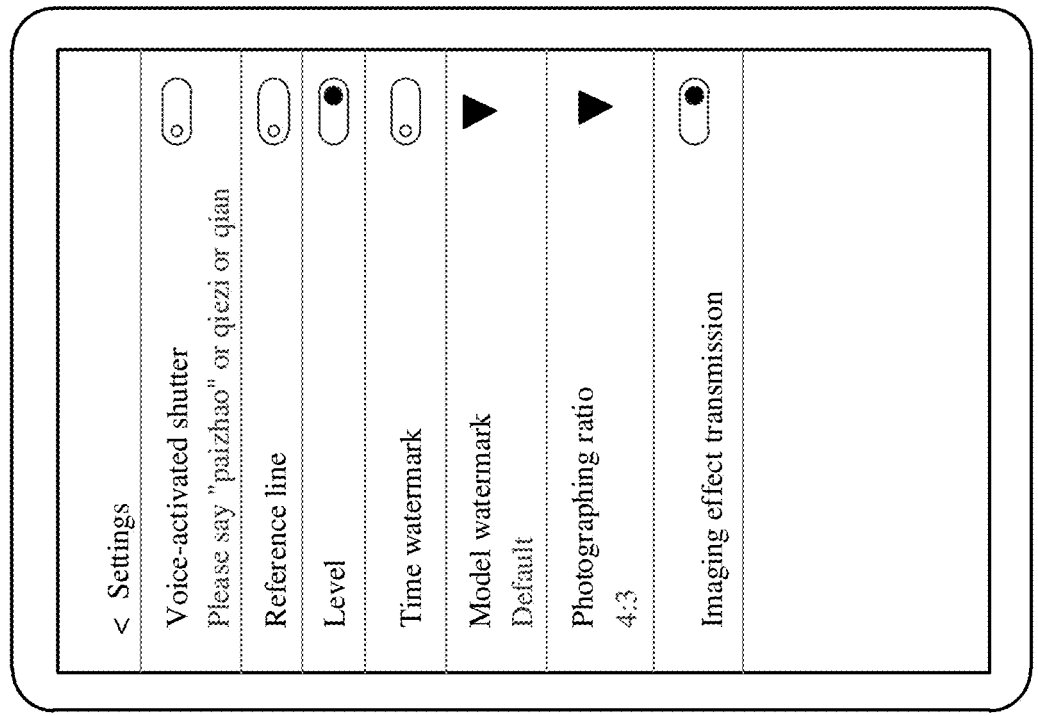
Figure 2:
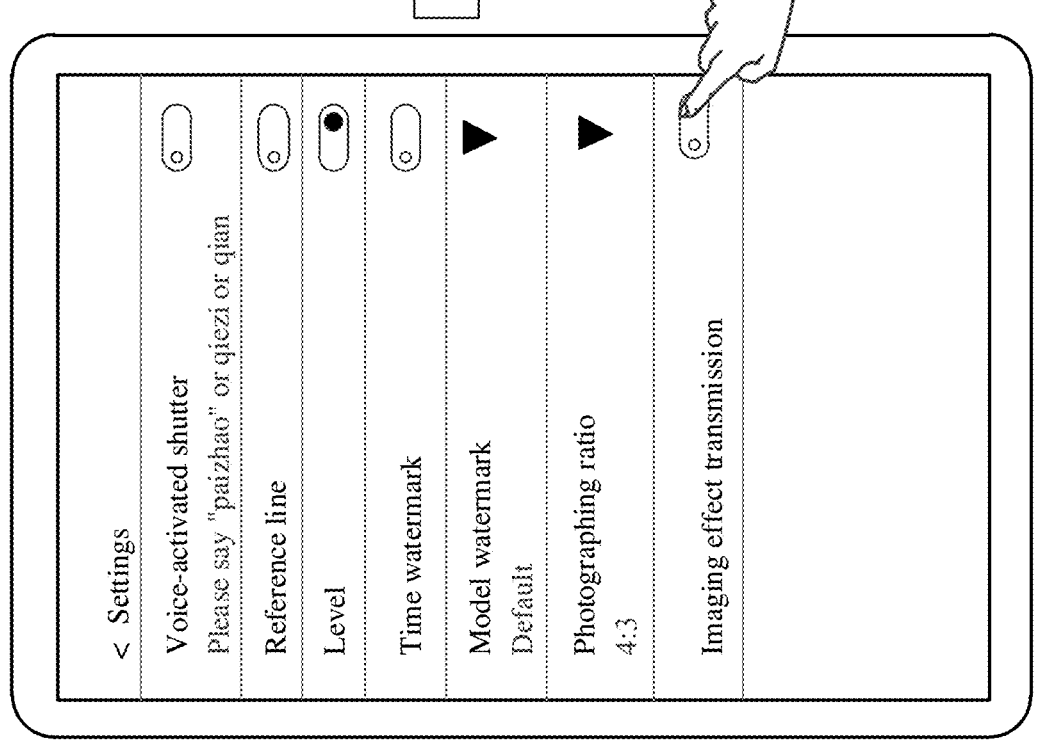

FIG. 4A-1 and FIG. 4A-2 are a schematic diagram of an interface change process of a mobile phone in a picture transmission method according to an embodiment of this application. Referring to FIG. 4A-1 and FIG. 4A-2, the photographer taps a camera icon on a display of the mobile phone, to enter a photographing interface. Then, the photographer selects a "settings" icon in the photographing interface to enter a setting interface. Then, the photographer turns on a switch of an "imaging effect transmission" function to set the mobile phone, so that after taking a first picture, the mobile phone sends an imaging effect of the first picture to the smartwatch automatically or as triggered by the photographer.

Figures 1, 4B:
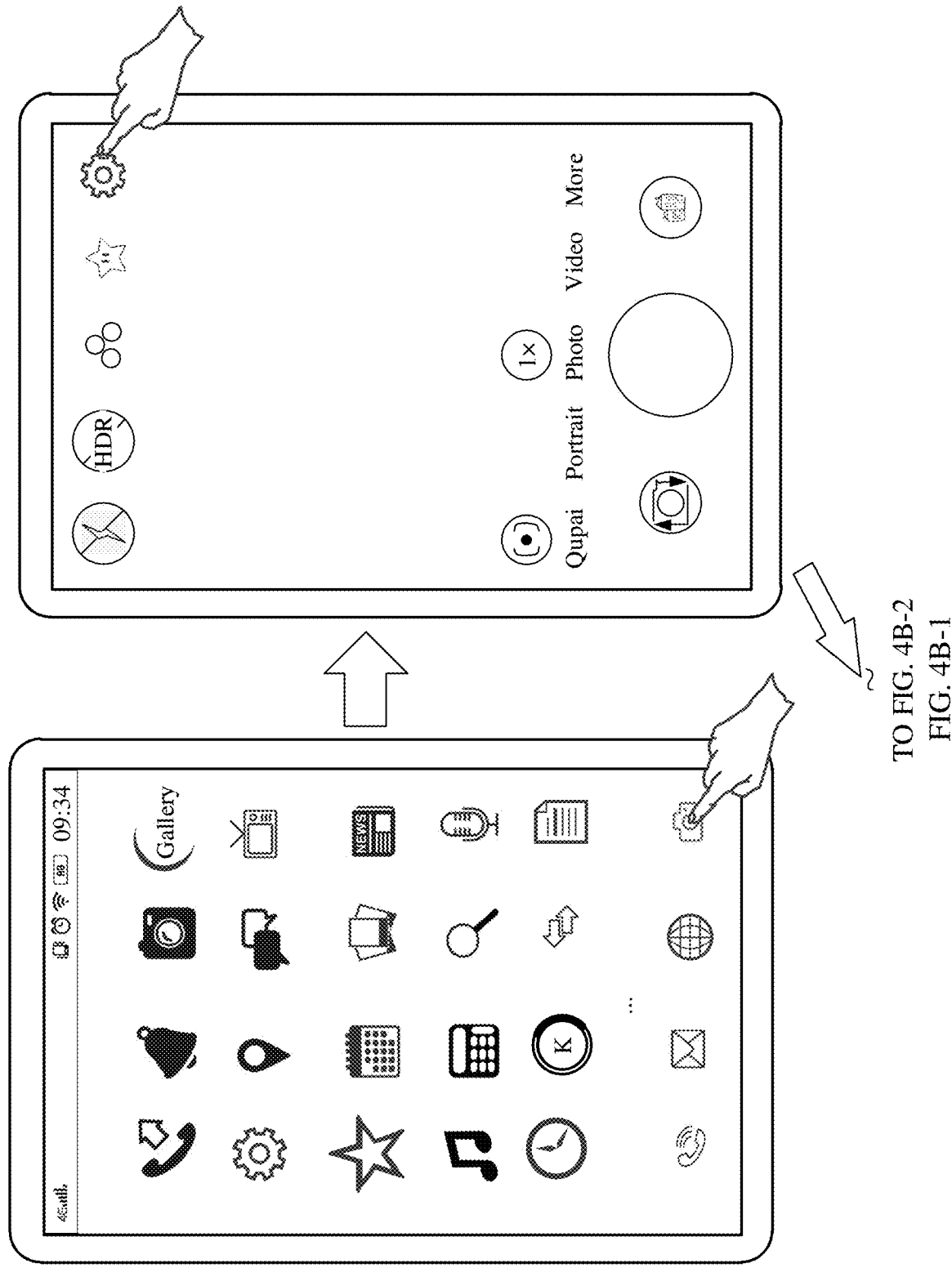
Figure 4B:
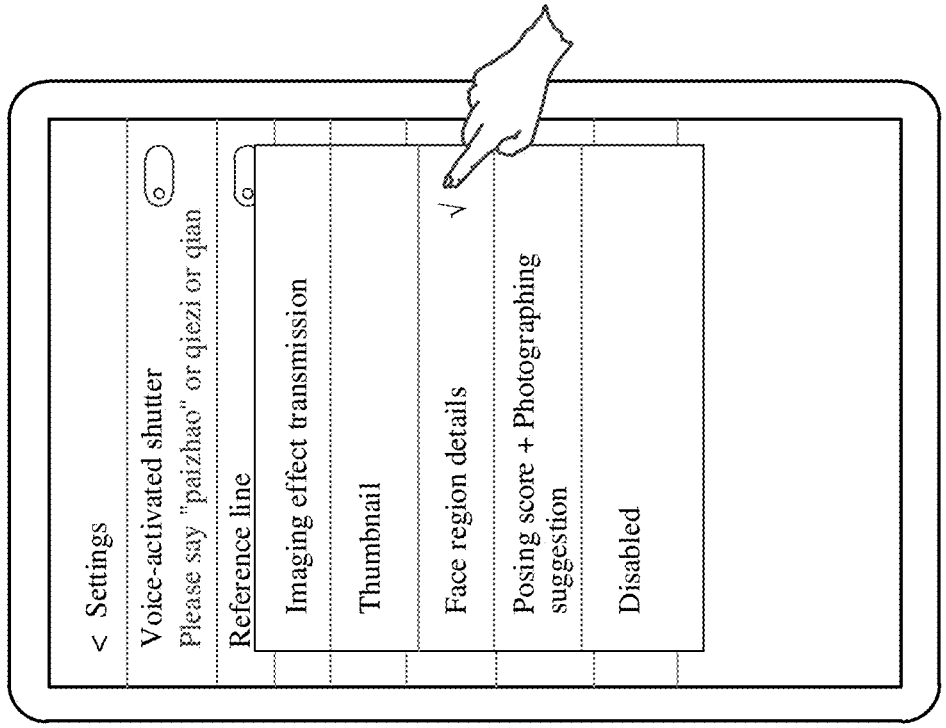
Figure 2:
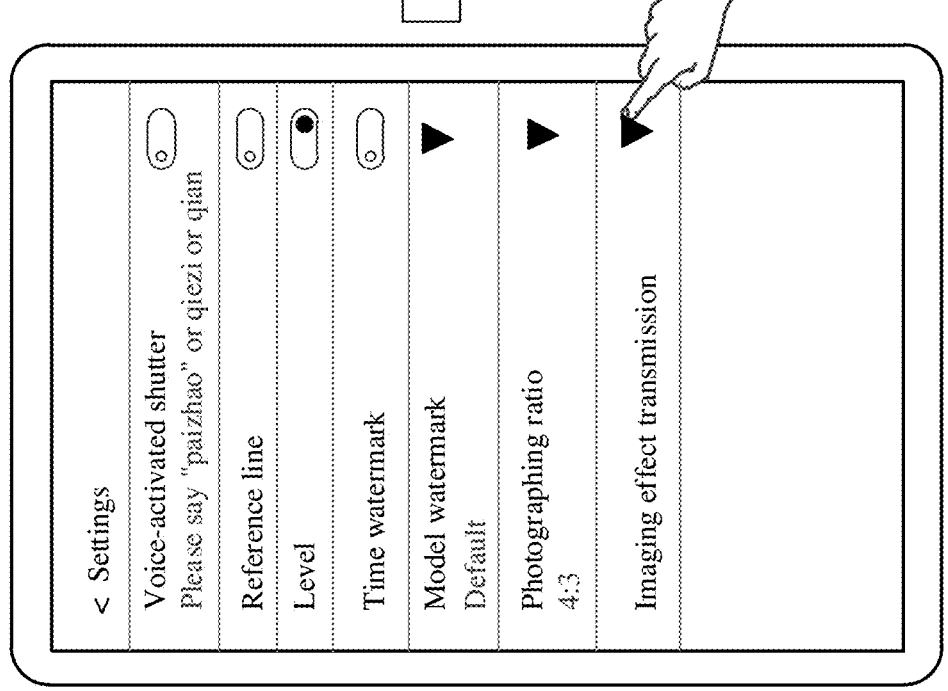

FIG. 4B-1 and FIG. 4B-2 are a schematic diagram of an interface change process of a mobile phone in a picture transmission method according to an embodiment of this application. Referring to FIG. 4B-1 and FIG. 4B-2, when the mobile phone currently establishes wireless connections to a plurality of smart wearable devices, a floating window is displayed after the photographer taps a drop-down list of "imaging effect transmission" in a setting interface, and the floating window displays to-be-transmitted objects for selection by the photographer, for example, a thumbnail, a face region detail, and a posing score +a photographing suggestion. The photographer may select one or more from the to-be-selected objects.

In addition, if the photographer needs to transmit an original picture to the smartwatch, in FIG. 4B-1 and FIG. 4B-2, the to-be-transmitted objects may further include the original picture and the like.

Figures 1, 4C:
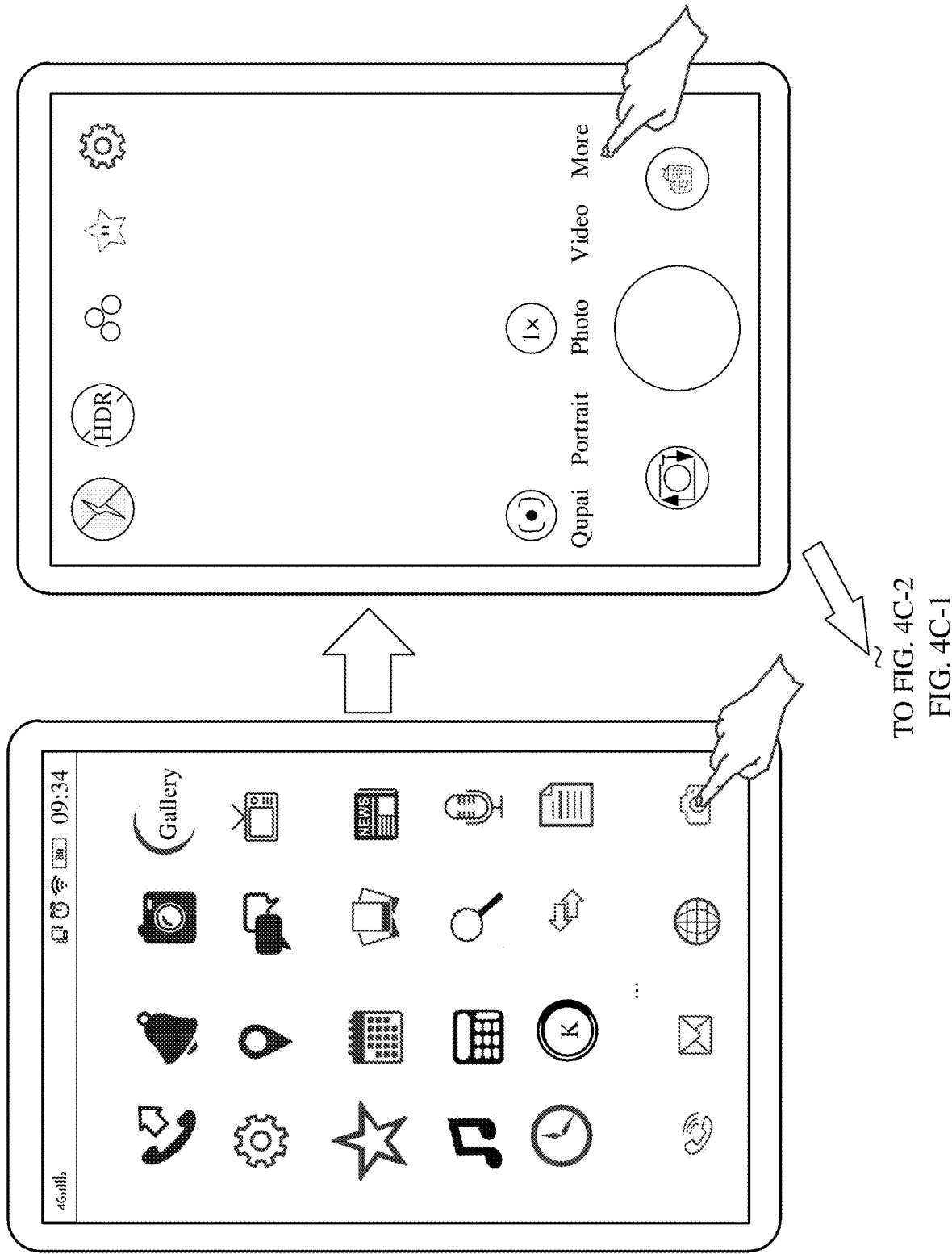
Figure 4C:
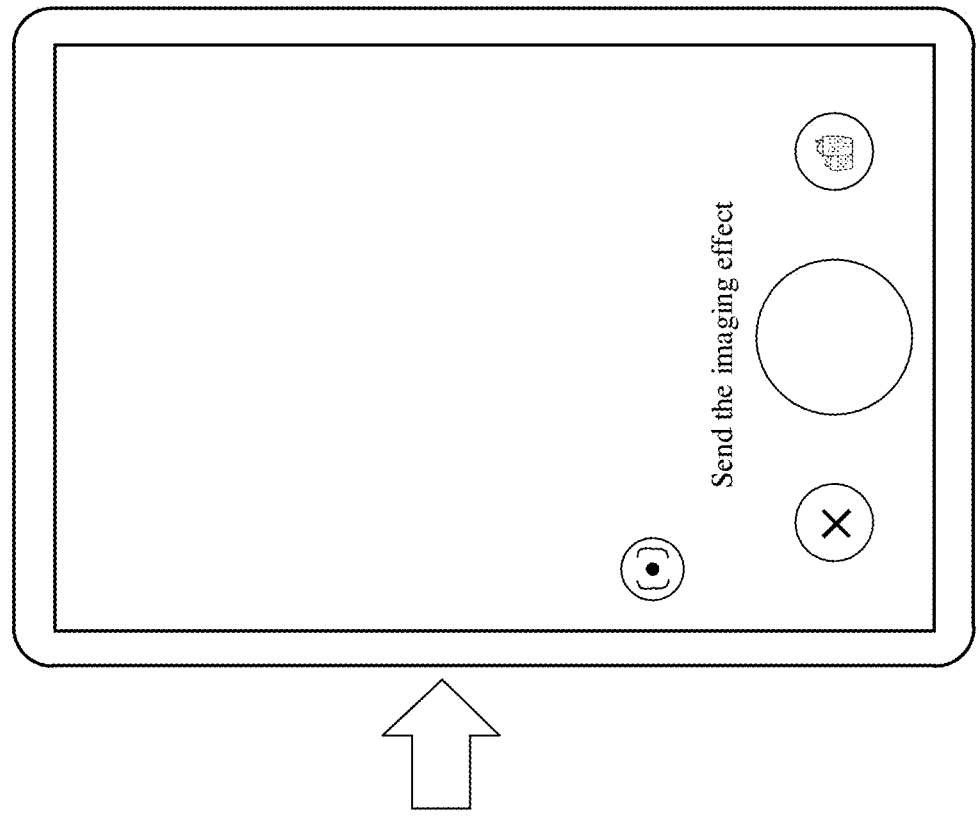
Figure 2:
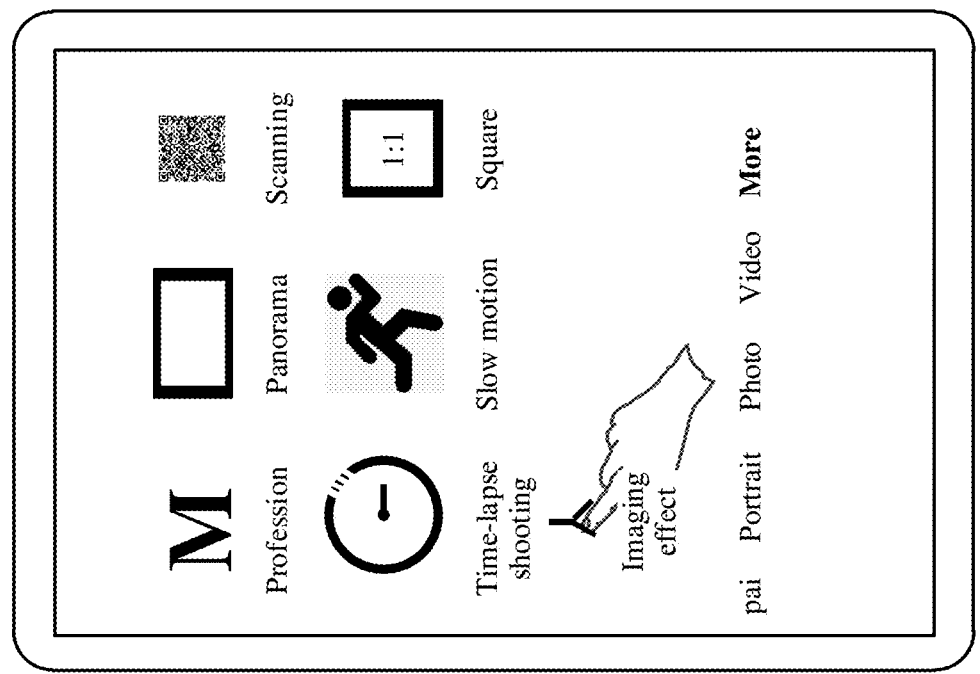

FIG. 4C-1 and FIG. 4C-2 are a schematic diagram of an interface change process of a mobile phone in a picture transmission method according to an embodiment of this application. Referring to FIG. 4C-1 and FIG. 4C-2, the photographer taps a camera icon on a display of the mobile phone, to enter a photographing interface. Then, the photographer selects a "more" icon in the photographing interface to enter a detail interface of "more". Then, the photographer selects an "imaging effect" in the detail interface, and the camera jumps to an interface in an "imaging effect sending" mode. Then, after taking a first picture, the mobile phone sends an imaging effect of the first picture to the smartwatch automatically or as triggered by the photographer.

Figures 1, 4D:
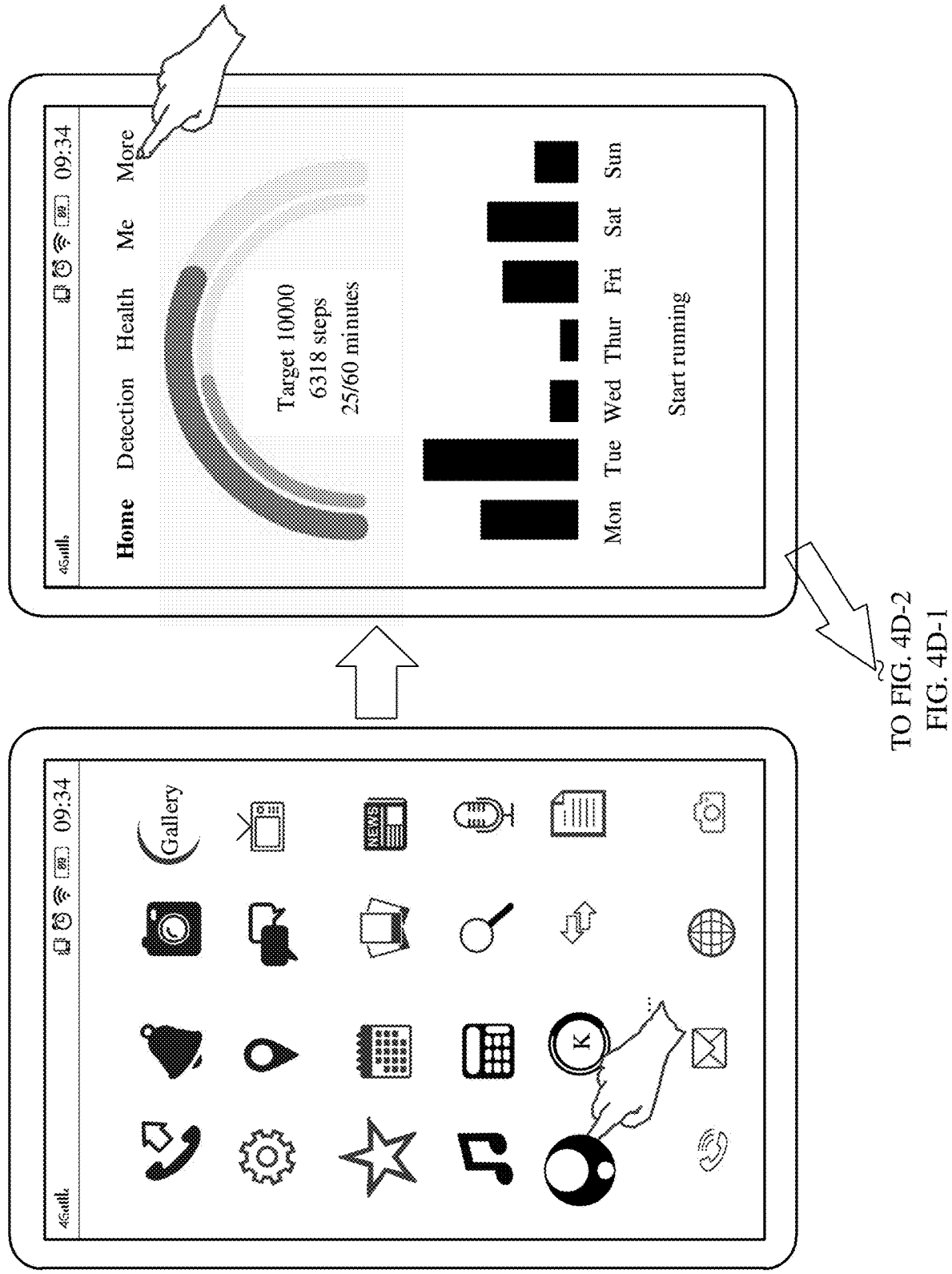

FIG. 4D-1 and FIG. 4D-2 are a schematic diagram of an interface change process of a mobile phone in a picture transmission method according to an embodiment of this application. Referring to FIG. 4D-1 and FIG. 4D-2, an application (application, APP) for controlling the smartwatch is installed on the mobile phone. The APP is, for example, a spoils health APP. The photographer taps a spoils health APP icon on a display of the mobile phone, to enter an APP interface. Then, the photographer taps a "more" button in the APP interface to enter a detail interface of "more". The photographer continues to tap a drop-down list of "imaging effect transmission" in the detail interface, the mobile phone displays a floating window, and the floating window displays to-be-transmitted objects for selection by the photographer, for example, a thumbnail, a face region detail, and a posing score+a photographing suggestion. The photographer may select one or more from the to-be-selected objects.

Second, how to select a first picture and share an imaging effect is described. For example, refer to FIG. 5A-1 to FIG. 5I.

Figures 1, 2, 5A:
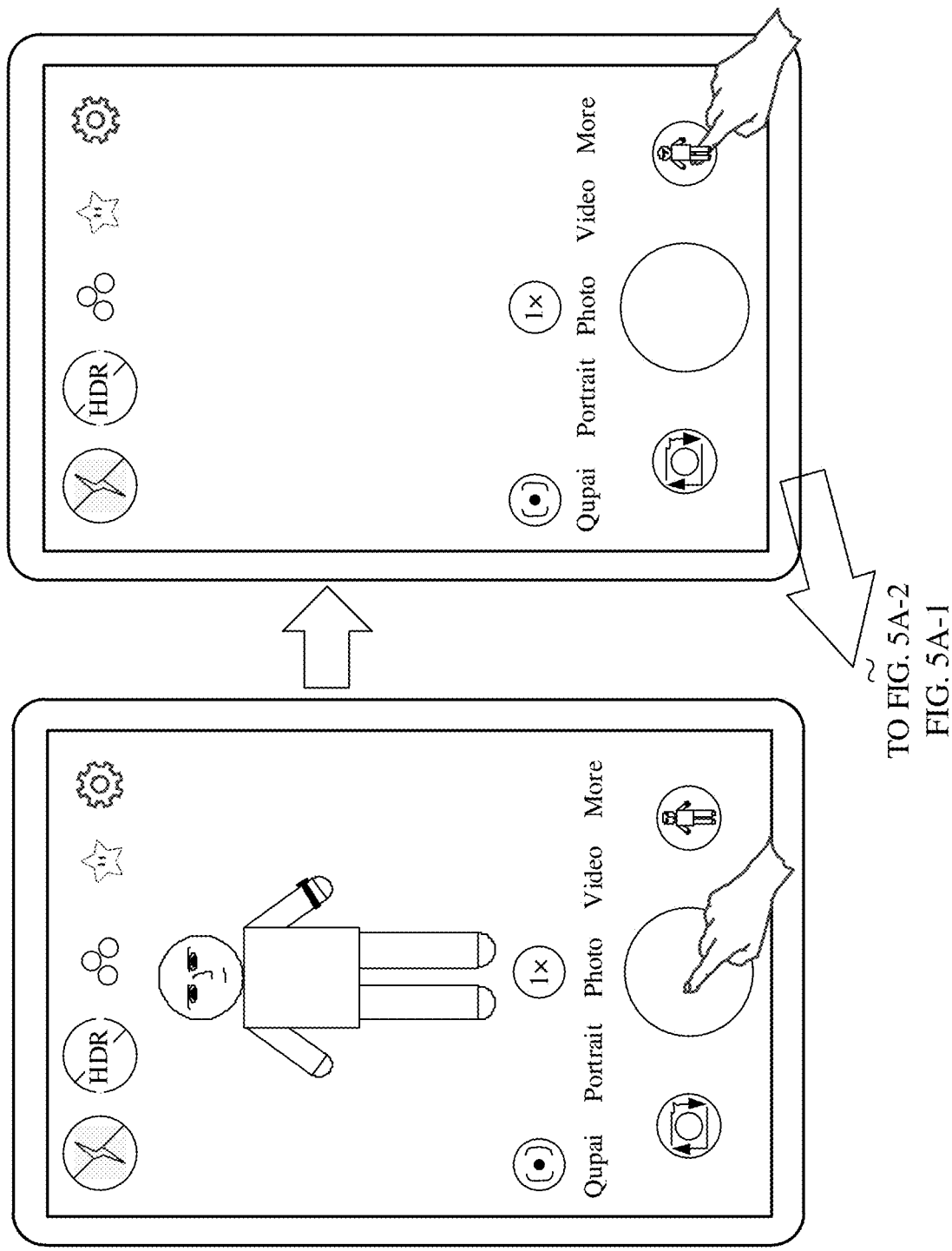
Figure 5A:
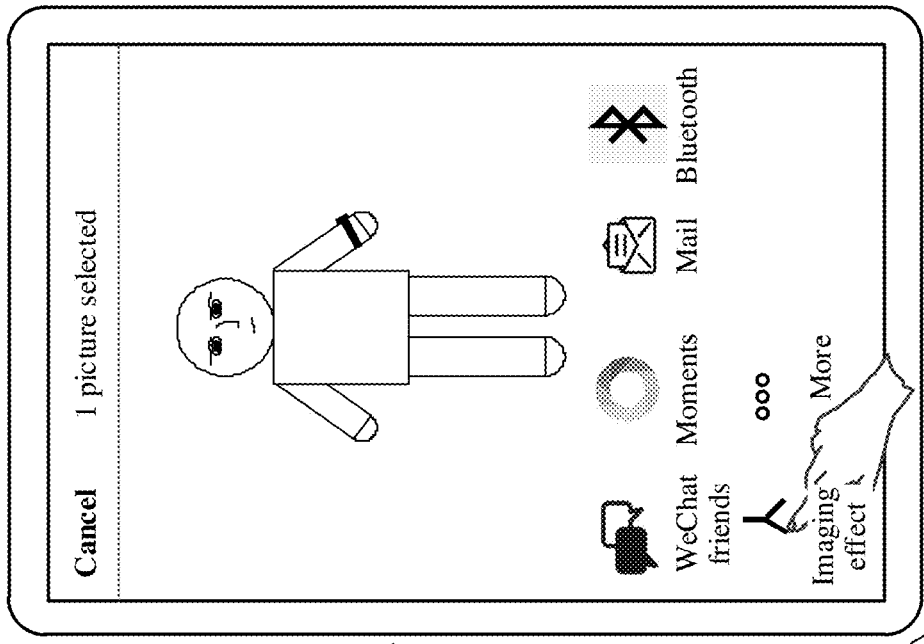
Figure 2:
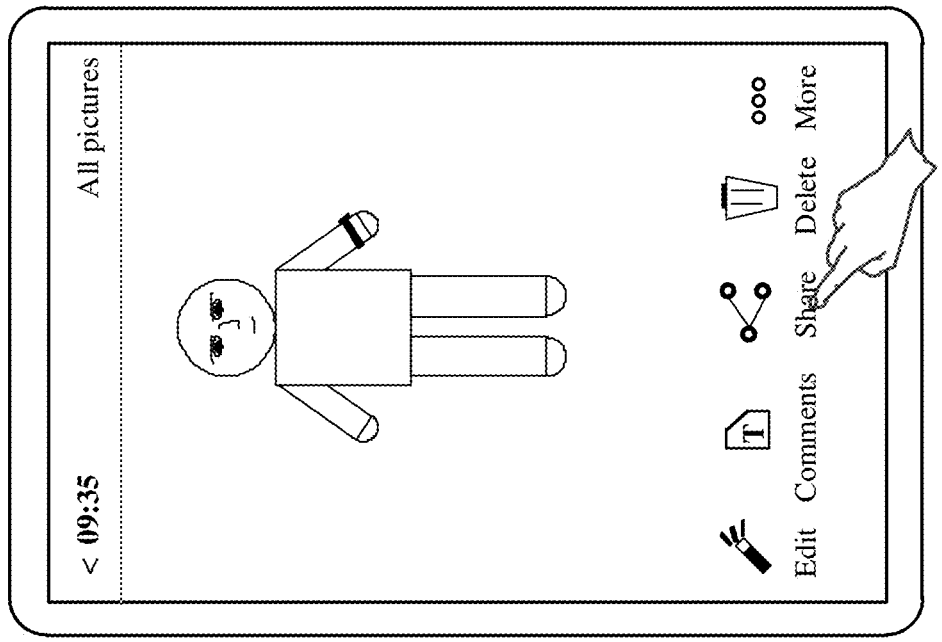
Figures 3, 5A:
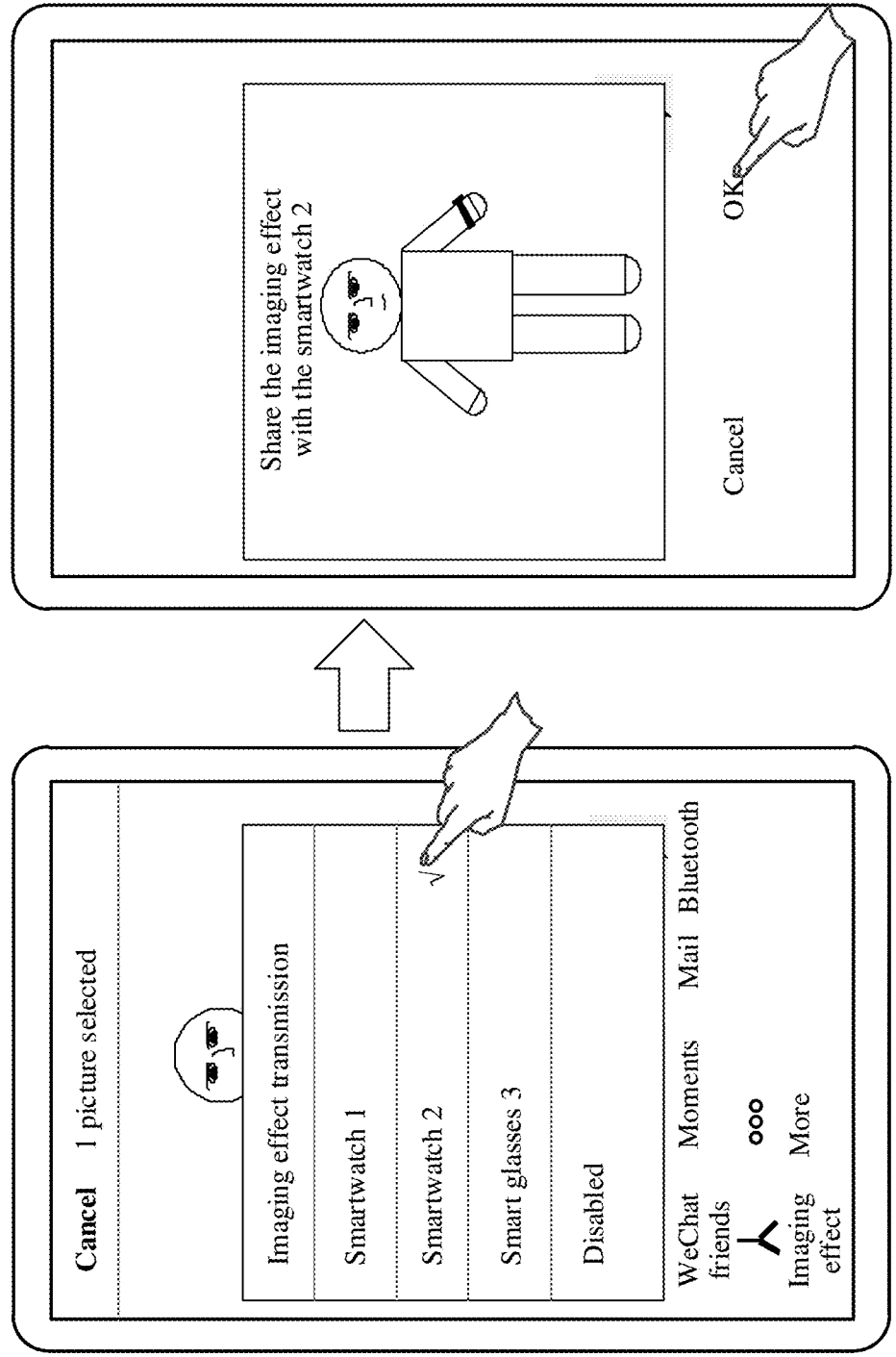

FIG. 5A-1 to FIG. 5A-3 are a schematic diagram of an interface change process of a mobile phone in a picture transmission method according to an embodiment of this application. Referring to FIG. 5A-1 to FIG. 5A-3, after the user poses, the photographer adjusts a position of the mobile phone so that the user is at a proper position of a viewfinder frame, and taps a photographing button to generate a first picture. The first picture is saved in an album by default. Then, the photographer taps the album, and the mobile phone displays the first picture. At the same time, buttons such as "edit", "comment", "share", and "delete" are displayed at a lower part of the screen of the mobile phone. The photographer continues to tap the "share" button, and a series of sharing channels are displayed at the lower part of the mobile phone. The sharing channels include imaging effect sharing. After the photographer taps an "imaging effect sharing" button, a floating window is displayed in an interface of the mobile phone, and the floating window displays smart wearable devices that establish network connections to the mobile phone. The photographer may select one or more from the smart wearable devices. In the figure, the photographer selects a smartwatch 2. Then, a prompt box appears on the screen of the mobile phone, to ask whether the photographer needs to send an imaging effect of the first picture to the smartwatch 2. The photographer taps a "cancel" or "send" button to choose whether to send the imaging effect. After the tap, the screen of the mobile phone jumps to the photographing interface.

In FIG. 5A-1 to FIG. 5A-3, the mobile phone is connected to a plurality of smart wearable devices at the same time. Therefore, the photographer needs to be prompted to select a smart wearable device to share an imaging effect. When only one smart wearable device is connected to the mobile phone, the photographer does not need to be prompted to select the smart wearable device.

Figure 5B:
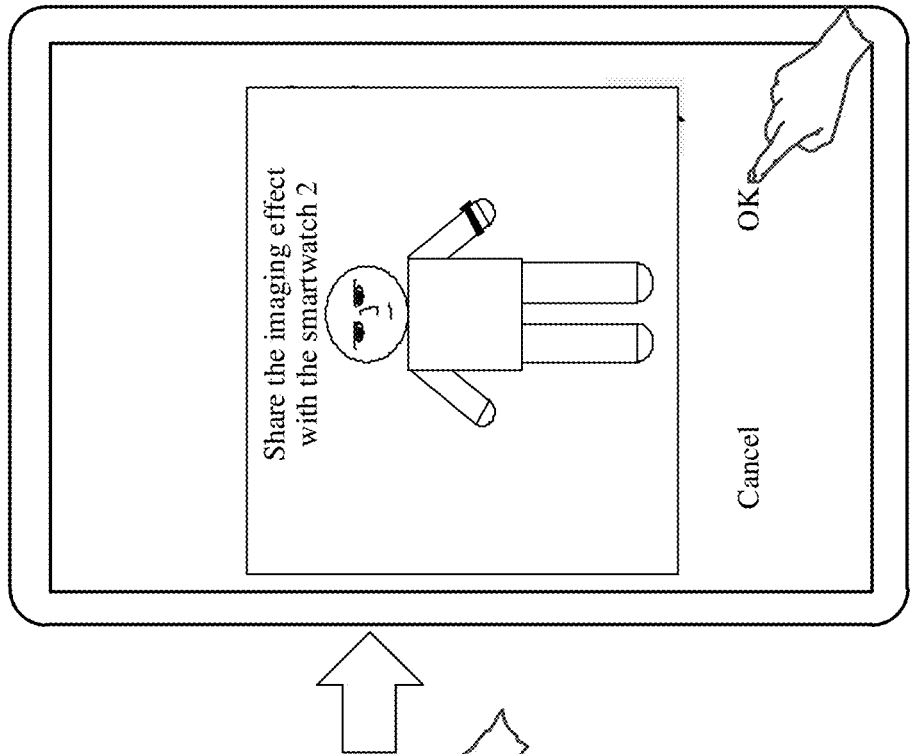
Figure 3:
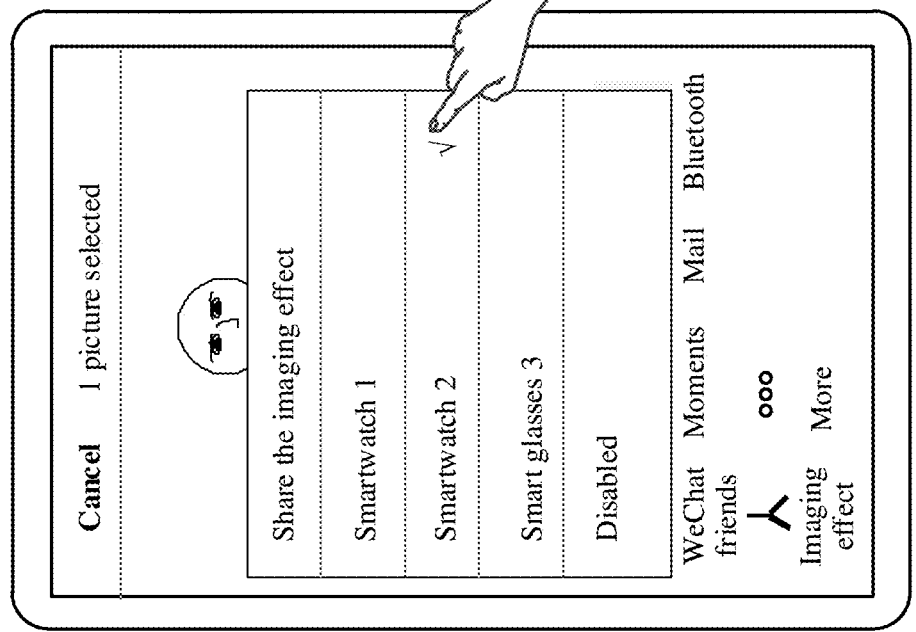

FIG. 5B-1 to FIG. 5B-3 are a schematic diagram of an interface change process of a mobile phone in a picture transmission method according to an embodiment of this application. Referring to FIG. 5B-1 to FIG. 5B-3, the photographer taps a gallery on the mobile phone and selects a first picture, for example, a picture taken on March 15, from the gallery to share an imaging effect. Then, the screen of the mobile phone displays the first picture in a full screen mode. At the same time, buttons such as "edit", "comment", "share", and "delete" are displayed at a lower part of the screen of the mobile phone. For a subsequent procedure, refer to the description of FIG. 5A-1 to FIG. 5A-3, and details are not described herein again.

Figures 1, 5C:
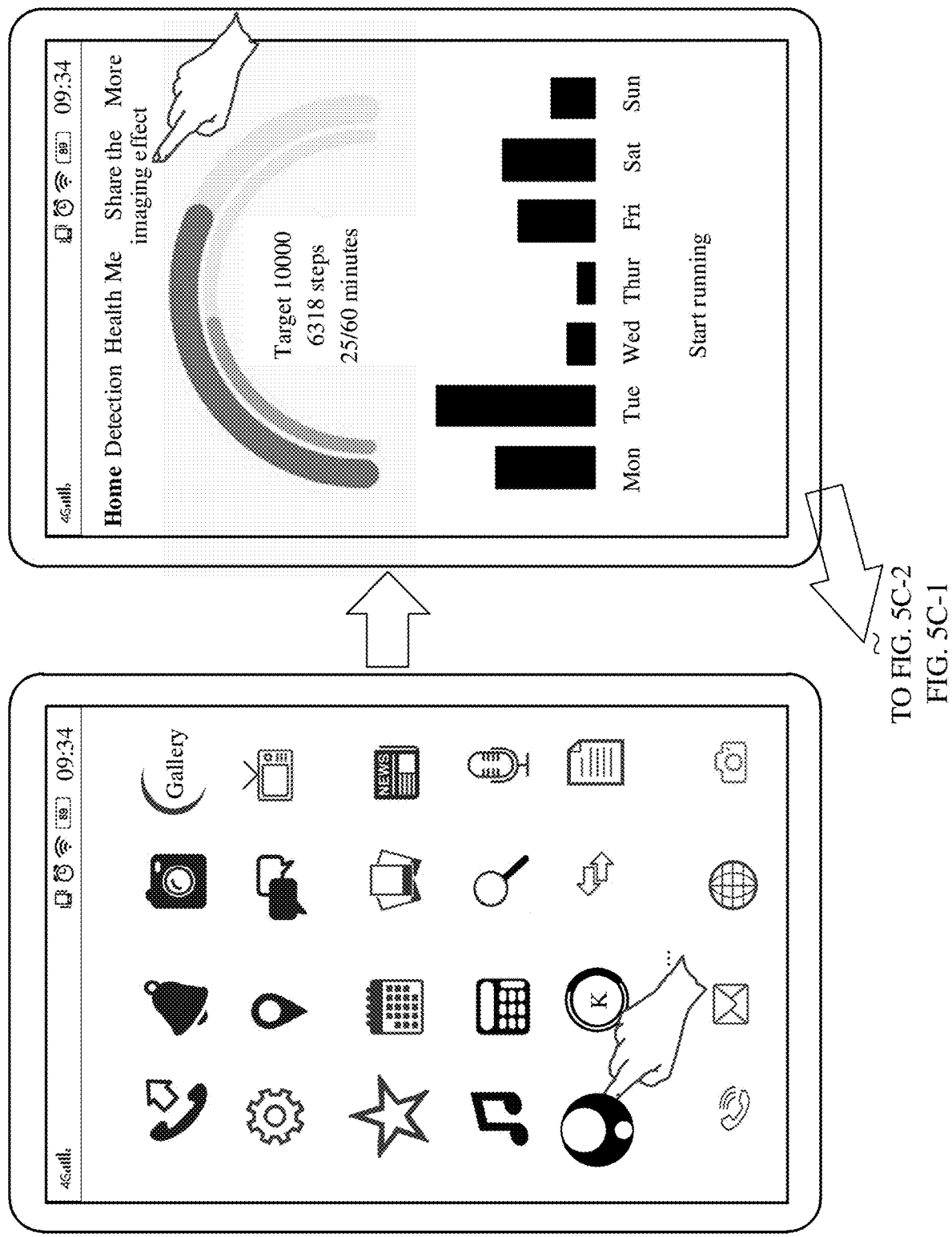
Figure 5C:
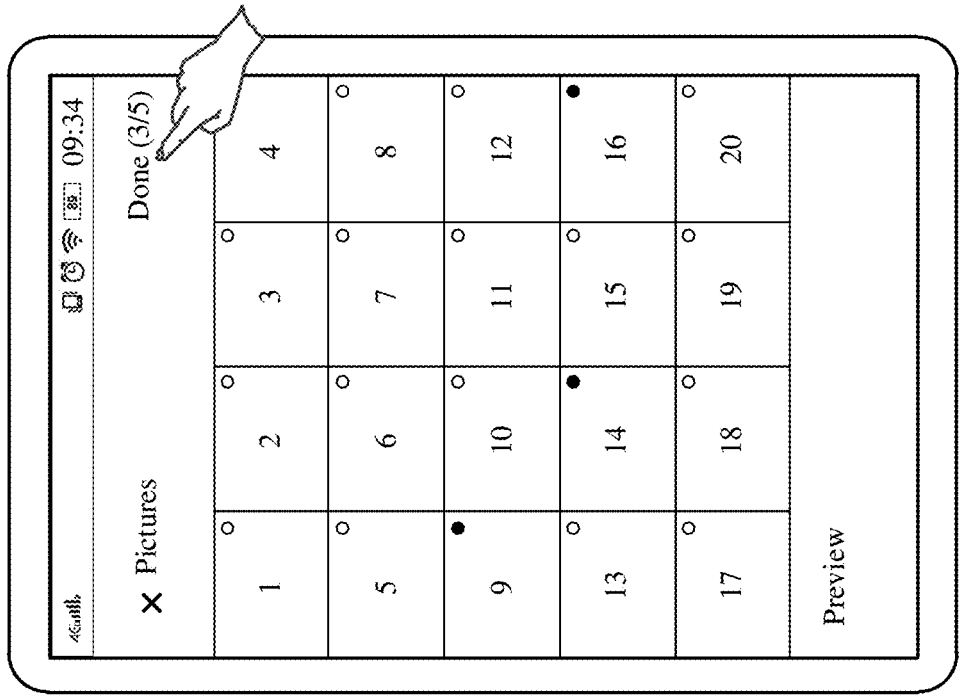
Figure 2:
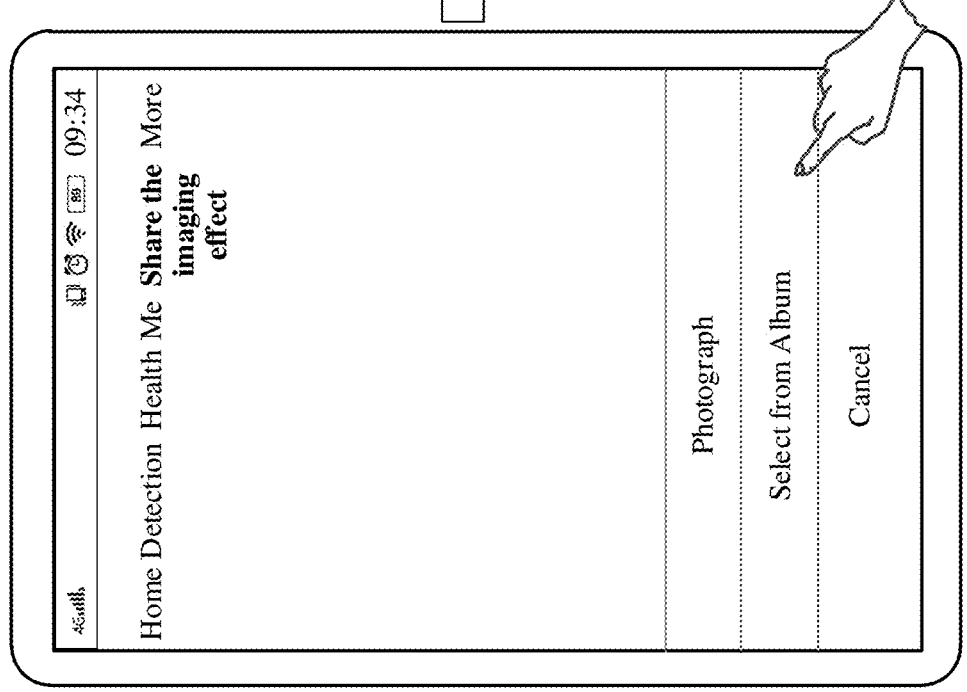

FIG. 5C-1 to FIG. 5C-3 are a schematic diagram of an interface change process of a mobile phone in a picture transmission method according to an embodiment of this application. Referring to FIG. 5C-1 to FIG. 5C-3, the photographer enables in advance the function of sharing an imaging effect, and an "imaging effect sharing" button is displayed in an interface of the sports health APP. After the photographer taps the "imaging effect sharing" button in the APP interface, a floating window is displayed on the screen of the mobile phone, and the floating window displays options such as "photograph", "select from album", and "cancel". After the photographer taps the "select from album" button, thumbnails of many pictures are displayed on the screen of the mobile phone. Then, the photographer selects a picture, such as 9, 14, and 16, for which an imaging effect is to be shared. Assuming that a maximum of five pictures may be selected, a "finish" button is displayed on the screen of the mobile phone. The button prompts a quantity of currently selected pictures and a total quantity. Then, the photographer taps "finish", and a prompt box is displayed on the screen of the mobile phone, to ask whether the photographer needs to send an imaging effect of the first picture to the smartwatch 2. The photographer taps a "cancel" or "send" button to choose whether to send the imaging effect. After the tap, the screen of the mobile phone jumps to the APP interface.

In FIG. 5A-1 to FIG. 5C-3, the last prompt box displays the thumbnail of the first picture as an example for description. However, the embodiments of this application are not limited thereto. In another feasible implementation, a face region of a person in the first picture, a posing score+a photographing suggestion, or the like may be displayed. For example, refer to FIG. 5D.

Figure 5D:
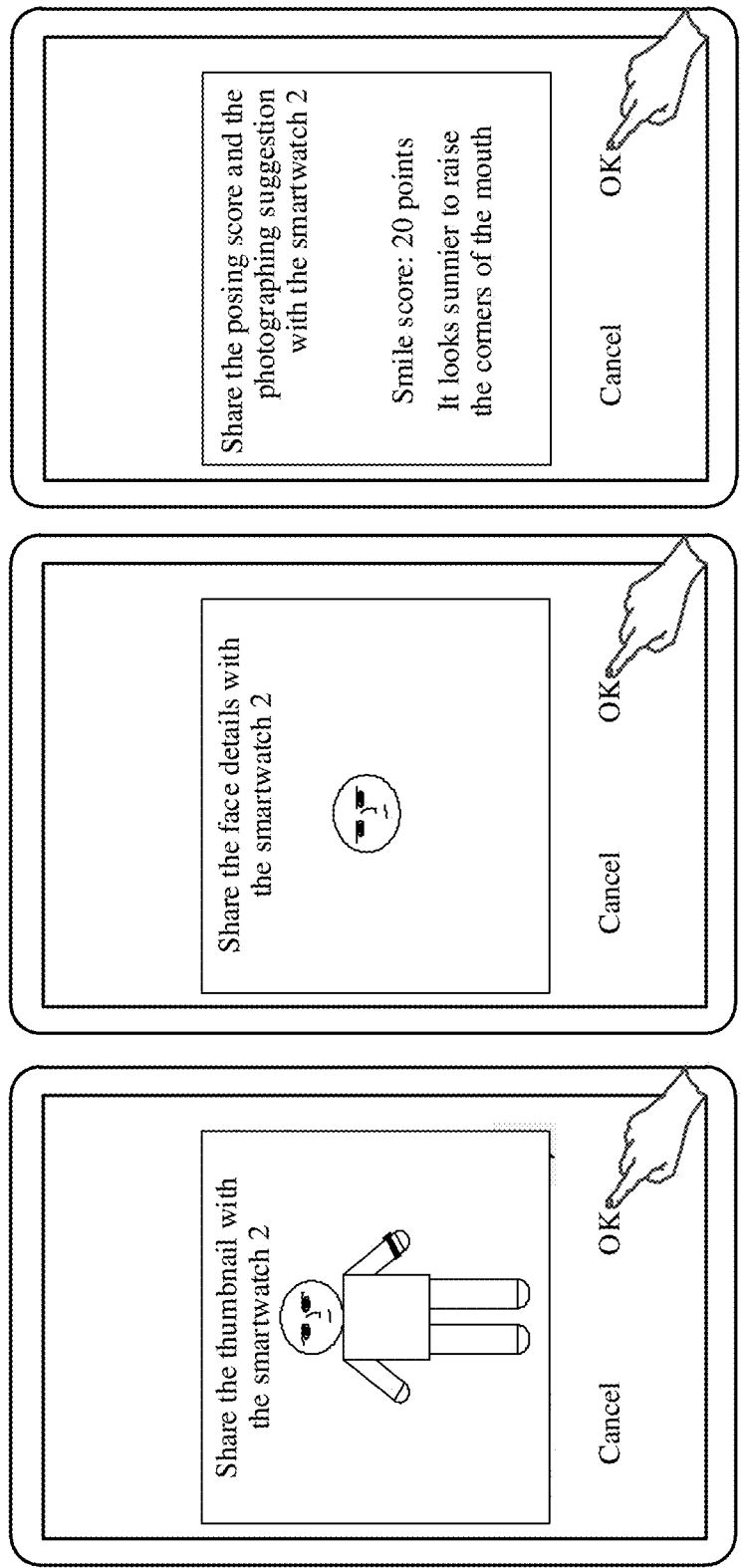
FIG. 5D is a schematic diagram of an interface of a mobile phone in a picture transmission method according to an embodiment of this application.

FIG. 5D is a schematic diagram of an interface of a mobile phone in a picture transmission method according to an embodiment of this application. Referring to FIG. 5D, a thumbnail, a face region, and a posing score+a photographing suggestion are sequentially shared from left to right. The posing score may be a smile score, a posture score, or the like, and the photographing suggestion may be an expression suggestion, a posture suggestion, or the like. For example, the smile score is 20, and the photographing suggestion is "it looks sunnier to raise the corners of the mouth".

In FIG. 5D, the thumbnail, the face region, and the posing score+the photographing suggestion are imaging effects obtained by the mobile phone by processing the first picture based on screen specification information of the smartwatch. The imaging effects may be single second pictures. Shapes of the second pictures are the same as a shape of the display of the second electronic device, and a difference between a size of the second picture and a size of the display of the second electronic device is less than a preset threshold. For example, the second picture is displayed in a full screen mode or occupies most of an area of the smartwatch. That is, the mobile phone may send a plurality of imaging effects of the first picture to the smartwatch at a time.

In FIG. 5D, the face region may be considered as a target region of a target object in the first picture. When there are a plurality of target objects in the first picture, different target objects correspond to different second pictures, and the second pictures include target regions of different target objects.

In the foregoing embodiment, the posing score may be a smile score, a posture score, or the like, and the photographing interface of the mobile phone may further display the smile score or the posture score, so that the photographer can guide the user to pose. For example, refer to FIG. 5E to FIG. 5G.

Figure 5E:
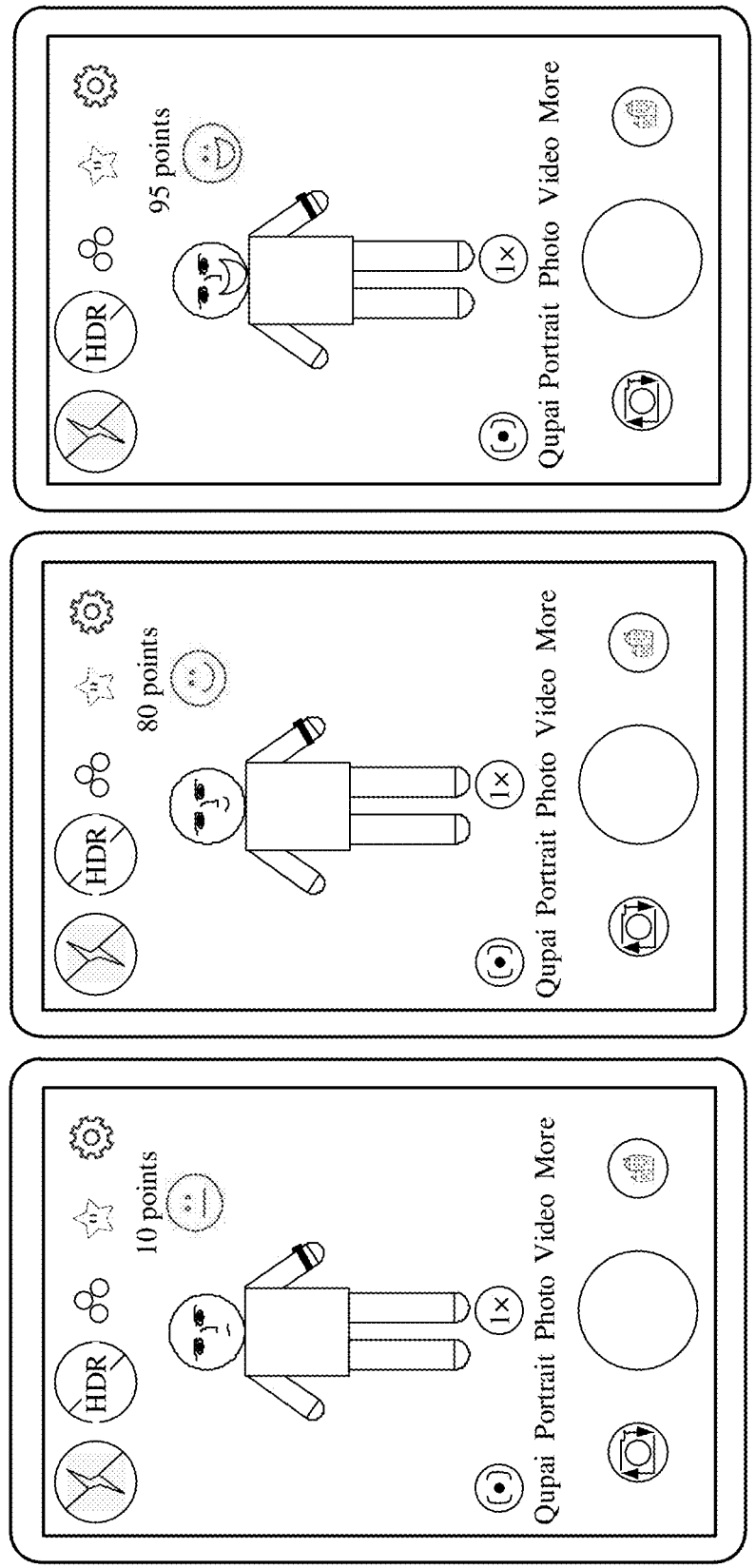
FIG. 5E is a schematic diagram of an interface of a mobile phone in a picture transmission method according to an embodiment of this application.

FIG. 5E is a schematic diagram of an interface of a mobile phone in a picture transmission method according to an embodiment of this application. Referring to FIG. 5E, the smile score varies with smile degrees of the target object. The mobile phone may extract a face region from the first picture through face detection or the like, then recognize a tooth percentage, a lip curve, an eye curve, a cheek percentage, and the like from the face region, calculate a smile degree by using the curves, and determine a smile score based on the smile degree.

Figure 5F:
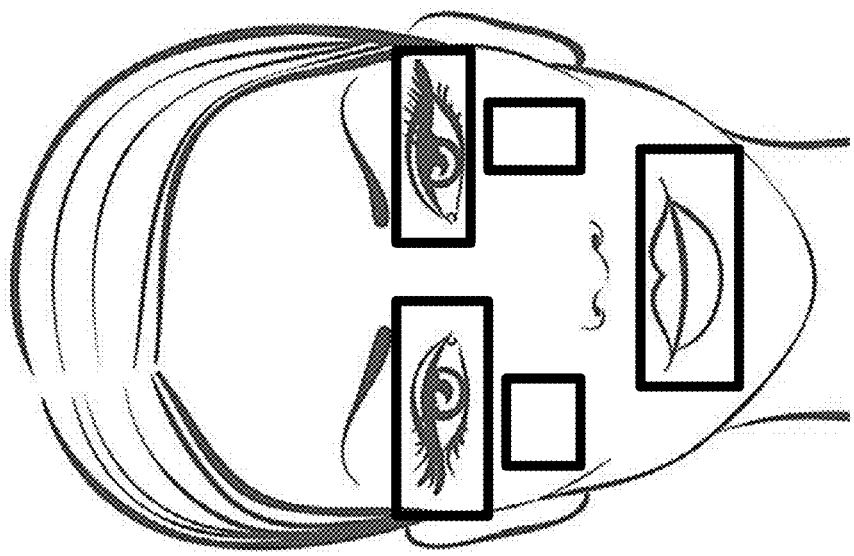
FIG. 5F is a schematic diagram of a smile score in a picture transmission method according to an embodiment of this application.
Figure 5F:
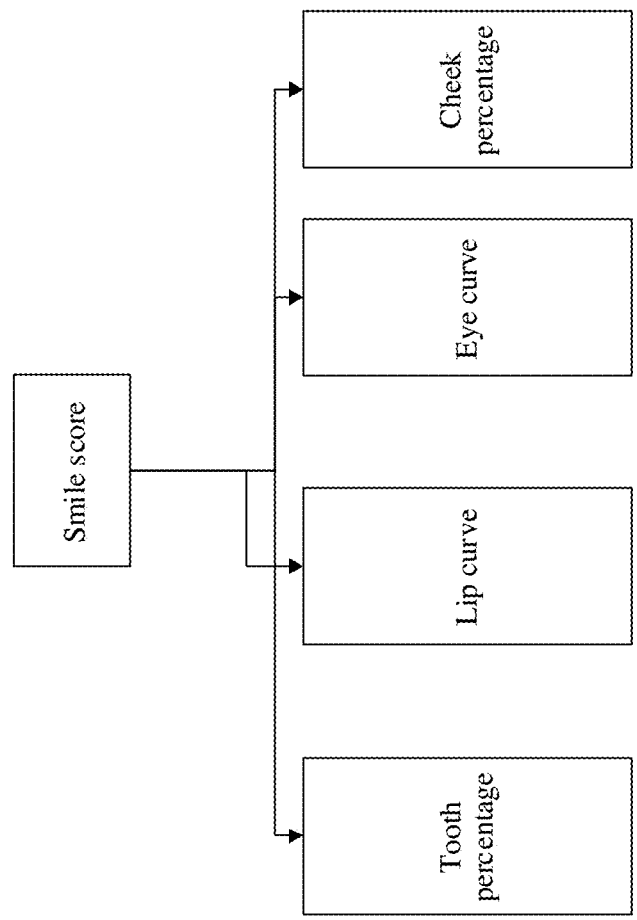

FIG. 5F is a schematic diagram of a smile score in a picture transmission method according to an embodiment of this application. Referring to FIG. 5F, boxes are respectively regions in which a right eye, a left eye, a right cheek, a left cheek, and a mouth are located. The mobile phone recognizes five facial features and teeth from the face region by using a face recognition technology, and determines a smile score based on the following formula:

$$P = w_1 x_1 + w_2 x_2 + w_3 x_3 + w_4 x_4, \text{ where}$$

| | Symbol | | | |
|---|---|---|---|---|
| | $W_1$ | $X_1$ | $W_2$ | $X_2$ |
| Meaning | Tooth percentage weight | Percentage of teeth to lips | Lip curve weight | Lip curve rise angle |
| Value range | 50% | [0, 100] | 30% | [0, 100] |
| | Symbol | | | |
| | $W_3$ | $X_3$ | $W_4$ | $X_4$ |
| Meaning | Eye curve weight | Eye curve bend degree | Cheek percentage weight | Cheek percentage |
| Value range | 15% | [0, 100] | 5% | [0, 100] |

Figure 5G:
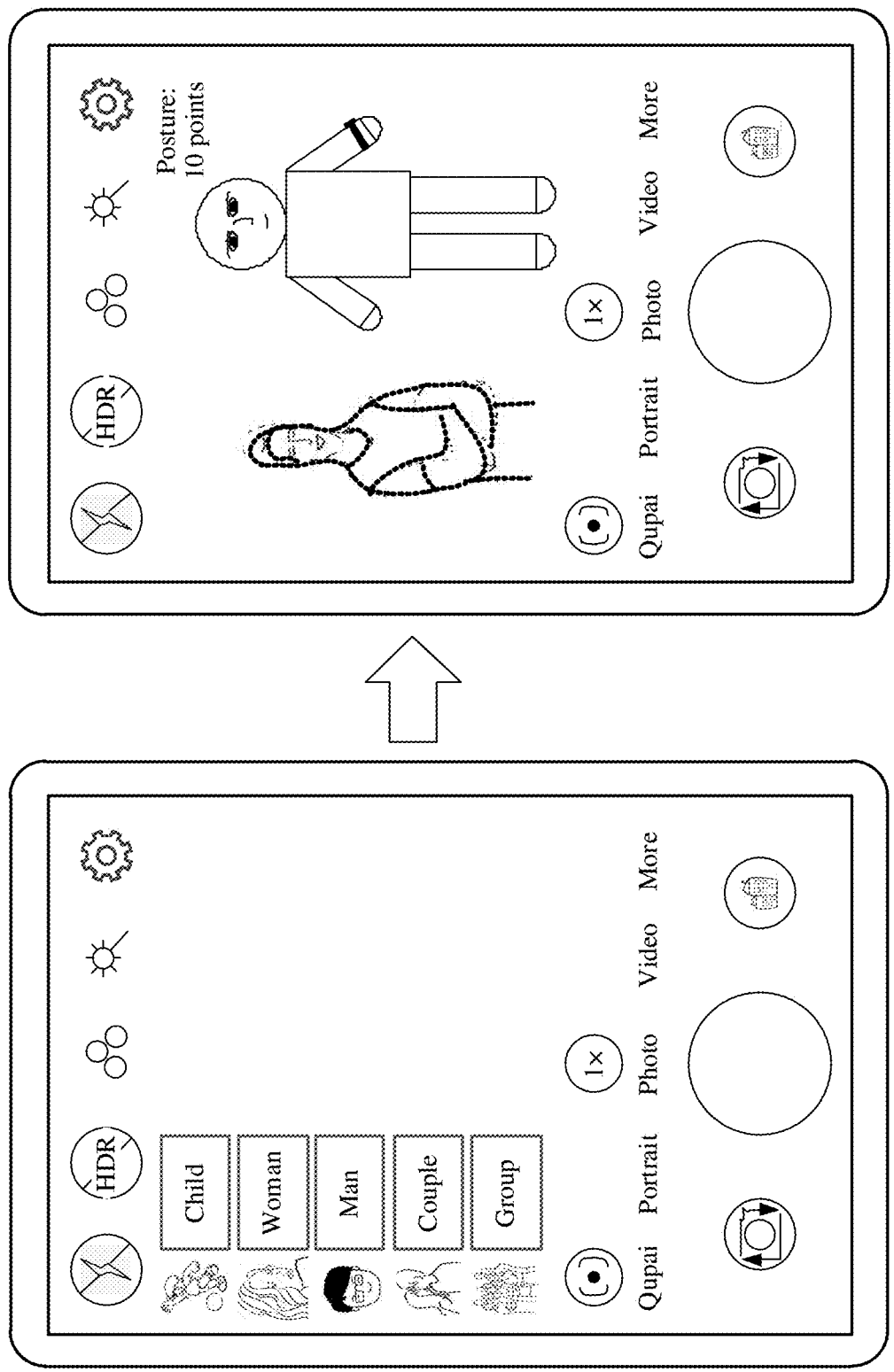
FIG. 5G is a schematic diagram of an interface of a mobile phone in a picture transmission method according to an embodiment of this application.

FIG. 5G is a schematic diagram of an interface of a mobile phone in a picture transmission method according to an embodiment of this application. Referring to FIG. 5G, a local or remote database of the mobile phone stores many example photographing postures, photographing expressions, and the like. After the mobile phone enters the photographing interface, the screen of the mobile phone displays photographing posture and photographing expression categories, for example, tag buttons such as "child", "woman", "man", "couple", and "group" in FIG. 5G. When a photographer taps a tag button, for example, the "man" tag, the mobile phone recognizes background and displays a photographing posture suitable for men in the photographing interface, as shown by a dotted line in the figure. The photographer may switch to a different posture by sliding upwards or downwards. The mobile phone extracts a posture curve of the user, then determines a similarity between the posture curve of the user and a posture curve of the recommended posture, determines a posture score based on the similarity, and displays the posture score. Alternatively, the mobile phone extracts a posture feature of the user, obtains a posture vector based on the posture feature, then determines a distance between the posture vector of the user and a posture vector of the recommended posture, determines a posture score based on the distance, and displays the posture score. The photographer prompts, based on the posture score or the like, the user how to pose. For example, the photographer makes a corresponding posture based on the recommended posture to prompt the user, or the photographer speaks to prompt the user.

In the foregoing embodiment, if the user gives feedback to the photographer after viewing the imaging effect of the first picture, the photographer may perform a corresponding operation through an interface of the mobile phone. For example, refer to FIG. 5H.

Figure 5H:
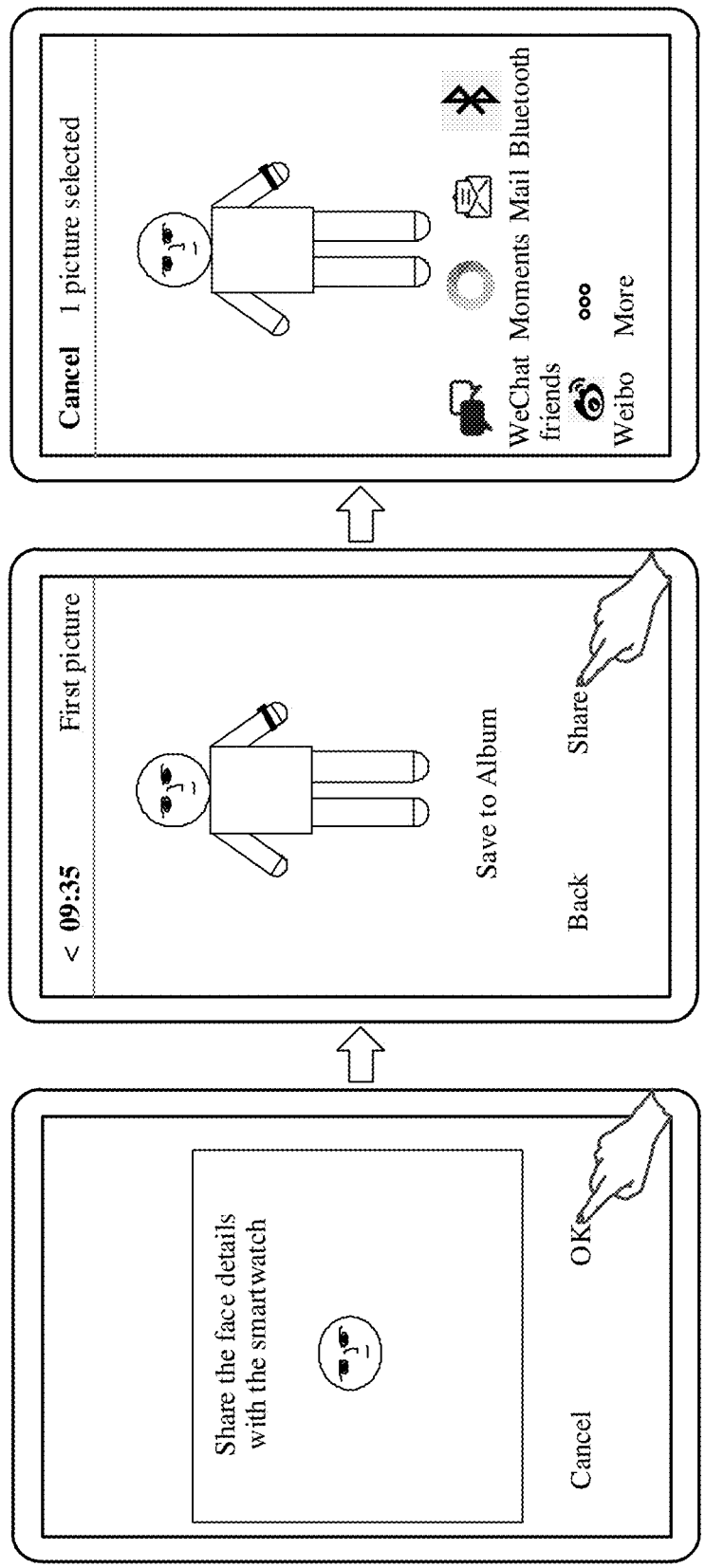
FIG. 5H is a schematic diagram of an interface change process of a mobile phone in a picture transmission method according to an embodiment of this application.

FIG. 5H is a schematic diagram of an interface change process of a mobile phone in a picture transmission method according to an embodiment of this application. Referring to FIG. 5H, when the photographer taps a "send" button and receives indication information fed back from the user, if the indication information is used to indicate to retain the first picture, the mobile phone automatically saves the first picture and displays a "return" or "share" button. If the photographer taps the "return" button, the mobile phone returns to an upper-level menu or enter the photographing interface. If the user taps the "share" button, the mobile phone further shares the first picture on WeChat, Weibo, or the like.

Figure 5I:
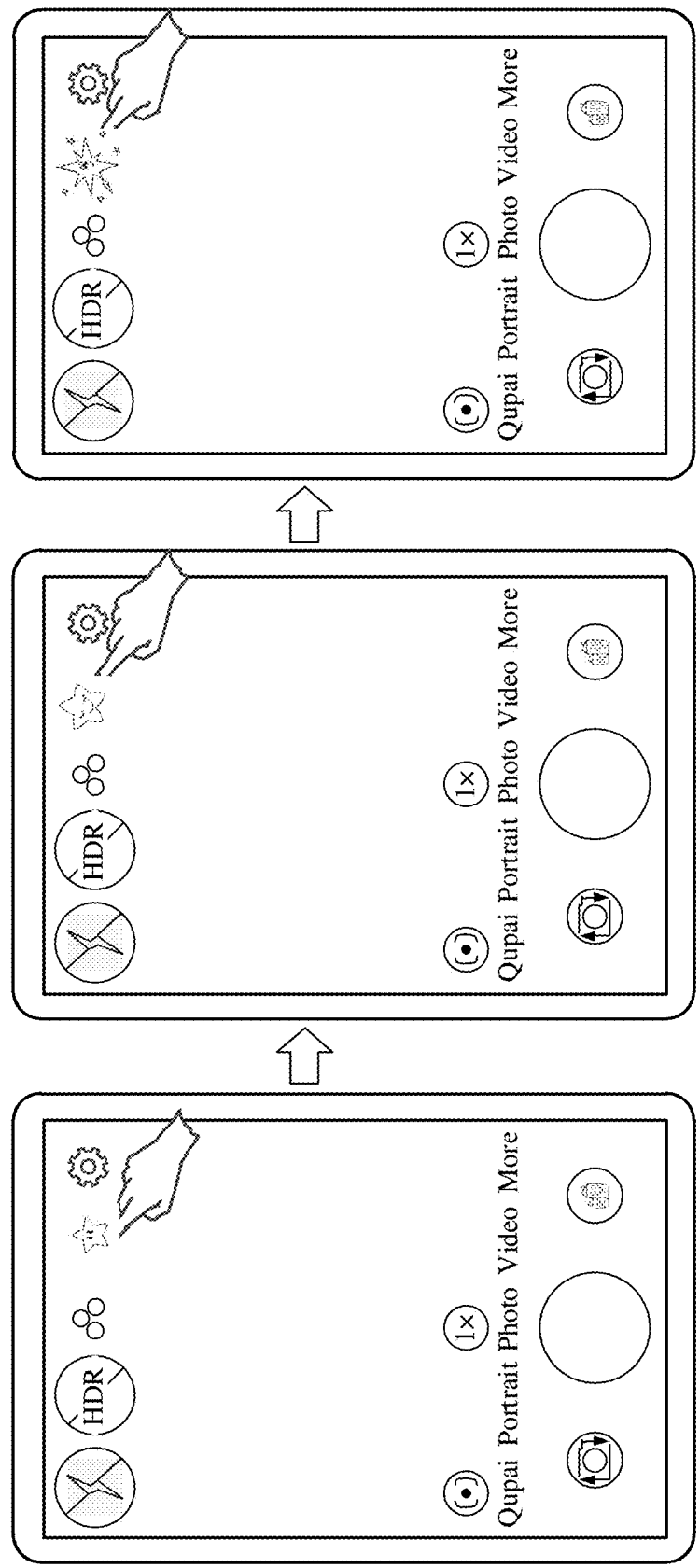
FIG. 5I is a schematic diagram of an interface change process of a mobile phone in a picture transmission method according to an embodiment of this application.

In the foregoing embodiment, if the photographer selects some image processing functions such as filtering and facial beautification before taking a photograph, the mobile phone performs processing such as filtering and facial beautification on a taken photograph, obtains the foregoing imaging effect by using a processed photograph, and then sends the imaging effect to the smartwatch. For example, refer to FIG. 5I. FIG. 5I is a schematic diagram of an interface change process of a mobile phone in a picture transmission method according to an embodiment of this application. Referring to FIG. 5I, a star-style button indicates that facial beautification is disabled. The photographer taps the star-style "facial beautification" button to switch the camera to a light facial beautification mode. Then, the photographer continues to tap the light facial beautification mode to enter an intensive facial beautification mode. In the process from the disabled facial beautification of the camera to the intensive facial beautification mode, if the photographer performs photographing only in the intensive facial beautification mode, the mobile phone obtains each imaging effect by using a picture obtained after the intensive facial beautification, and sends the imaging effect to the smartwatch.

In FIG. 5A-1 to FIG. 5I, the imaging effect of the first picture can be analyzed for the smartwatch only when triggered by the photographer. However, the embodiments of this application are not limited thereto. In another feasible implementation, after the mobile phone establishes a wireless connection to the smartwatch, and the photographer enables an "imaging effect analysis" function, the mobile phone automatically shares an imaging effect with the smartphone each time a photograph is taken.

Finally, how the smartwatch displays the imaging effect and gives feedback is described. For example, refer to FIG. 6A to FIG. 6C.

Figure 6A:
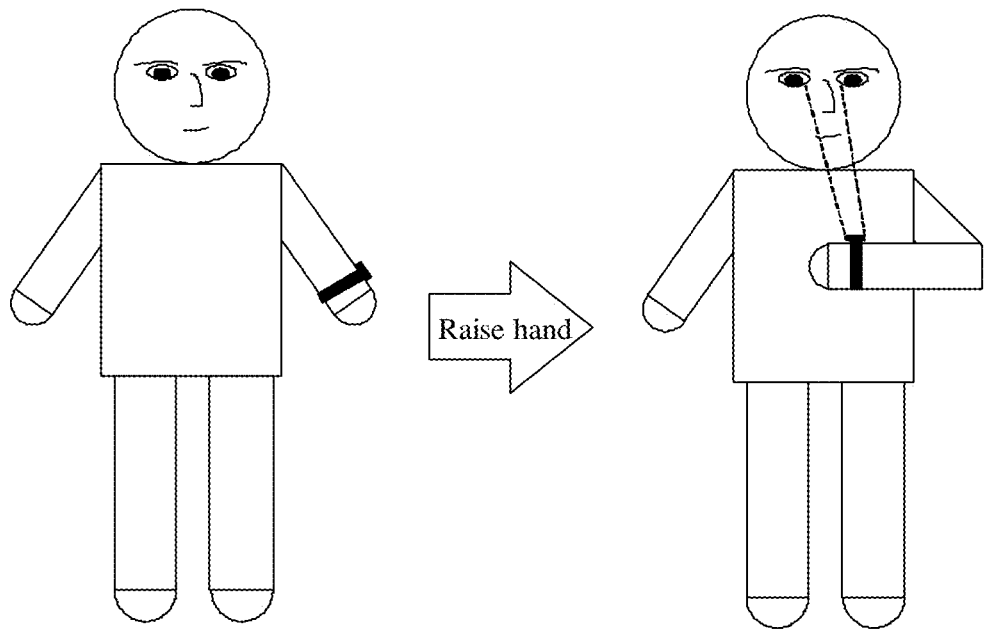
FIG. 6A is a schematic diagram of a process of viewing an imaging effect by a user in a picture transmission method according to an embodiment of this application.

FIG. 6A is a schematic diagram of a process of viewing an imaging effect by a user in a picture transmission method according to an embodiment of this application. Referring to FIG. 6A, in a photographing process, when it is inconvenient for the photographed user to unlock a mobile phone or the photographed user holds a child, due to such reasons, if the photographer transmits a taken photograph by using a chat tool or the like on the mobile phone, the photographed user needs to light up the mobile phone, open the chat tool, and the like, which is particularly troublesome. However, in this embodiment of this application, the user wears the smart band, who may view the screen of the smartwatch by raising a wrist, and may view an imaging effect and gives feedback to the photographer by performing simple operations such as screen switching and tapping.

Figure 6B:
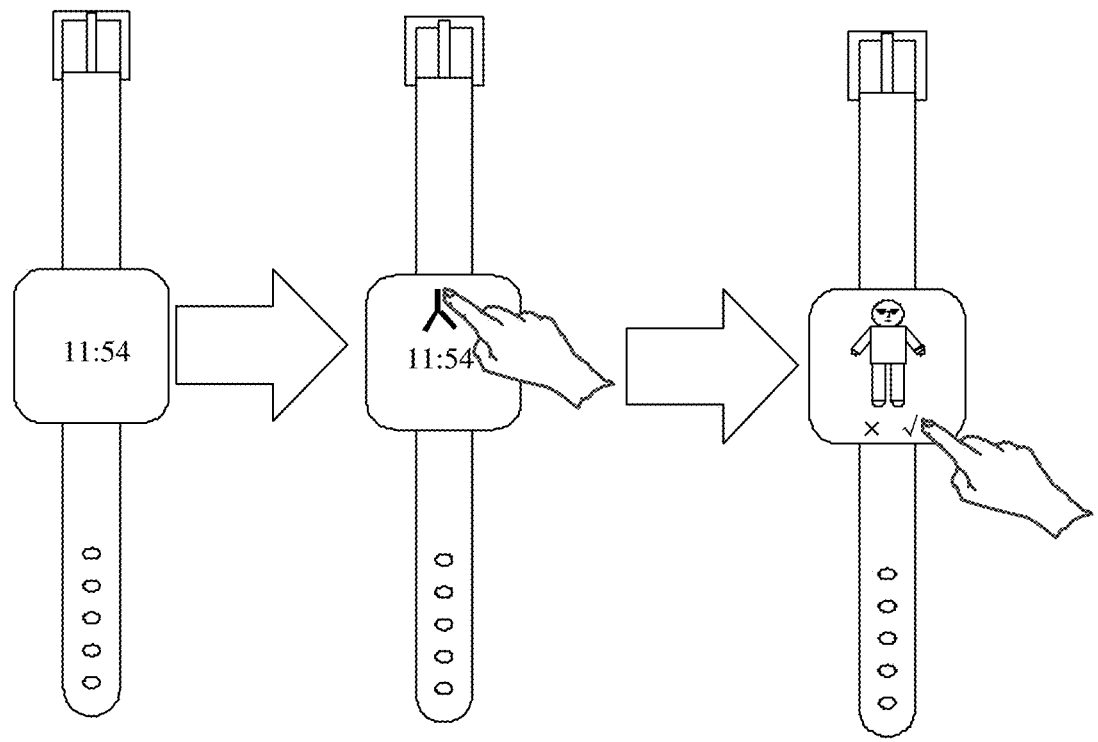
FIG. 6B is a schematic diagram of a screen change process of a wearable device in a picture transmission method according to an embodiment of this application.

FIG. 6B is a schematic diagram of a screen change process of a wearable device in a picture transmission method according to an embodiment of this application. Referring to FIG. 6B, after the smartwatch receives the second picture that is used to represent the imaging effect of the first picture, a prompt icon is displayed on the screen of the smartwatch, the user taps the prompt icon, and the imaging effect, such as a thumbnail, is displayed on the screen of the smartwatch. In addition, prompt information is further displayed on the screen of the smartwatch, and the prompt information is used to indicate the mobile phone to delete or retain the first picture. For example, in FIG. 6B, "×" indicates that the user is dissatisfied and the first picture is to be deleted, and "√" indicates that the user is satisfied and the first picture is to be retained.

Figure 6C:
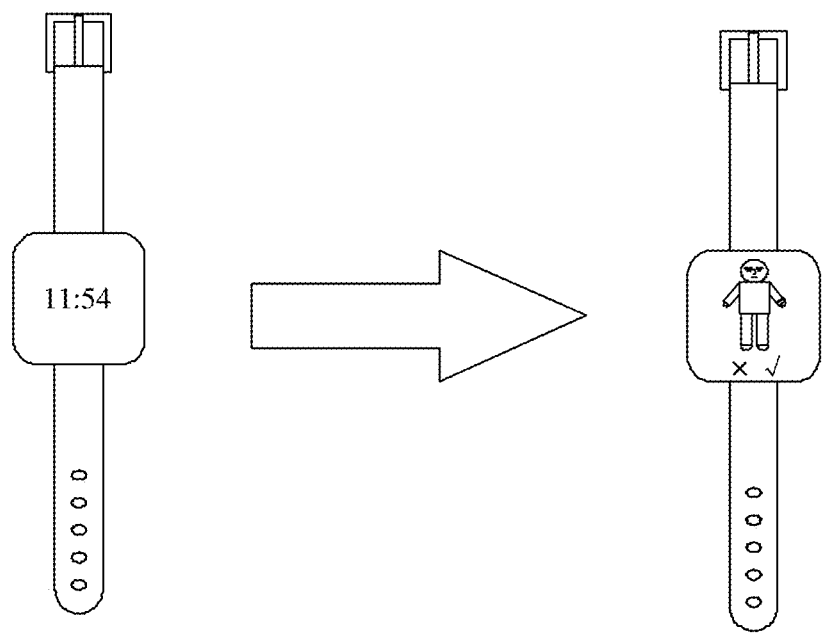
FIG. 6C is a schematic diagram of a screen change process of a wearable device in a picture transmission method according to an embodiment of this application.

FIG. 6C is a schematic diagram of a screen change process of a wearable device in a picture transmission method according to an embodiment of this application. Referring to FIG. 6C, after the smartwatch receives the second picture that is used to represent the imaging effect of the first picture, the imaging effect such as the thumbnail is directly displayed on the screen of the smartwatch.

Figure 6D:
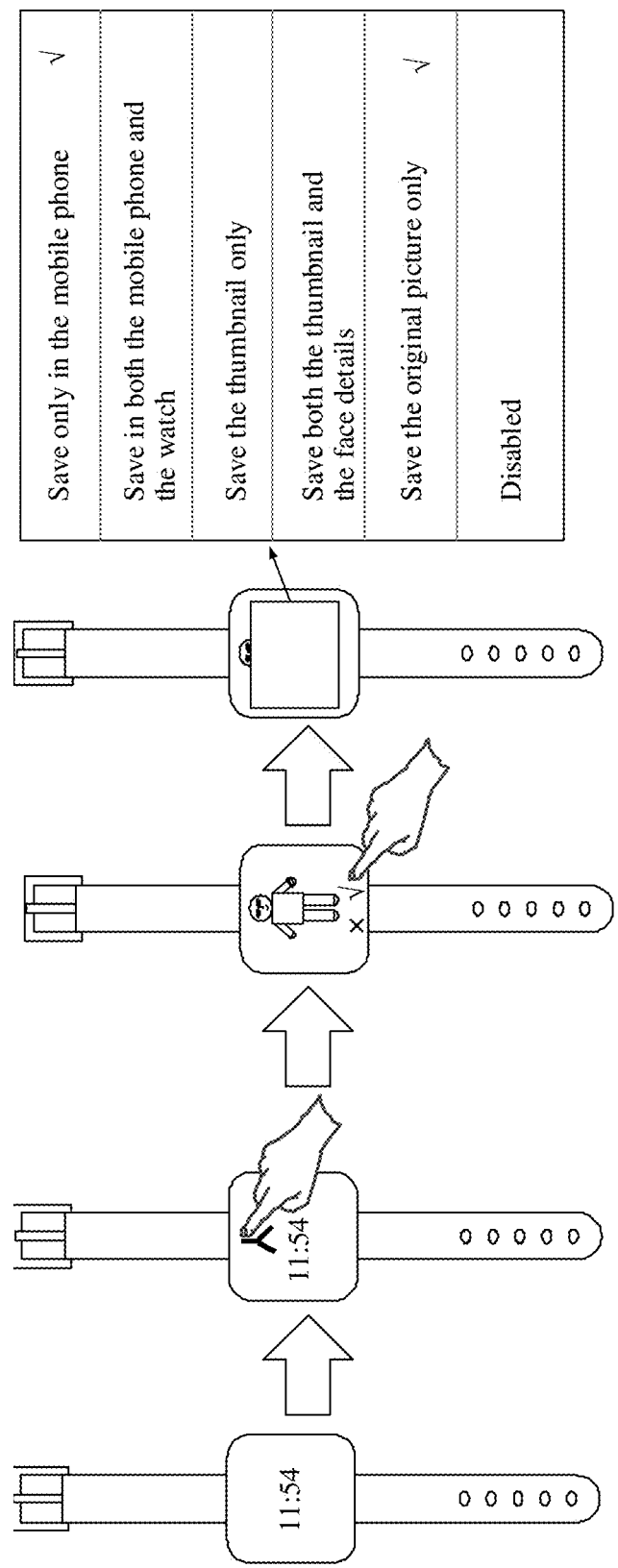
FIG. 6D is a schematic diagram of a screen change process of a wearable device in a picture transmission method according to an embodiment of this application.

FIG. 6D is a schematic diagram of a screen change process of a wearable device in a picture transmission method according to an embodiment of this application. Referring to FIG. 6D, after the smartwatch receives the second picture that is used to represent the imaging effect of the first picture, a prompt icon is displayed on the screen of the smartwatch, the user taps the prompt icon, and the imaging effect, such as a thumbnail, is displayed on the screen of the smartwatch. In addition, prompt information is further displayed on the screen of the smartwatch, and the prompt information is used to indicate whether the user is satisfied or dissatisfied. For example, in FIG. 6D, "×" indicates that the user is dissatisfied and the first picture is to be deleted, and "√" indicates that the user is satisfied and the first picture is to be retained. Assuming that the user selects "√", the smartwatch displays a floating window or switches to a prompt window, and the floating window or the prompt window displays options such as "save in mobile phone", "save in mobile phone and smartwatch", and "save original picture only" for selection by the user.

In addition, after the user selects "√" on the display of the smartwatch, a prompt box may not need to be displayed, and the first picture is saved in the mobile phone and the smartwatch by default, or the first picture is saved only in the mobile phone by default. In actual implementation, a setting may be performed by using the spoils health APP or the like.

In FIG. 6B to FIG. 6D, the screen of the wearable device finally displays the thumbnail of the first picture as an example for description. However, the embodiments of this application are not limited thereto. In another feasible implementation, a face region of a person in the first picture, a posing score +a photographing suggestion, or the like may be displayed. For example, refer to FIG. 6E.

Figure 6E:
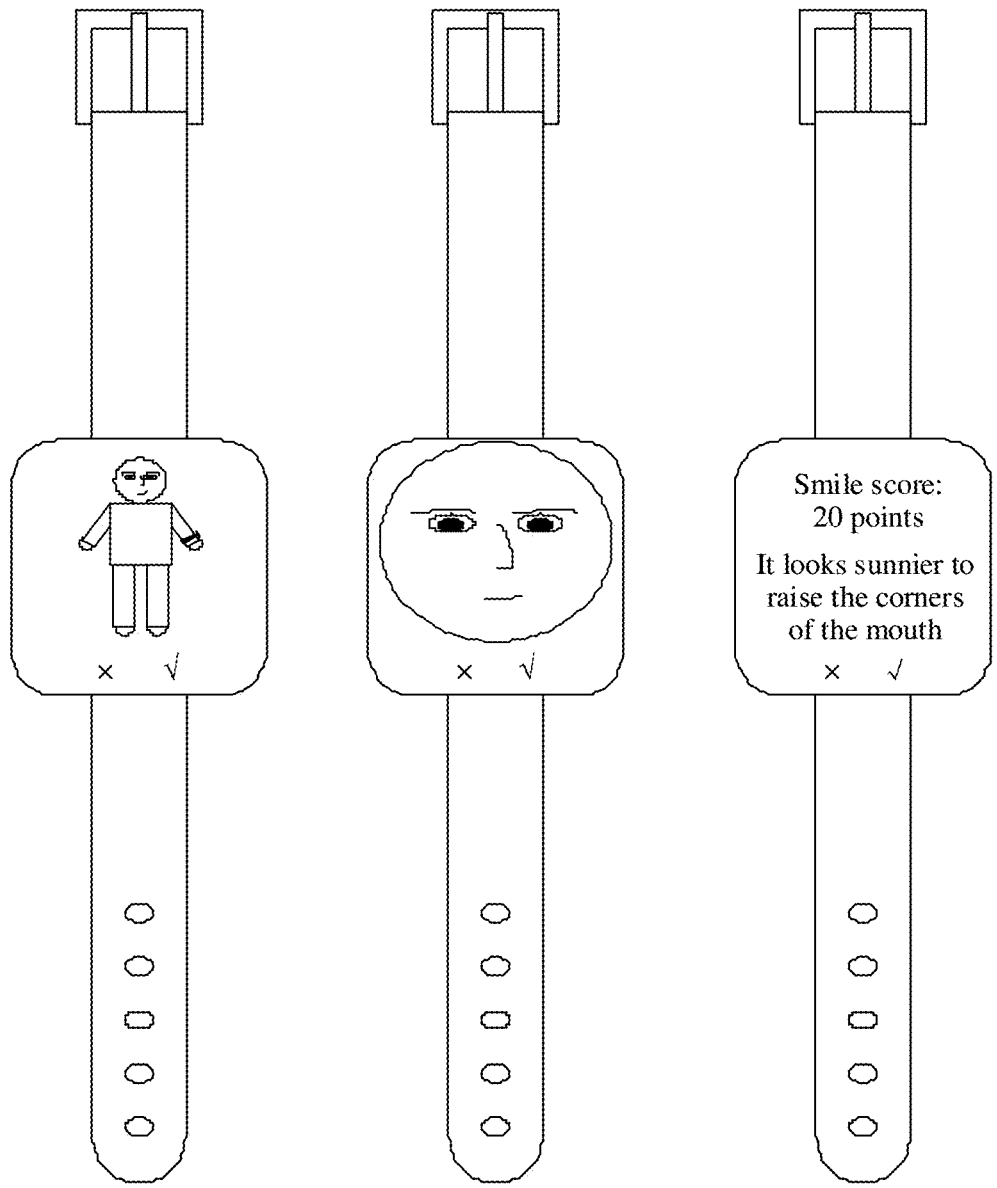
FIG. 6E is a schematic diagram of an interface of a wearable device in a picture transmission method according to an embodiment of this application.

FIG. 6E is a schematic diagram of an interface of a wearable device in a picture transmission method according to an embodiment of this application. Referring to FIG. 6E, a thumbnail, a face region, and a posing score+a photographing suggestion are sequentially shared from left to right. The posing score may be a smile score, a posture score, or the like, and the photographing suggestion may be an expression suggestion, a posture suggestion, or the like.

For example, the smile score is 20, and the photographing suggestion is "it looks sunnier to raise the corners of the mouth".

In FIG. 6A to FIG. 6E, the thumbnail, the face region, and the posing score+the photographing suggestion are imaging effects obtained by the mobile phone by processing the first picture based on screen specification information of the smartwatch. The imaging effects may be single second pictures. Shapes of the second pictures are the same as a shape of the display of the second electronic device, and a difference between a size of the second picture and a size of the display of the second electronic device is less than a preset threshold. For example, the second picture is displayed in a full screen mode or occupies most of an area of the smartwatch. That is, the mobile phone may send a plurality of imaging effects of the first picture to the smartwatch at a time. When the mobile phone sends a plurality of second pictures at a time, each target object has three corresponding second pictures: a thumbnail, a face region, and a posing score +a photographing suggestion. To facilitate switching between different target objects and switching between a thumbnail, a face region, and a posing score +a photographing suggestion of a same target object, the switching may be implemented in a screen switching manner. For example, refer to FIG. 6F and FIG. 6G.

Figure 6F:
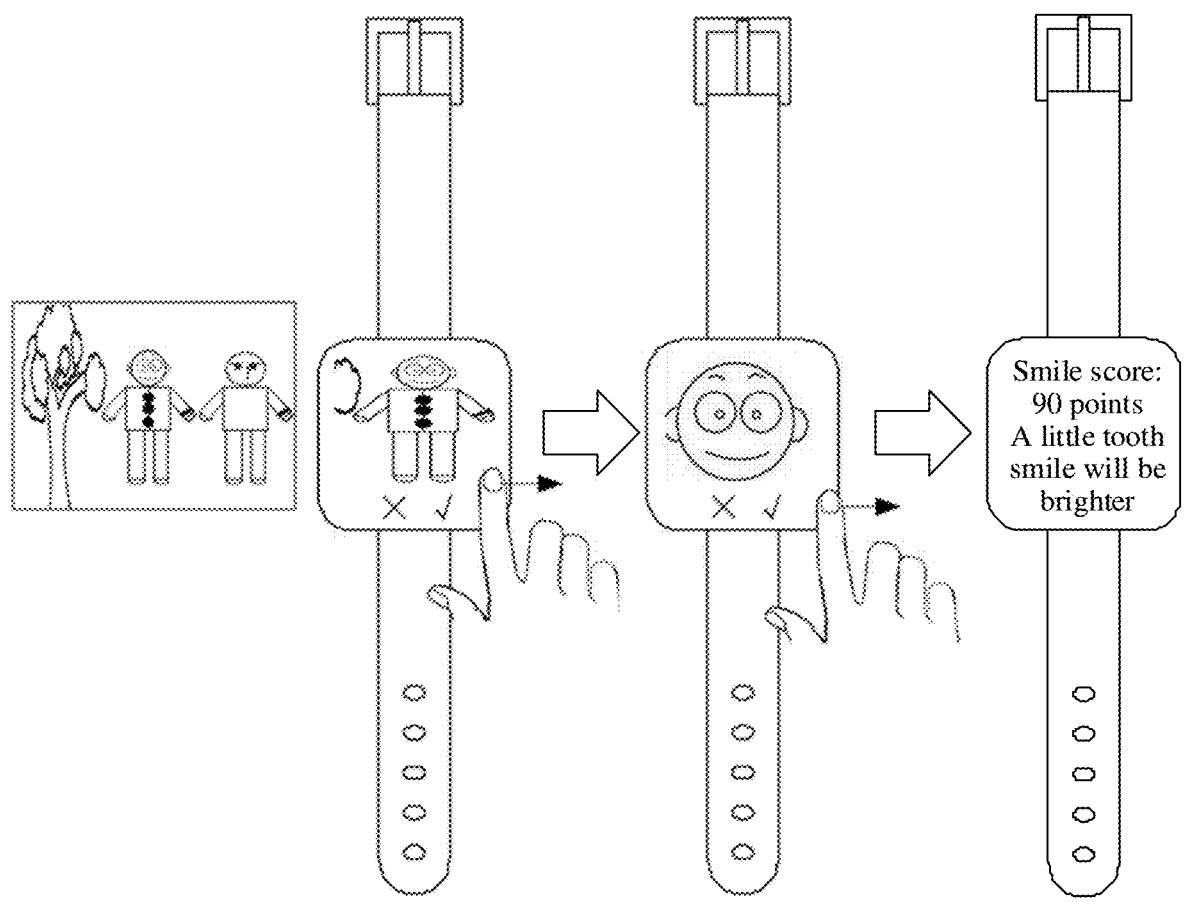
FIG. 6F is a schematic diagram of a screen change process of a wearable device in a picture transmission method according to an embodiment of this application.

FIG. 6F is a schematic diagram of a screen change process of a wearable device in a picture transmission method according to an embodiment of this application. Referring to FIG. 6F, the first picture includes two persons and one tree. Then, the mobile phone uses each of the two persons as a target object, and generates a thumbnail, a face region, and a posing score+a photographing suggestion for each target object, to obtain six second pictures. Then, the mobile phone sends the six second pictures to the smartwatch. The user may view a thumbnail, a face region, and a posing score+a photographing suggestion of a same object in a left-right screen switching manner.

Figure 6G:
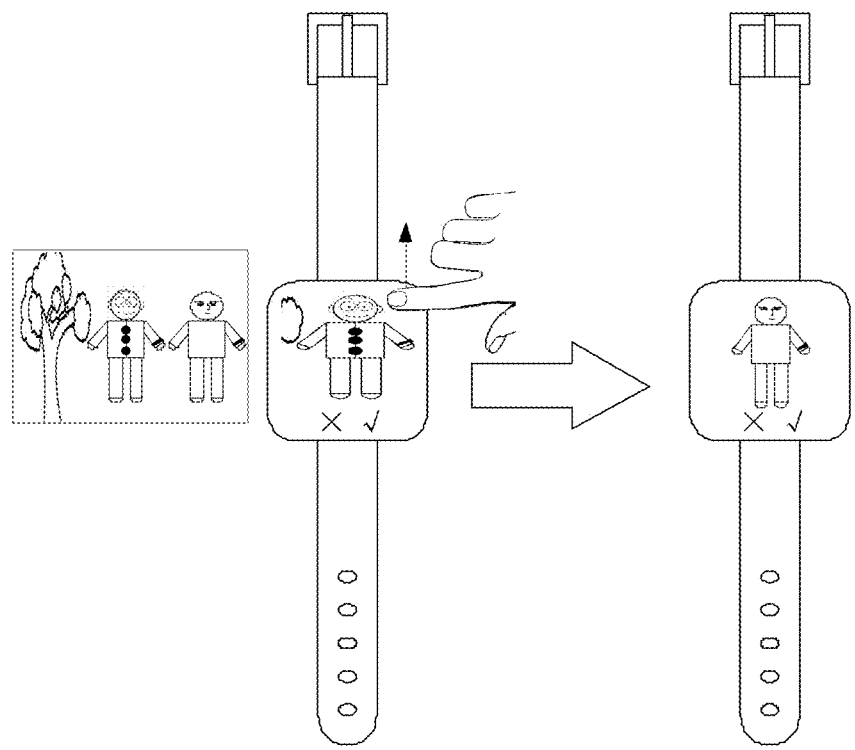
FIG. 6G is a schematic diagram of a screen change process of a wearable device in a picture transmission method according to an embodiment of this application.

FIG. 6G is a schematic diagram of a screen change process of a wearable device in a picture transmission method according to an embodiment of this application. Different from FIG. 6F, the user may switch to a different target object in an up-down screen switching manner.

In FIG. 6F and FIG. 6G, the thumbnail of each target object may be a picture whose area is close to that of the screen of the smartwatch and that is cropped from the first image by using a center of the target object as a reference point. In this way, in a cropping result, different target objects may correspond to a same thumbnail. However, the embodiments of this application are not limited thereto. For example, to view an overall layout of all the target objects in the first picture, a picture whose area is close to that of the screen of the smartwatch may be cropped from the first image by using a center of the first picture as a reference point. In this way, each target object corresponds to a same thumbnail.

It should be noted that, although the embodiments of this application are described in the foregoing embodiments by using an example in which left-right screen switching is performed to switch between different imaging effects, and up-down screen switching is performed to switch between different target objects, the embodiments of this application are not limited thereto. For example, in another implementation, up-down screen switching may be performed to switch between different imaging effects, and left-right screen switching may be performed to switch between different target objects. For another example, only left-right screen switching may be performed. After sequentially displaying a thumbnail, a face region, and a posing score+a photographing suggestion of a same target object, the smartwatch displays a thumbnail, a face region, and a posing score+a photographing suggestion of a next target object.

Figure 7:
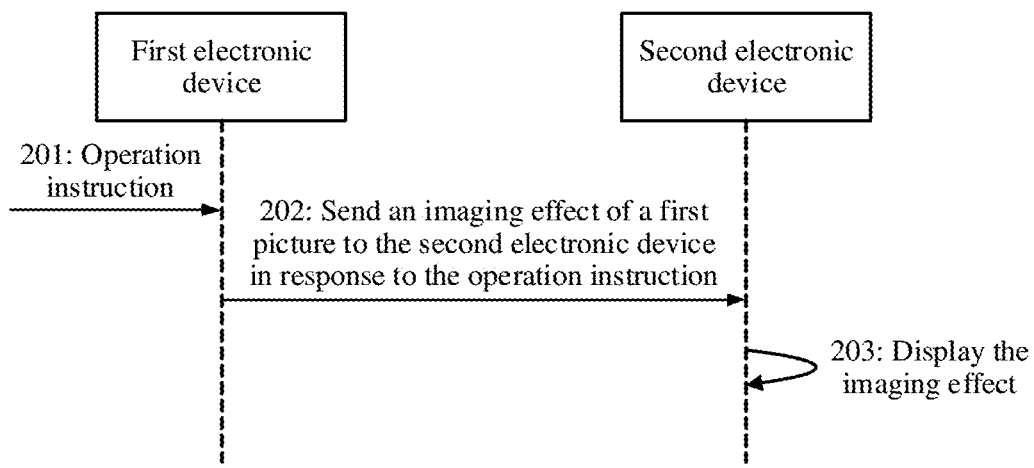
FIG. 7 is a flowchart of a picture transmission method according to an embodiment of this application.

The following describes, in detail based on the foregoing interface diagrams, the picture transmission method provided in the embodiments of this application. For example, refer to FIG. 7. FIG. 7 is a flowchart of a picture transmission method according to an embodiment of this application, including the following steps.

201. A first electronic device receives an operation instruction.

For example, a photographer or the like inputs the operation instruction on a display of the first electronic device, and the first electronic device receives the operation instruction that is input by the photographer in a user interface of the first electronic device.

202. Send an imaging effect of a first picture to a second electronic device in response to the operation instruction.

The imaging effect includes a second picture and a posing score, the second picture includes a target region of a target object in the first picture, a shape of the second picture is the same as a shape of a display of the second electronic device, a difference between a size of the second picture and a size of the display of the second electronic device is less than a preset threshold, and the posing score is a score of posture and expression quality of the target object.

For example, in FIG. 5A-1 to FIG. 5I, the photographer inputs the operation instruction in the user interface of the mobile phone by tapping or the like, for example, the photographer selects the first picture, and the mobile phone processes the first picture based on the screen specification information of the second electronic device, to obtain each second picture and a posing score that are used to represent the imaging effect of the first image. The second picture includes, for example, a target region of a target object in the first picture, the target object may be a person or the like, and the target region may be a face or the like. Then, the photographer taps the "share" or "send" button in the interface of the mobile phone. After recognizing the operation instructions, the mobile phone sends each second picture to the smartwatch.

203. Display the imaging effect.

For example, after receiving the imaging effect of the first picture, the second electronic device displays the imaging effect automatically or as triggered by a user wearing the second electronic device.

According to the picture transmission method provided in this embodiment of this application, a photographer inputs an operation instruction in a user interface of a first electronic device, to select a first picture whose imaging effect needs to be shared. The first electronic device processes the first picture based on specification information of a display of a second electronic device, to obtain each second picture that is used to represent the imaging effect of the first picture. Then, the first electronic device sends each second picture to the second electronic device, so that a user wearing the second electronic device can view the imaging effect of the first picture, and a photographed object does not need to move back and forth to the photographer to view a photographing effect, thereby improving photographing efficiency and improving photograph quality.

In the foregoing embodiment, after receiving the operation instruction, the first electronic device further processes the first picture, to obtain a second picture corresponding to a target region of the target object in the first picture. For example, when the target region is less than the display of the second electronic device, the target region of the target object in the first picture is scaled up to obtain the second picture. For another example, when the target region is greater than twice the display of the second electronic device, the target region of the target object in the first picture is scaled down to obtain the second picture. For still another example, when the target region is greater than the display of the second electronic device and is less than twice the display, the second picture is cropped from the first picture by using a center of the target region as a reference point. By using this solution, the first electronic device obtains the target region of the target object in the first picture.

In a feasible design, when there are a plurality of target objects, different target objects correspond to different second pictures. By using this solution, the first electronic device generates a second picture for a target region of each target object, so that the user can learn an imaging effect of each target object in the first picture. For example, refer to FIG. 6F and FIG. 6G.

In a feasible design, the target region is a face, and the imaging effect further includes a posing score of a person in the target region. By using this solution, the photographed object can quickly learn the imaging effect. For example, refer to FIG. 6E and FIG. 6F.

In a feasible design, the imaging effect further includes a photographing suggestion, and the photographing suggestion is used to indicate a manner of adjusting an expression of the target object. By using this solution, the photographed object can quickly adjust a posture, an expression, and the like, to reach an optimal photographing state. For example, refer to FIG. 6E and FIG. 6F.

In a feasible design, the imaging effect further includes a third picture, the third picture is obtained by the first electronic device by scaling and/or cropping the first picture, a shape of the third picture is the same as the shape of the display of the second electronic device, and a difference between a size of the third picture and the size of the display of the second electronic device is less than the preset threshold. By using this solution, the first electronic device sends an overall imaging effect of the first picture to the second electronic device. For example, refer to FIG. 6E and FIG. 6F.

In a feasible design, after sending the imaging effect of the first picture to the second electronic device in response to the operation instruction, the first electronic device further receives indication information sent by the second electronic device. The indication information is used to indicate to delete or retain the first picture. The first electronic device displays the indication information, and deletes or retains the first picture based on the indication information. By using this solution, the user gives feedback to the photographer timely and conveniently. For example, refer to FIG. 5H.

In a feasible design, before sending the imaging effect of the first picture to the second electronic device in response to the operation instruction, the first electronic device further displays a first interface, where the first interface includes a first control, a second control, and a third control, the first control is configured to indicate whether to select the second picture, the second control is configured to indicate whether to select the posing score and the photographing suggestion, and the third control is configured to indicate whether to select the third picture; and generates the second picture, the expression score and the photographing suggestion, or the third picture based on an operation performed by a user in the first interface. By using this solution, the photographer quickly and conveniently selects an imaging effect to be sent. For example, refer to FIG. 4B-1 and FIG. 4B-2 and FIG. 4D-1 and FIG. 4D-2.

In a feasible design, before sending the imaging effect of the first picture to the second electronic device in response to the operation instruction, the first electronic device further photographs the target object to obtain the first picture. By using this solution, the photographer and the user timely communicate with each other in a photographing process.

In a feasible design, before sending the imaging effect of the first picture to the second electronic device in response to the operation instruction, the first electronic device further establishes a network connection to the second electronic device, and receives the specification information of the display sent by the second electronic device. By using this solution, the first electronic device obtains the specification information of the second electronic device.

In a feasible design, the first electronic device further recognizes at least one of lips, teeth, eyes, or cheeks of a face in the target region, and determines an expression score based on the at least one of the lips, the teeth, the eyes, or the cheeks. By using this solution, the first electronic device determines the expression score of the target object.

In a feasible design, before sending the imaging effect of the first picture to the second electronic device in response to the operation instruction, the first electronic device further extracts the target region of the target object from the first picture, and processes the target region based on the specification information of the display of the second electronic device, to obtain the second picture. By using this solution, the first electronic device quickly obtains an imaging effect of a detail region, that is, the target region.

The following describes, in detail by using two examples, the picture transmission method provided in the embodiments of this application.

First, the first electronic device is a mobile phone, and the second electronic device is a smartwatch with a circular display.

In this case, the screen specification information includes at least a radius of the smartwatch. When the first electronic device processes the target region based on the specification information of the display of the second electronic device, to obtain the second picture, if a diameter of the second electronic device is less than an edge length of the target region, the first picture is scaled down, so that an edge length of a target region in a scaled-down first picture is equal to the diameter of the second electronic device. Then, the first electronic device crops the second picture from the scaled-down first picture by using a center of the target region as a reference point. A scale-down rate is a ratio of the edge length to the diameter. Alternatively, when the diameter exceeds a preset multiple of the edge length of the target region, the first picture is scaled up, so that an edge length of a target region in a scaled-up first picture is equal to the diameter, and the second picture is cropped from the scaled-up first picture by using a center of the target region as a reference point. A scale-up rate is a ratio of the edge length to the diameter. Alternatively, when the diameter is greater than the edge length of the target region and does not exceed the preset multiple of the edge length of the target region, the first electronic device crops the second picture from the first picture by using a center of the target region as a reference point.

Figure 8A:
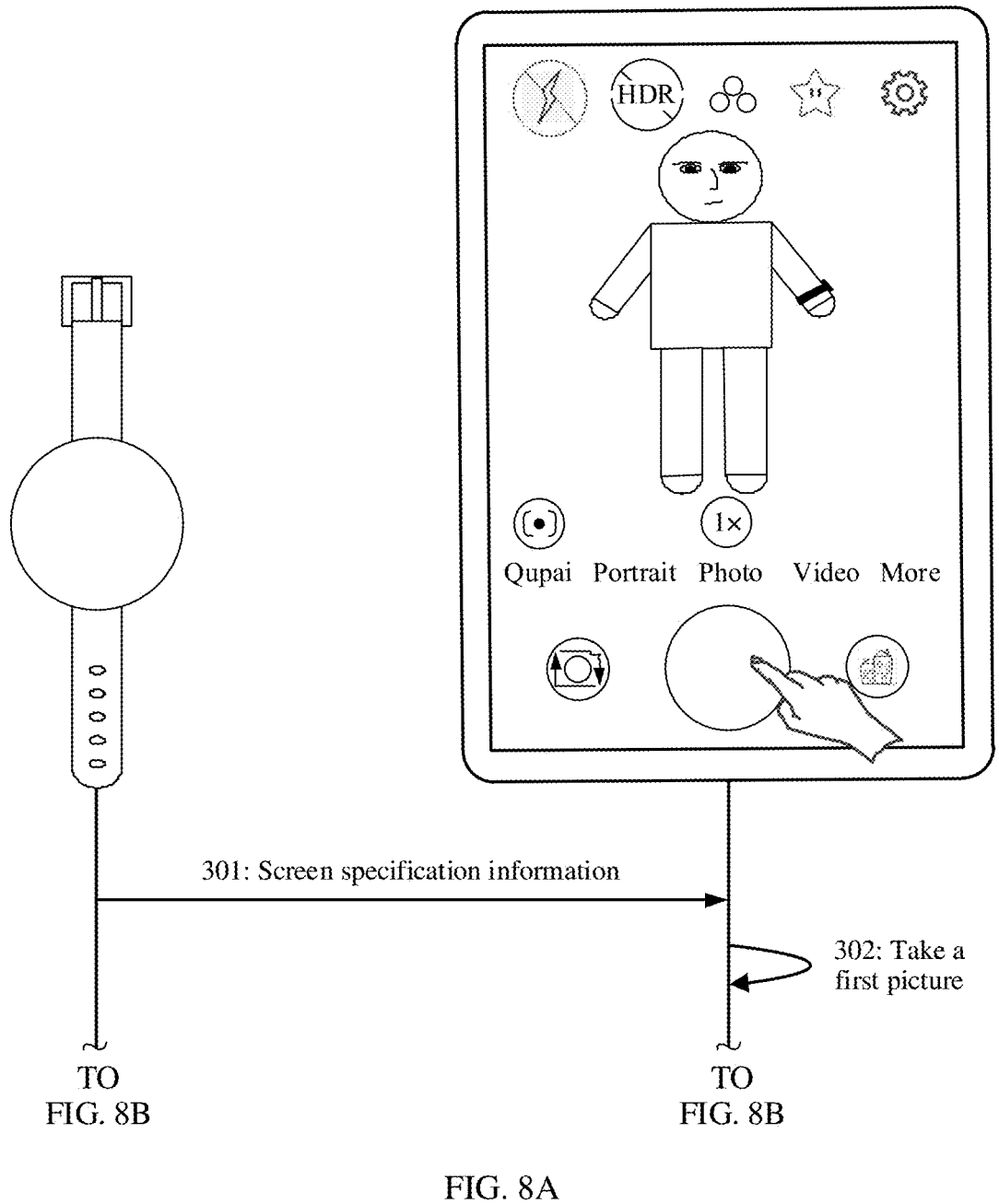
FIG. 8A and FIG. 8B are a schematic diagram of a process of a picture transmission method according to an embodiment of this application.
Figure 8B:
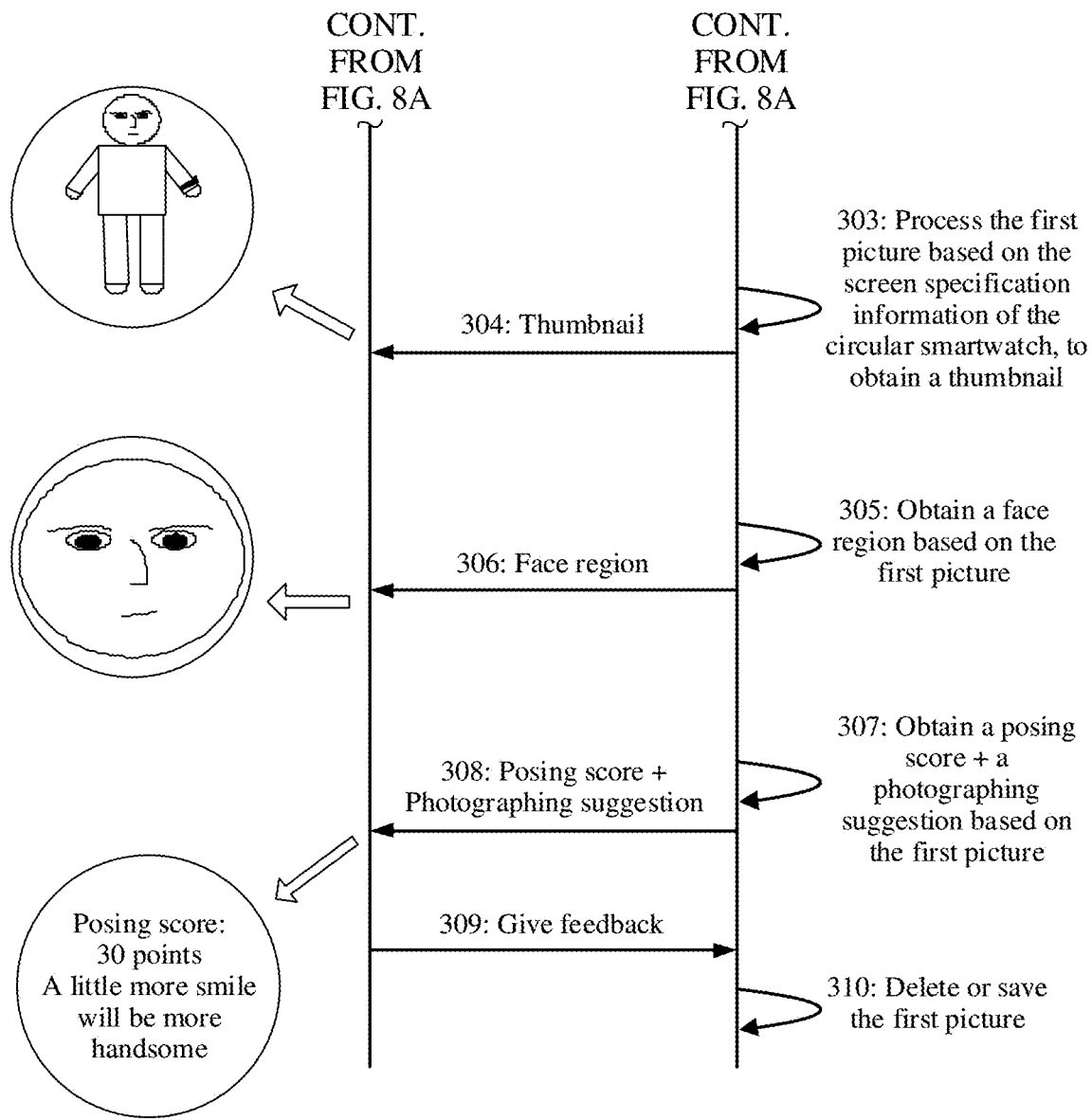

For example, refer to FIG. 8A and FIG. 8B. FIG. 8A and FIG. 8B are a schematic diagram of a process of a picture transmission method according to an embodiment of this application. Referring to FIG. 8A and FIG. 8B, this embodiment includes the following steps.

301. The mobile phone obtains screen specification information of the circular smartwatch.

For example, after the mobile phone establishes a Bluetooth connection to the circular smartwatch, the mobile phone obtains the screen specification information of the circular smartwatch. The screen specification information indicates a diameter d of the circular smartwatch.

302. The mobile phone takes a first picture.

For example, the user wearing the circular smartwatch selects a photographing position and makes a photographing posture. At the same time, the photographer selects a position, adjusts a focal length, and the like, so that the photographer photographs the user by using the mobile phone to obtain the first picture.

The foregoing steps 301 and 302 are not strictly sequenced.

303. The mobile phone processes the first picture based on the screen specification information of the circular smartwatch, to obtain a thumbnail.

For example, the mobile phone processes the first picture based on the diameter d of the circular smartwatch, to obtain a thumbnail that matches the circular smartwatch.

Figure 9:
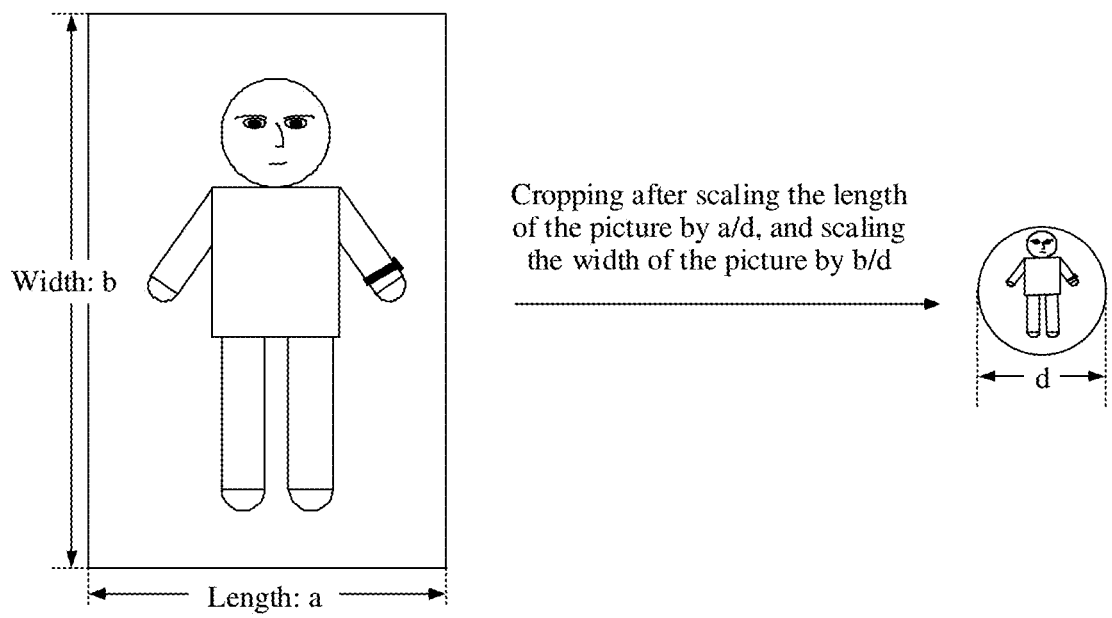
FIG. 9 is a schematic diagram of a process of obtaining a thumbnail in a picture transmission method according to an embodiment of this application.

FIG. 9 is a schematic diagram of a process of obtaining a thumbnail in a picture transmission method according to an embodiment of this application. Referring to FIG. 9, a specification of the first picture taken by the mobile phone is a (length)×b (width). After obtaining the first picture whose specification is a×b, the mobile phone may obtain a thumbnail after scaling the first picture into a square picture whose specification is d×d, for example, scaling the length by a/d and scaling the width by b/d, and cropping a center circle of the square.

A manner of obtaining a thumbnail is not limited in this embodiment of this application. For example, in another feasible implementation, after obtaining the first picture whose specification is a×b, the mobile phone crops a thumbnail from the first picture by using a geometric center of the first picture as a reference point and using d/2 as a radius. For another example, after obtaining the first picture whose specification is a×b, the mobile phone extracts a target object, for example, a person, and crops a thumbnail from the first picture by using a geometric center of the target object as a reference point and using d/2 as a radius.

304. The mobile phone sends the thumbnail to the circular smartwatch.

In addition, the mobile phone may also send the original first picture to the circular smartwatch. This is not limited in this embodiment of this application.

305. The mobile phone obtains a face region based on the first picture.

The mobile phone recognizes, from the first picture by using a face recognition technology, a region in which a face is located, and crops, from the first picture based on the diameter d of the circular smartwatch, a face region that is adapted to the circular smartwatch. If there are a plurality of faces in the first picture, the mobile phone may obtain a plurality of face regions from the first picture based on the diameter d of the circular smartwatch.

Figure 10:
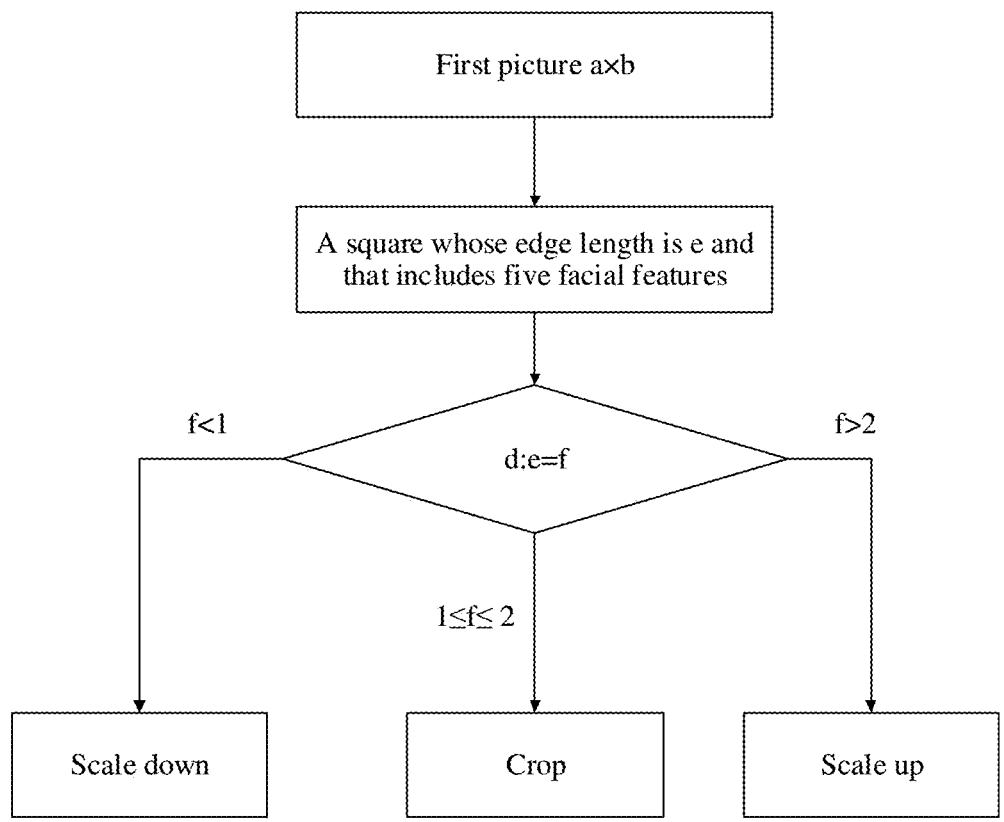
FIG. 10 is a schematic diagram of a process of obtaining a face region in a picture transmission method according to an embodiment of this application.
Figure 11:
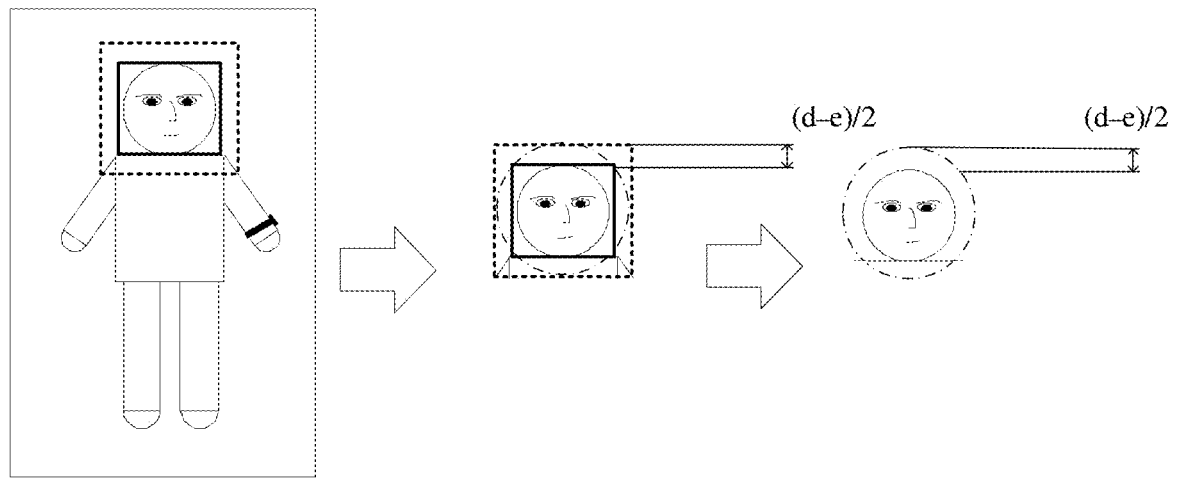
FIG. 11 is a schematic diagram of a face region in a picture transmission method according to an embodiment of this application.

For example, refer to FIG. 10. FIG. 10 is a schematic diagram of a process of obtaining a face region in a picture transmission method according to an embodiment of this application. Referring to FIG. 10, the first picture taken by the mobile phone is an a×b picture. The mobile phone recognizes, by using a face recognition technology, a region in which a face is located. For example, the region is a minimum square whose edge length is e and that may include five facial features of the user, as shown by a thick black box at a face position on the left of FIG. 11. FIG. 11 is a schematic diagram of a face region in a picture transmission method according to an embodiment of this application.

After obtaining the minimum square whose edge length is e and that may include the five facial features of the user, the mobile phone determines a ratio d/e=f of the diameter d of the circular smartwatch to the edge length e of the square, and determines, based on the ratio f, how to process the face region of the square.

When f<1, the square is scaled down, so that the edge length e of the minimum square that may include the five facial features of the user is decreased, to obtain a square whose edge length is d and that includes the five facial features of the user. Then, the face region is cropped from the scaled-down square by using a geometric center of the scaled-down square as a reference point and using d/2 as a radius.

When f>2, the square is scaled up, so that the edge length e of the minimum square that may include the five facial features of the user is increased, to obtain a square whose edge length is d and that includes the five facial features of the user. Then, the face region is cropped from the scaled-up square by using a geometric center of the scaled-up square as a reference point and using d/2 as a radius.

When 1≤f≤2, a square whose edge length is d is cropped from the first picture by using a geometric center of the square whose edge length is e as a reference point and using d/2 as a radius, as shown by a dotted box in the middle of FIG. 11. Then, a maximum circle is determined from the dotted box, as shown by a chain-dotted line on the right of FIG. 11, and a circle shown by the chain-dotted line is used as a face region.

In this process, regardless of f<1, f>2, or 1≤f≤2, a face region obtained by processing the first picture by the mobile phone is a second picture of a circular shape, and a diameter of the second picture is d or approximately d.

It should be noted that, the scaling the square may be scaling the square only, or may be scaling the first picture, so that the minimum square that may include the five facial features of the user is scaled at the same time.

306. The mobile phone sends the face region to the smartwatch.

307. The mobile phone obtains a posing score+a photographing suggestion based on the first picture.

For example, the mobile phone recognizes a posture and facial details such as eyes, lips, teeth, and cheeks of the user by using a face recognition technology, scores the posture of the user to obtain a posture score, scores an expression of the user to obtain a posing score such as a smile score, and obtains a photographing suggestion based on the posing score and the smile score. For details, refer to the descriptions of FIG. 5E to FIG. 5G, and details are not described herein again.

308. The mobile phone sends the posing score+the photographing suggestion to the smartwatch.

309. The circular smartwatch gives feedback to the mobile phone.

310. The mobile phone deletes or saves the first picture.

For example, the user wearing the circular smartwatch views one or more of the thumbnail, the face region, or the posing score+the photographing suggestion, and determines whether to retain or retake the first picture. Then, the user performs an operation on the display of the circular smartwatch, so that the circular smartwatch feeds back an intention of the user to the mobile phone. The photographer may learn the operation intention of the user by using the mobile phone, and perform a next-step operation, for example, deleting the first picture or saving the first picture.

It should be noted that, in the embodiment of FIG. 8A and FIG. 8B, step 304, step 306, and step 308 are not strictly sequenced, and the three steps may alternatively be performed simultaneously. Similarly, step 303, step 305, and step 307 are not strictly sequenced, and the three steps may alternatively be performed simultaneously.

By using this solution, the first electronic device generates a second picture suitable for the second electronic device whose display is circular.

Second, the first electronic device is a mobile phone, and the second electronic device is a smartwatch with a rectangular display.

In this case, the specification information includes a length and a width of the display of the second electronic device. When the first electronic device processes the target region based on the specification information of the display of the second electronic device, to obtain the second picture, where the length is less than the width, if the length is less than a length of the target region, the first picture is scaled down, so that an edge length of a target region in a scaled-down first picture is equal to the length, and the second picture is cropped from the scaled-down first picture by using a center of the target region as a reference point. A scale-down rate is a ratio of the edge length to the length. Alternatively, when the length exceeds a preset multiple of the edge length of the target region, the first picture is scaled up, so that an edge length of a target region in a scaled-up first picture is equal to the length, and the second picture is cropped from the scaled-up first picture by using a center of the target region as a reference point. A scale-up rate is a ratio of the edge length to the length. Alternatively, when the length is greater than the edge length of the target region and does not exceed the preset multiple of the edge length of the target region, the second picture is cropped from the first picture by using a center of the target region as a reference point. By using this solution, the first electronic device generates a second picture suitable for the second electronic device whose display is rectangular.

Figure 12A:
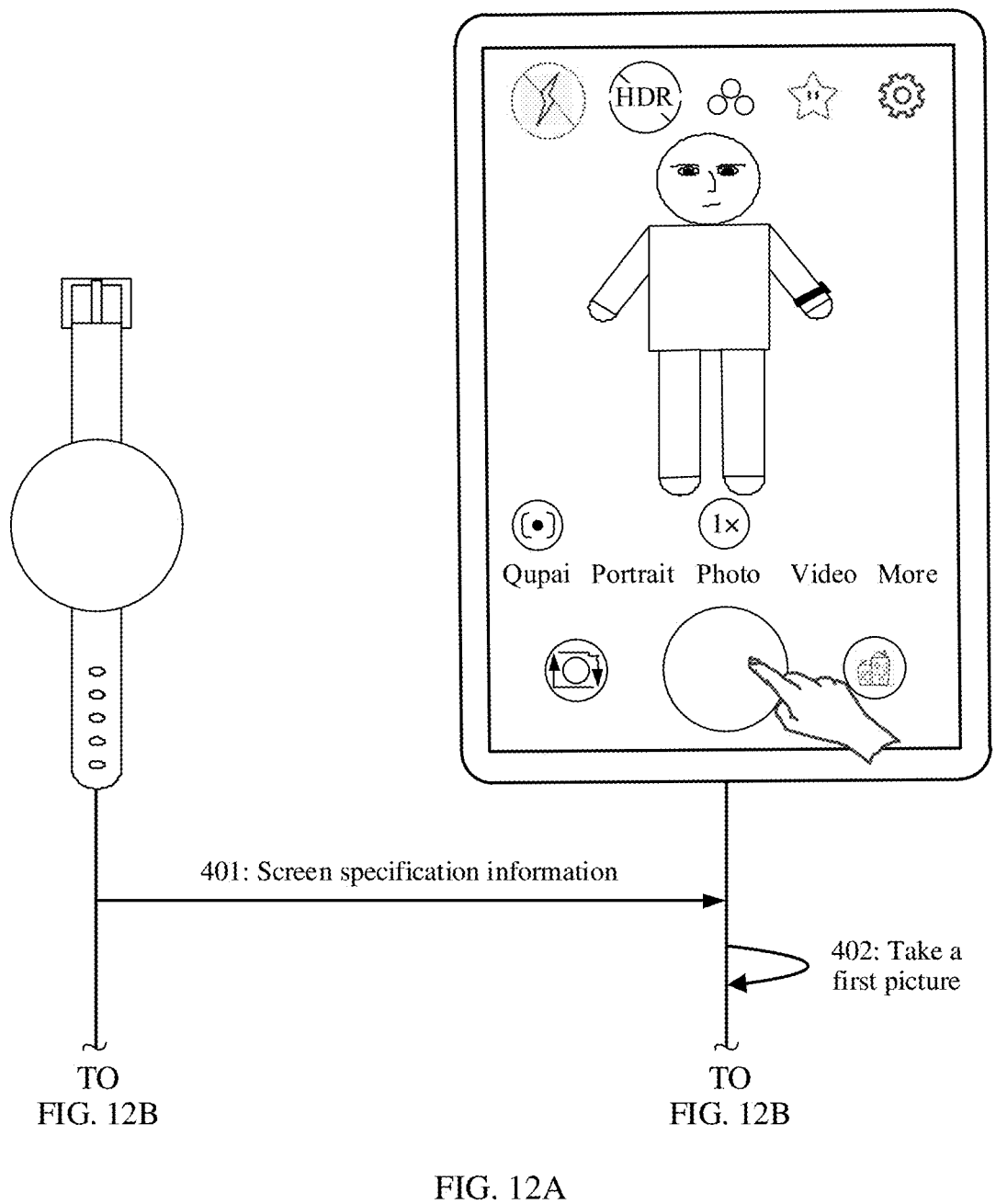
FIG. 12A and FIG. 12B are a schematic diagram of a process of a picture transmission method according to an embodiment of this application.
Figure 12B:
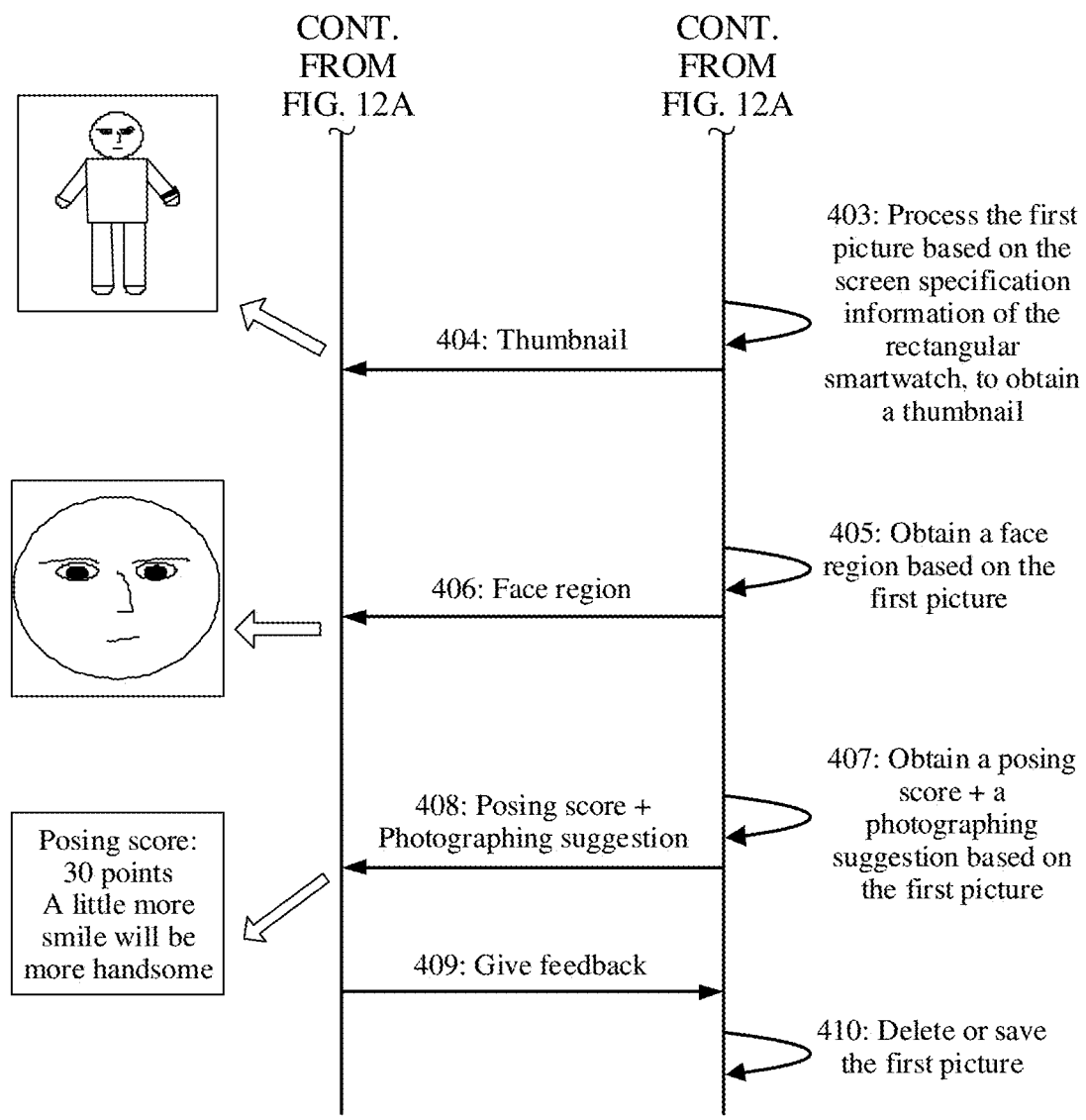

For example, refer to FIG. 12A and FIG. 12B. FIG. 12A and FIG. 12B are a schematic diagram of a process of a picture transmission method according to an embodiment of this application. Referring to FIG. 12A and FIG. 12B, this embodiment includes the following steps.

401. The mobile phone obtains screen specification information of the rectangular smartwatch.

For example, after the mobile phone establishes a Bluetooth connection to the rectangular smartwatch, the mobile phone obtains the screen specification information of the rectangular smartwatch. The screen specification information indicates a length and a width (m×n, m<n) of the rectangular smartwatch.

302. The mobile phone takes a first picture.

For example, the user wearing the rectangular smartwatch selects a photographing position and makes a photographing posture. At the same time, the photographer selects a position, adjusts a focal length, and the like, so that the photographer photographs the user by using the mobile phone to obtain the first picture.

The foregoing steps 301 and 302 are not strictly sequenced.

303. The mobile phone processes the first picture based on the screen specification information of the rectangular smartwatch, to obtain a thumbnail.

For example, the mobile phone processes the first picture based on the length and the width (m and n) of the rectangular smartwatch, to obtain a thumbnail that matches the rectangular smartwatch.

Figure 13:
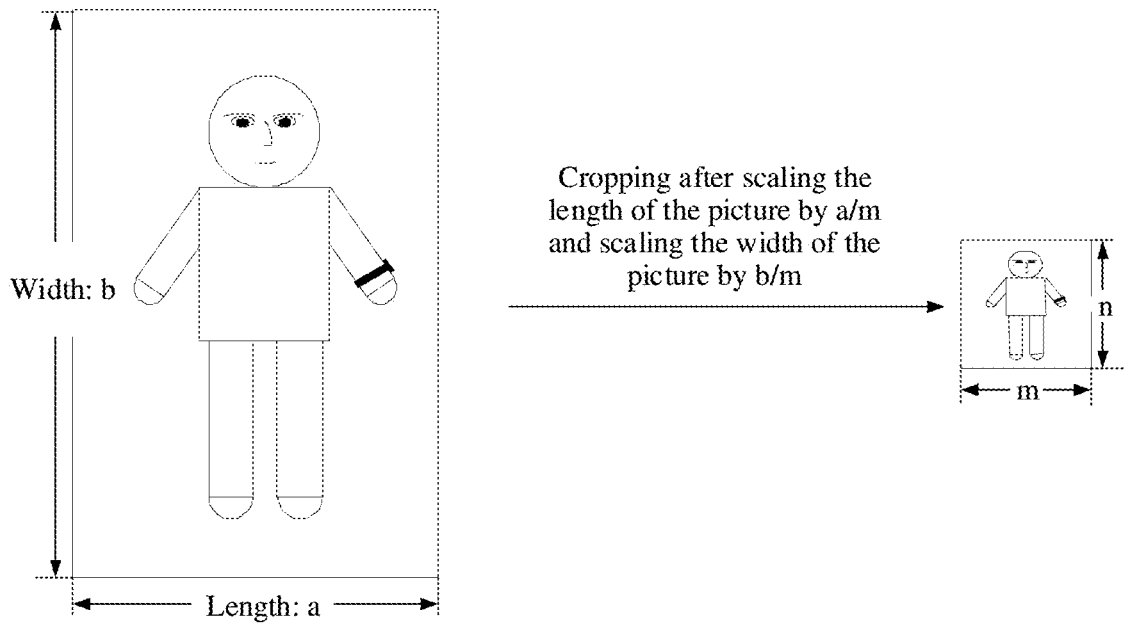
FIG. 13 is a schematic diagram of a process of obtaining a thumbnail in a picture transmission method according to an embodiment of this application.

FIG. 13 is a schematic diagram of a process of obtaining a thumbnail in a picture transmission method according to an embodiment of this application. Referring to FIG. 13, a specification of the first picture taken by the mobile phone is a (length)×b (width). After obtaining the first picture whose specification is a×b, the mobile phone may obtain a thumbnail after scaling the length of the first picture by a/m and scaling the width of the first picture by b/m.

404. The mobile phone sends the thumbnail to the rectangular smartwatch.

In addition, the mobile phone may also send the original first picture to the rectangular smartwatch. This is not limited in this embodiment of this application.

405. The mobile phone obtains a face region based on the first picture.

The mobile phone recognizes, from the first picture by using a face recognition technology, a region in which a face is located, and crops, from the first picture based on the diameter d of the rectangular smartwatch, a face region that is adapted to the rectangular smartwatch. If there are a plurality of faces in the first picture, the mobile phone may obtain a plurality of face regions from the first picture based on the diameter d of the rectangular smartwatch.

Figure 14:
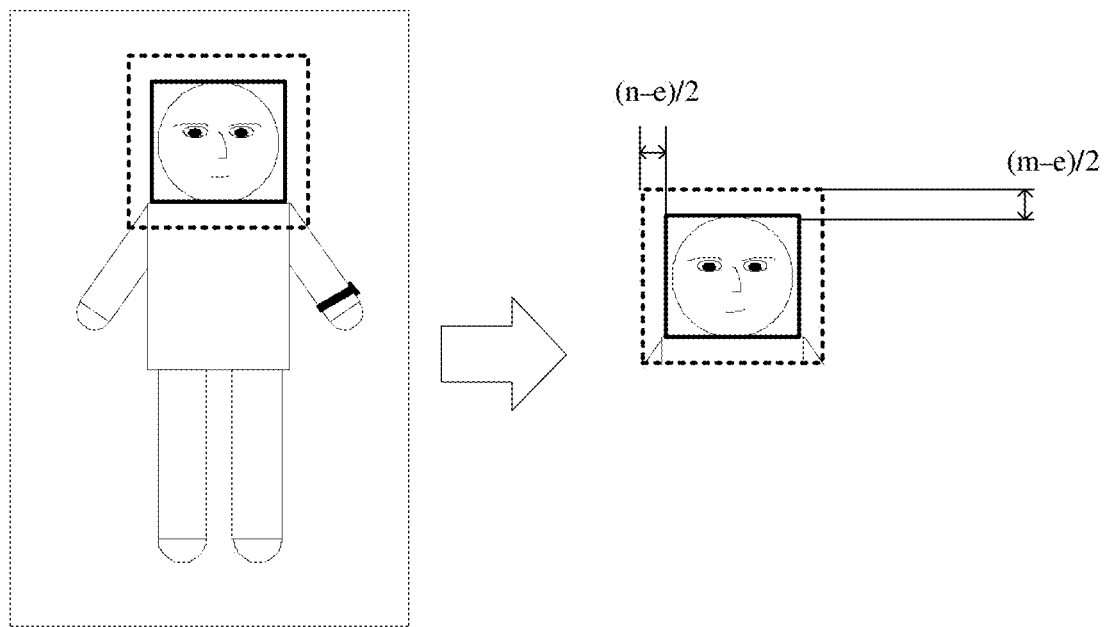
FIG. 14 is a schematic diagram of a process of obtaining a face region in a picture transmission method according to an embodiment of this application.

For example, refer to FIG. 14. FIG. 14 is a schematic diagram of a process of obtaining a face region in a picture transmission method according to an embodiment of this application. Referring to FIG. 14, the mobile phone recognizes, by using a face recognition technology, a region in which a face is located. For example, the region is a minimum square whose edge length is e and that may include five facial features of the user, as shown by a thick black box at a face position on the left of FIG. 14. FIG. 14 is a schematic diagram of a face region in a picture transmission method according to an embodiment of this application.

After obtaining the minimum square whose edge length is e and that may include the five facial features of the user, the mobile phone determines a ratio m/e=f of the length m of the rectangular smartwatch to the edge length e of the square, and determines, based on the ratio f, how to process the face region of the square.

When $f<1$, the square is scaled down, so that the edge length e of the minimum square that may include the five facial features of the user is decreased, to obtain a square whose edge length is d and that includes the five facial features of the user, and the scaled-down square is used as a face region.

When $f>2$, the square is scaled up, so that the edge length e of the minimum square that may include the five facial features of the user is increased, to obtain a square whose edge length is d and that includes the five facial features of the user, and the scaled-up square is used as a face region.

When $1 \leq f \leq 2$, an m×n rectangle is cropped from the first picture by using a geometric center of the square whose edge length is e as a reference point, and the m×n rectangle is used as a face region, as shown by a dotted box on the right of FIG. 14.

In this process, regardless of $f<1$, $f>2$, or $1 \leq f \leq 2$, a face region obtained by processing the first picture by the mobile phone is a second picture of a rectangular shape, and a diameter of the second picture is d or approximately d.

It should be noted that, the scaling the square may be scaling the square only, or may be scaling the first picture, so that the minimum square that may include the five facial features of the user is scaled at the same time.

406. The mobile phone sends the face region to the smartwatch.

407. The mobile phone obtains a posing score+a photographing suggestion based on the first picture.

For example, the mobile phone recognizes a posture and facial details such as eyes, lips, teeth, and cheeks of the user by using a face recognition technology, scores the posture of the user to obtain a posture score, scores an expression of the user to obtain a posing score such as a smile score, and obtains a photographing suggestion based on the posing score and the smile score. For details, refer to the descriptions of FIG. 5E to FIG. 5G, and details are not described herein again.

408. The mobile phone sends the posing score+the photographing suggestion to the smartwatch.

409. The rectangular smartwatch gives feedback to the mobile phone.

410. The mobile phone deletes or saves the first picture.

For example, the user wearing the rectangular smartwatch views one or more of the thumbnail, the face region, or the posing score+the photographing suggestion, and determines whether to retain or retake the first picture. Then, the user performs an operation on the display of the rectangular smartwatch, so that the rectangular smartwatch feeds back an intention of the user to the mobile phone. The photographer may learn the operation intention of the user by using the mobile phone, and perform a next-step operation, for example, deleting the first picture or saving the first picture.

It should be noted that, in the embodiment of FIG. 12A and FIG. 12B, step 404, step 406, and step 408 are not strictly sequenced, and the three steps may alternatively be performed simultaneously. Similarly, step 403, step 405, and step 407 are not strictly sequenced, and the three steps may alternatively be performed simultaneously.

It should be noted that, although in the foregoing embodiments, when the first electronic device is a mobile phone and the second electronic device is a smartwatch, the embodiments of this application are described in detail by using an example in which the mobile phone processes the original first picture to obtain the second picture representing the imaging effect, the embodiments of this application are not limited thereto. For example, when hardware and software capabilities of the smartwatch are relatively strong, the mobile phone may alternatively send the original first picture to the smartwatch, and the smartwatch processes the original first picture to obtain the second picture representing the imaging effect.

Figure 15:
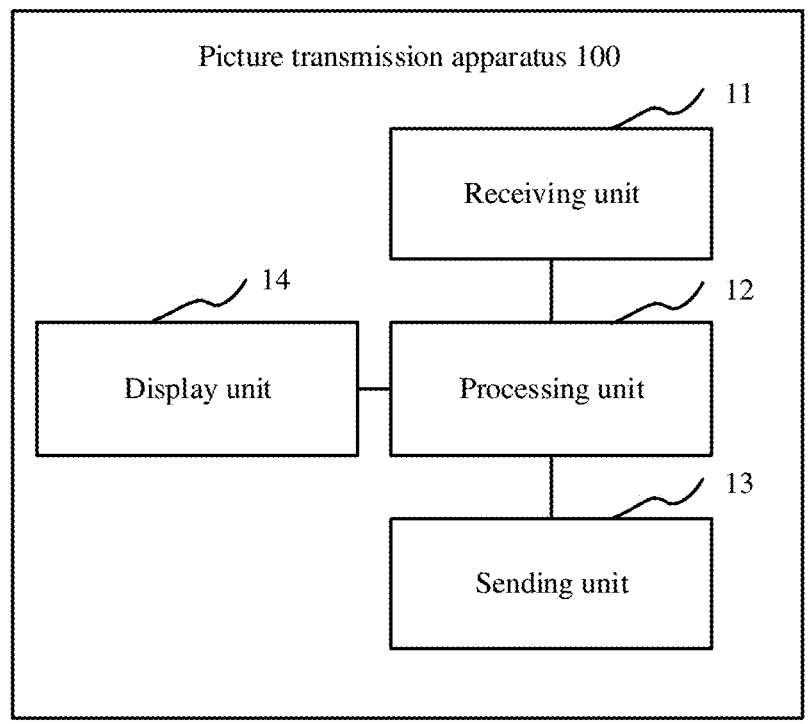
FIG. 15 is a schematic diagram of a structure of a picture transmission apparatus according to an embodiment of this application.

FIG. 15 is a schematic diagram of a structure of a picture transmission apparatus according to an embodiment of this application. The picture transmission apparatus in this embodiment may be a first electronic device, or may be a chip applied to the first electronic device. The picture transmission apparatus may be configured to perform a function of the first electronic device in the foregoing embodiment. As shown in FIG. 15, the picture transmission apparatus 100 may include:

a receiving unit 11, configured to receive an operation instruction a processing unit 12, configured to respond to the operation instruction; and a sending unit 13, configured to send an imaging effect of a first picture to a second electronic device. The imaging effect includes a second picture and a posing score, the second picture includes a target region of a target object in the first picture, a shape of the second picture is the same as a shape of a display of the second electronic device, a difference between a size of the second picture and a size of the display of the second electronic device is less than a preset threshold, and the posing score is a score of posture and expression quality of the target object.

In a feasible design, after the receiving unit 11 receives the operation instruction, the processing unit 12 is further configured to: scale up the target region of the target object in the first picture, to obtain the second picture; or scale down the target region of the target object in the first picture, to obtain the second picture; or crop the second picture from the first picture by using a center of the target region as a reference point.

In a feasible design, when there are a plurality of target objects, different target objects correspond to different second pictures.

In a feasible design, the target region is a face, and the imaging effect further includes a posing score of a person in the target region.

In a feasible design, the imaging effect further includes a third picture, the third picture is obtained by the first electronic device by scaling and/or cropping the first picture, a shape of the third picture is the same as the shape of the display of the second electronic device, and a difference between a size of the third picture and the size of the display of the second electronic device is less than the preset threshold.

Referring to FIG. 15, the picture transmission apparatus wo further includes a display unit 14.

After the sending unit 13 sends the imaging effect of the first picture to the second electronic device, the receiving unit 11 is further configured to receive indication information sent by the second electronic device. The indication information is used to indicate to delete or retain the first picture.

The display unit 14 is configured to display the indication information.

The processing unit 12 is further configured to delete or retain the first picture based on the indication information.

In a feasible design, the display unit 14 is configured to display a first interface. The first interface includes a first control, a second control, and a third control, the first control is configured to indicate whether to select the second picture, the second control is configured to indicate whether to select the posing score and the photographing suggestion, and the third control is configured to indicate whether to select the third picture.

The processing unit 12 is further configured to generate the second picture, the expression score and the photographing suggestion, or the third picture based on an operation performed by a user in the first interface.

In a feasible design, before the sending unit 13 sends the imaging effect of the first picture to the second electronic device, the processing unit 12 is further configured to photograph the target object to obtain the first picture.

In a feasible design, before the sending unit 13 sends the imaging effect of the first picture to the second electronic device, the processing unit 12 is further configured to establish a network connection to the second electronic device.

The receiving unit 11 is further configured to receive specification information of the display sent by the second electronic device.

In a feasible design, the posing score includes an expression score, and the processing unit 12 is further configured to recognize at least one of lips, teeth, eyes, or cheeks of a face in the target region, and determine the expression score based on the at least one of the lips, the teeth, the eyes, or the cheeks.

In a feasible design, before the sending unit 13 sends the imaging effect of the first picture to the second electronic device, the processing unit 12 is further configured to extract the target region of the target object from the first picture; and process the target region based on the specification information of the display of the second electronic device, to obtain the second picture.

In a feasible design, the target region is a square, and the specification information includes a diameter of the display of the second electronic device. When processing the target region based on the specification information of the display of the second electronic device, to obtain the second picture, the processing unit 12 is specifically configured to: when the diameter is less than an edge length of the target region, scale down the first picture, so that an edge length of a target region in a scaled-down first picture is equal to the diameter; and crop the second picture from the scaled-down first picture by using a center of the target region as a reference point, where a scale-down rate is a ratio of the edge length to the diameter; or when the diameter exceeds a preset multiple of the edge length of the target region, scale up the first picture, so that an edge length of a target region in a scaled-up first picture is equal to the diameter; and crop the second picture from the scaled-up first picture by using a center of the target region as a reference point, where a scale-up rate is a ratio of the edge length to the diameter; or when the diameter is greater than the edge length of the target region and does not exceed the preset multiple of the edge length of the target region, crop the second picture from the first picture by using a center of the target region as a reference point.

In a feasible design, the target region is a square, and the specification information includes a length and a width of the display of the second electronic device. When processing the target region based on the specification information of the display of the second electronic device, to obtain the second picture, where the length is less than the width, the processing unit 12 is specifically configured to: when the length is less than a length of the target region, scale down the first picture, so that an edge length of a target region in a scaled-down first picture is equal to the length; and crop the second picture from the scaled-down first picture by using a center of the target region as a reference point, where a scale-down rate is a ratio of the edge length to the length; or when the length exceeds a preset multiple of the edge length of the target region, scale up the first picture, so that an edge length of a target region in a scaled-up first picture is equal to the length; and crop the second picture from the scaled-up first picture by using a center of the target region as a reference point, where a scale-up rate is a ratio of the edge length to the length; or when the length is greater than the edge length of the target region and does not exceed the preset multiple of the edge length of the target region, crop the second picture from the first picture by using a center of the target region as a reference point.

The picture transmission apparatus provided in this embodiment of this application may perform an action of the first electronic device in the foregoing embodiment. Implementation principles and technical effects thereof are similar, and details are not described herein again.

Figure 16:
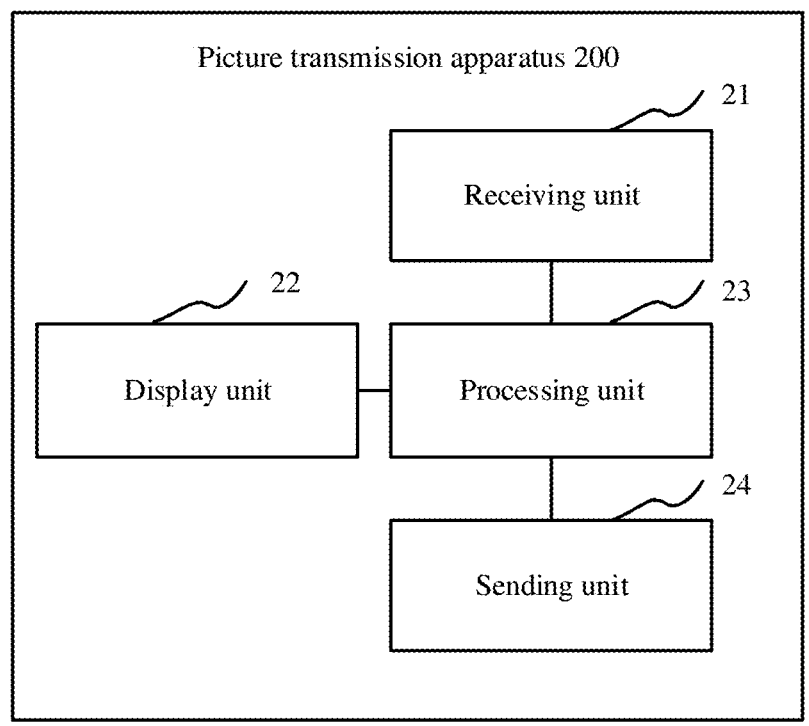
FIG. 16 is a schematic diagram of a structure of a picture transmission apparatus according to an embodiment of this application.

FIG. 16 is a schematic diagram of a structure of a picture transmission apparatus according to an embodiment of this application. The picture transmission apparatus in this embodiment may be a second electronic device, or may be a chip applied to the second electronic device. The picture transmission apparatus may be configured to perform a function of the second electronic device in the foregoing embodiment. As shown in FIG. 16, the picture transmission apparatus 200 may include:

a receiving unit 21, configured to receive an imaging effect sent by a first electronic device, where the imaging effect includes a second picture and a posing score, the second picture includes a target region of a target object in the first picture, a shape of the second picture is the same as a shape of a display of the second electronic device, a difference between a size of the second picture and a size of the display of the second electronic device is less than a preset threshold, and the posing score is a score of posture and expression quality of the target object; and a display unit 22, configured to display the imaging effect.

Referring to FIG. 16, when there are a plurality of target objects, different target objects correspond to different second pictures, and the picture transmission apparatus 200 further includes:

a processing unit 23, configured to detect a screen switching operation input by a user.

The display unit 22 is configured to switch to and display the second picture after the processing unit 23 detects the screen switching operation input by the user.

In a feasible design, the target region is a face, and the imaging effect further includes a posing score of a person in the target region.

In a feasible design, the imaging effect further includes a photographing suggestion, and the photographing suggestion is used to indicate a manner of adjusting an expression of the target object.

In a feasible design, the imaging effect further includes a third picture, the third picture is obtained by the first electronic device by scaling and/or cropping the first picture, a shape of the third picture is the same as the shape of the display of the second electronic device, and a difference between a size of the third picture and the size of the display of the second electronic device is less than the preset threshold.

Referring to FIG. 16, in a feasible design, the picture transmission apparatus 200 further includes a sending unit 24.

The display unit 22 is further configured to display a retain button and a delete button.

The processing unit 23 is further configured to generate indication information based on an operation performed by the user on the retain button or the delete button. The indication information is used to indicate to delete or retain the first picture.

The sending unit 24 is configured to send the indication information to the first electronic device.

The picture transmission apparatus provided in this embodiment of this application may perform an action of the second electronic device in the foregoing embodiment. Implementation principles and technical effects thereof are similar, and details are not described herein again.

It should be noted that, it should be understood that, the receiving unit may be a receiver in actual implementation, and the sending unit may be a transmitter in actual implementation. The processing unit may be implemented in a form of software invoked by a processing element, or may be implemented in a form of hardware. For example, during implementation, the processing unit may be a processing element separately disposed, or may be integrated into a chip of the apparatus. Alternatively, the processing unit may be stored in a memory of the apparatus as program code that is invoked by a processing element of the apparatus to perform a function of the processing unit. In addition, all or some of these units may be integrated or separately implemented. The processing element may be an integrated circuit and has a signal processing capability. In an implementation process, steps in the foregoing methods or the foregoing units can be implemented by using a hardware integrated logic circuit in the processing element, or by using instructions in a form of software.

For example, these units may be one or more integrated circuits configured to implement the foregoing methods, for example, one or more application-specific integrated circuits (application-specific integrated circuit, ASIC), one or more microprocessors (digital signal processor, DSP), or one or more field programmable gate arrays (field programmable gate array, FPGA). For another example, when one of the units is implemented in a form of program code invoked by a processing element, the processing element may be a general-purpose processor, for example, a central processing unit (central processing unit, CPU) or another processor that can invoke program code. For another example, the units may be integrated together and implemented in a form of a system-on-a-chip (system-on-a-chip, SOC).

Figure 17:
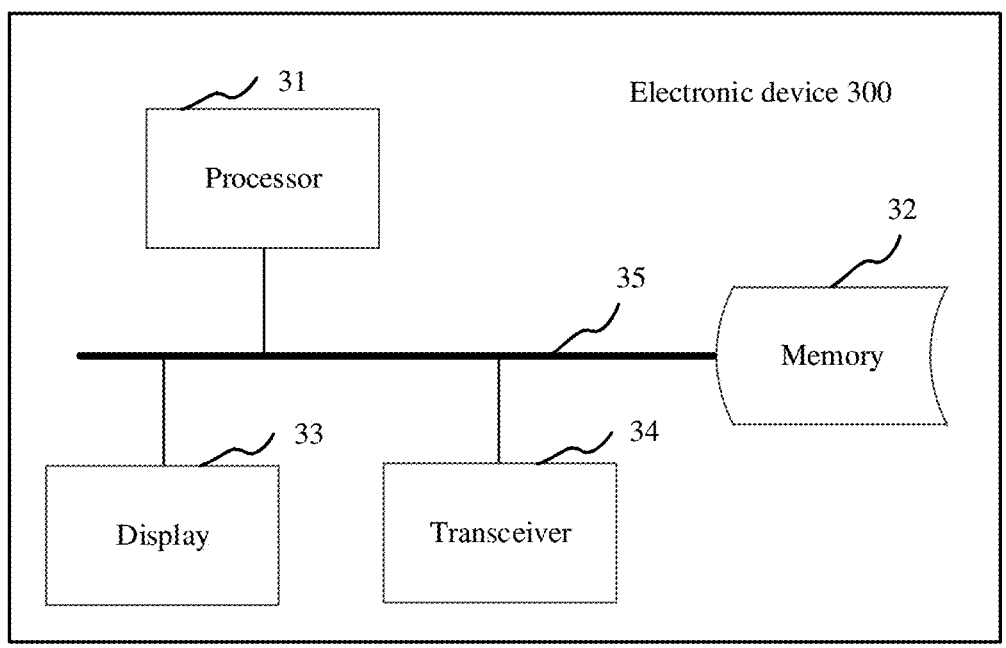
FIG. 17 is a schematic diagram of a structure of an electronic device according to an embodiment of this application.

FIG. 17 is a schematic diagram of a structure of an electronic device according to an embodiment of this application. As shown in FIG. 17, the electronic device 300 includes:

a processor 31, a memory 32, a display 33, and a transceiver 34.

The memory 32 stores computer execution instructions.

The processor 31 executes the computer execution instructions stored in the memory 32, to control the display 33 to display a first picture, and control the transceiver 34 to send, to a second electronic device, a second picture that is used to represent an imaging effect of the first picture, so as to implement the picture transmission method performed by the first electronic device.

Alternatively, the processor 31 executes the computer execution instructions stored in the memory 32, to control the display 33 to display a second picture, and control the transceiver 34 to send indication information to a first electronic device, so as to implement the picture transmission method performed by the second electronic device.

The processor 31, the memory 32, the display 33, and the transceiver 34 may be connected by using a bus 35.

In the foregoing implementation of the communications apparatus, the memory and the processor are directly or indirectly electrically connected to implement data transmission or interaction, that is, the memory and the processor may be connected by using an interface, or may be integrated. For example, the elements may be electrically connected to each other by using one or more communication buses or signal lines, for example, may be connected by using a bus. The memory stores computer execution instructions for implementing a data access control method, including at least one software functional module that may be stored in the memory in a form of software or firmware. The processor executes various functional applications and data processing by running software programs and modules stored in the memory.

The memory may be, but is not limited to, a random access memory (Random Access Memory, RAM for short), a read-only memory (Read-Only Memory, ROM for short), a programmable read-only memory (Programmable Read-Only Memory, PROM for short), or an erasable read-only memory (Erasable Programmable Read-Only Memory, EPROM for short), an electrically erasable read-only memory (Electric Erasable Programmable Read-Only Memory, EEPROM for short), or the like. The memory is configured to store a program, and the processor executes the program after receiving an execution instruction. Further, the software programs and modules in the memory may further include an operating system, which may include various software components and/or drivers for managing system tasks (for example, memory management, storage device control, and power management), and may communicate with various hardware or software components to provide an operating environment for other software components.

The processor may be an integrated circuit chip and has a signal processing capability. The processor may be a general-purpose processor, including a central processing unit (Central Processing Unit, CPU for short), a network processor (Network Processor, NP for short), or the like. The processor may implement or perform the methods, steps, and logical block diagrams that are disclosed in embodiments of this application. The general-purpose processor may be a microprocessor, or the processor may be any conventional processor or the like.

Based on the foregoing, this application further provides a chip, including a logic circuit and an input interface. The input interface is configured to obtain to-be-processed data. The logic circuit is configured to perform the technical solution on the first electronic device side in the foregoing method embodiment on the to-be-processed data, to obtain processed data.

Optionally, the chip may further include an output interface, and the output interface is configured to output the processed data.

The to-be-processed data obtained by the input interface includes a first picture and the like, and the processed data output by the output interface includes a second picture that is used to indicate an imaging effect, and the like.

This application further provides a chip, including a logic circuit and an input interface. The input interface is configured to obtain to-be-processed data. The logic circuit is configured to perform the technical solution on the second electronic device side in the foregoing method embodiment on the to-be-processed data, to obtain processed data.

Optionally, the chip may further include an output interface, and the output interface is configured to output the processed data.

The to-be-processed data obtained by the input interface includes a second picture that is used to indicate an imaging effect, and the like, and the processed data output by the output interface includes indication information used to indicate a photographer to delete or retain a first picture, and the like.

This application further provides a computer-readable storage medium. The computer-readable storage medium is configured to store a program. The program is executed by a processor to perform the technical solution on the first electronic device side in the foregoing embodiment.

This application further provides a computer-readable storage medium. The computer-readable storage medium is configured to store a program. The program is executed by a processor to perform the technical solution on the second electronic device side in the foregoing embodiment.

An embodiment of this application further provides a computer program product. When the computer program product runs on a first electronic device, the first electronic device is enabled to perform the technical solution on the first electronic device side in the foregoing embodiment. Alternatively, when the computer program product runs on a second electronic device, the second electronic device is enabled to perform the technical solution on the first electronic device side in the foregoing embodiment.

A person of ordinary skill in the art may understand that all or some of the steps of the method embodiments may be implemented by a program instructing related hardware. The program may be stored in a computer-readable storage medium. When the program is executed, the steps of the method embodiments are performed. The storage medium includes any medium that can store program code, such as a ROM, a RAM, a magnetic disk, or an optical disc. A specific medium type is not limited in this application.

What is claimed is:

1. A method applied to a first electronic device, comprising:
receiving an operation instruction; and
sending an imaging effect of a first picture to a second electronic device in response to the operation instruction, the imaging effect comprising a second picture and a posing score, the second picture comprising a target region of a target object in the first picture and having a shape that is the same as a shape of a display of the second electronic device, wherein a difference between a size of the second picture and a size of the display of the second electronic device is less than a first preset threshold, and the posing score is a score of posture and expression quality of the target object in the first picture, and wherein the imaging effect further comprises a photographing suggestion, the photographing suggestion indicating a manner of adjusting an expression of the target object for a subsequent picture to be captured.

2. The method according to claim 1, wherein after receiving the operation instruction, the method further comprises:
scaling up the target region of the target object in the first picture to obtain the second picture;
scaling down the target region of the target object in the first picture to obtain the second picture; or
cropping the second picture from the first picture using a center of the target region as a reference point.

3. The method according to claim 1, wherein when there are a plurality of target objects in the first picture, different target objects correspond to different second pictures.

4. The method according to claim 1, wherein the imaging effect further comprises a third picture, the third picture being obtained by the first electronic device by scaling or cropping the first picture, a shape of the third picture is the same as the shape of the display of the second electronic device, and a difference between a size of the third picture and the size of the display of the second electronic device is less than a second preset threshold.

5. The method according to claim 1, wherein after sending the imaging effect of the first picture to the second electronic device in response to the operation instruction, the method further comprises:
receiving indication information sent by the second electronic device, the indication information indicating to delete or retain the first picture by the first electronic device;
displaying the indication information; and
deleting or retaining the first picture based on the indication information.

6. The method according to claim 1, wherein before sending the imaging effect of the first picture to the second electronic device in response to the operation instruction, the method further comprises:

displaying a first interface, wherein the first interface comprises a first control, a second control, and a third control, the first control is configured to indicate whether to select the second picture, the second control is configured to indicate whether to select the posing score and the photographing suggestion, and the third control is configured to indicate whether to select a third picture, the photographing suggestion indicating a manner of adjusting an expression of the target object, and the third picture being a scaled or cropped picture of the first picture; and generating the second picture, the posing score and the photographing suggestion, or the third picture based on a user operation in the first interface.

7. The method according to claim 1, wherein before sending the imaging effect of the first picture to the second electronic device in response to the operation instruction, the method further comprises:

photographing the target object to obtain the first picture.

8. The method according to claim 1, wherein before sending the imaging effect of the first picture to the second electronic device in response to the operation instruction, the method further comprises:

establishing a network connection to the second electronic device; and receiving specification information of the display of the second electronic device sent by the second electronic device.

9. A method applied to a second electronic device, comprising:

receiving an imaging effect of a first picture sent by a first electronic device, the imaging effect comprising a second picture and a posing score, the second picture comprising a target region of a target object in the first picture and having a shape that is the same as a shape of a display of the second electronic device, wherein a difference between a size of the second picture and a size of the display of the second electronic device is less than a first preset threshold, and the posing score is a score of posture and expression quality of the target object in the first picture, wherein the imaging effect further comprises a photographing suggestion, the photographing suggestion indicating a manner of adjusting an expression of the target object for a subsequent picture to be captured; and displaying the imaging effect.

10. The method according to claim 9, wherein when there are a plurality of target objects in the first picture, different target objects correspond to different second pictures, and the displaying the imaging effect comprises:

switching to display the second picture after detecting a screen switching operation of a user on the second electronic device.

11. The method according to claim 9, wherein the imaging effect further comprises a third picture, the third picture being a scaled or cropped picture of the first picture, a shape of the third picture is the same as the shape of the display of the second electronic device, and a difference between a size of the third picture and the size of the display of the second electronic device is less than a second preset threshold.

12. The method according to claim 9, further comprising:

displaying a retain button and a delete button;

generating indication information based on a user operation on the retain button or the delete button, the indication information indicating to delete or retain the first picture by the first electronic device; and sending the indication information to the first electronic device.

13. A first electronic device, comprising:

at least one processor; and at least one computer readable storage medium storing instructions that are executable by the at least one processor, the instructions comprising instructions for:

receiving an operation instruction; and sending an imaging effect of a first picture to a second electronic device in response to the operation instruction, the imaging effect comprising a second picture and a posing score, the second picture comprising a target region of a target object in the first picture and having a shape that is the same as a shape of a display of the second electronic device, wherein a difference between a size of the second picture and a size of the display of the second electronic device is less than a first preset threshold, and the posing score is a score of posture and expression quality of the target object in the first picture, and wherein the imaging effect further comprises a photographing suggestion, the photographing suggestion indicating a manner of adjusting an expression of the target object for a subsequent picture to be captured.

14. The first electronic device according to claim 13, wherein the instructions further comprise instructions for:

scaling up the target region of the target object in the first picture to obtain the second picture.

15. The first electronic device according to claim 13, wherein the instructions further comprise instructions for:

scaling down the target region of the target object in the first picture to obtain the second picture.

16. The first electronic device according to claim 13, wherein the instructions further comprise instructions for:

cropping the second picture from the first picture using a center of the target region as a reference point.

17. The first electronic device according to claim 13, wherein when there are a plurality of target objects in the first picture, different target objects correspond to different second pictures.

18. The first electronic device according to claim 13, wherein the imaging effect further comprises a third picture, the third picture being obtained by the first electronic device by scaling or cropping the first picture, a shape of the third picture is the same as the shape of the display of the second electronic device, and a difference between a size of the third picture and the size of the display of the second electronic device is less than a second preset threshold.

19. The first electronic device according to claim 13, wherein the instructions further comprise instructions for:

receiving indication information sent by the second electronic device, the indication information indicating to delete or retain the first picture by the first electronic device;

displaying the indication information; and deleting or retaining the first picture based on the indication information.

20. The first electronic device according to claim 13, wherein the instructions further comprise instructions for:

displaying a first interface, wherein the first interface comprises a first control, a second control, and a third control, the first control is configured to indicate whether to select the second picture, the second control is configured to indicate whether to select the posing score and the photographing suggestion, and the third control is configured to indicate whether to select a third picture, the photographing suggestion indicating a manner of adjusting an expression of the target object, and the third picture being a scaled or cropped picture of the first picture; and generating the second picture, the posing score and the photographing suggestion, or the third picture based on a user operation in the first interface.

* * * * *